(12) United States Patent
Shuttleworth et al.

(10) Patent No.: US 10,122,838 B2
(45) Date of Patent: Nov. 6, 2018

(54) USER INTERFACE FOR A COMPUTING DEVICE

(71) Applicant: CANONICAL LIMITED, Douglas (IM)

(72) Inventors: Mark Shuttleworth, Douglas (IM); Ivo Weevers, Douglas (IM); Mika Meskanen, Douglas (IM); Oren Horev, Douglas (IM); Calum Pringle, Douglas (IM); John Lea, Douglas (IM); Otto Greenslade, Douglas (IM); Marcus Haslam, Douglas (IM); Ivanka Majic, Douglas (IM); Xi Zhu, Douglas (IM)

(73) Assignee: Canonical Limited, Douglas (IM)

( * ) Notice: Subject to any disclaimer, the term of this patent is extended or adjusted under 35 U.S.C. 154(b) by 291 days.

(21) Appl. No.: 14/138,394

(22) Filed: Dec. 23, 2013

(65) Prior Publication Data

US 2014/0189588 A1    Jul. 3, 2014

Related U.S. Application Data

(60) Provisional application No. 61/788,842, filed on Mar. 15, 2013.

(30) Foreign Application Priority Data

Jan. 2, 2013  (GB) .................................. 1300031.0
Feb. 19, 2013 (GB) .................................. 1302901.2
Mar. 15, 2013 (GB) .................................. 1304696.6

(51) Int. Cl.
   *G06F 3/0488* (2013.01)
   *G06F 3/0482* (2013.01)
   (Continued)

(52) U.S. Cl.
   CPC ........ *H04M 1/72519* (2013.01); *G06F 3/017* (2013.01); *G06F 3/0481* (2013.01);
   (Continued)

(58) Field of Classification Search
   CPC ............ G06F 3/04883; G06F 3/04847; G06F 3/04817; G06F 3/0488; G06F 3/017; G06F 3/04842; G06F 3/04886; G06F 3/016
   (Continued)

(56) References Cited

U.S. PATENT DOCUMENTS 5,513,342 A    4/1996 Leong et al.
5,751,283 A    5/1998 Smith
(Continued)

FOREIGN PATENT DOCUMENTS

CN    1811686 A       8/2006
CN    101248412 A     8/2008
(Continued)

OTHER PUBLICATIONS

Leonhard, "Windows 7 All-In-One for Dummies", Copyright 2009, Wiley Publishing Inc.
(Continued)

*Primary Examiner* — Sang H Kim

(57) ABSTRACT

There is disclosed a smartphone, tablet or other computing device comprising: (a) a touch sensitive display; (b) one or more processors; (c) computer memory; (d) one or more computer programs stored in the computer memory and configured to be executed by the one or more processors and including instructions for detecting a swipe in from an edge of the display, and in response to the detected swipe causing a home screen to be displayed, the home screen listing running apps and user notifications, such as missed calls,
(Continued)

(A)  (B)  (C)  (D)  (E)

irrespective of which screen the device was displaying immediately prior to the swipe in from the edge.

15 Claims, 39 Drawing Sheets

(51) Int. Cl.
| | |
|---|---|
| *H04M 1/725* | (2006.01) |
| *G06F 3/0484* | (2013.01) |
| *G06F 3/01* | (2006.01) |
| *G06F 3/0481* | (2013.01) |
| *G06F 3/0485* | (2013.01) |
| *H04M 1/67* | (2006.01) |

(52) U.S. Cl.
CPC .......... *G06F 3/0482* (2013.01); *G06F 3/0484* (2013.01); *G06F 3/0485* (2013.01); *G06F 3/0488* (2013.01); *G06F 3/04817* (2013.01); *G06F 3/04883* (2013.01); *H04M 1/67* (2013.01); *H04M 2250/22* (2013.01)

(58) Field of Classification Search
USPC ........................................................ 715/810
See application file for complete search history.

(56) References Cited

U.S. PATENT DOCUMENTS

| | | | |
|---|---|---|---|
| 5,847,706 A | 12/1998 | Kingsley | |
| 5,883,635 A | 3/1999 | Rao et al. | |
| 6,335,743 B1 | 1/2002 | Owings | |
| 6,473,102 B1 | 10/2002 | Rodden et al. | |
| 6,983,424 B1 | 1/2006 | Dutta | |
| 7,274,382 B2 | 9/2007 | Plut | |
| 7,370,284 B2 | 5/2008 | Andrea et al. | |
| 7,398,478 B2 | 7/2008 | Wu et al. | |
| 8,793,624 B2* | 7/2014 | Santoro ............... | G06F 3/04883 345/156 |
| 9,201,585 B1 | 12/2015 | Karakotsios et al. | |
| 2002/0191027 A1 | 12/2002 | Morrow et al. | |
| 2005/0085272 A1 | 4/2005 | Anderson et al. | |
| 2006/0199616 A1 | 9/2006 | Landschaft et al. | |
| 2007/0067272 A1 | 3/2007 | Flynt et al. | |
| 2007/0150842 A1 | 6/2007 | Chaudhri et al. | |
| 2007/0240074 A1 | 10/2007 | Banks | |
| 2008/0057926 A1 | 3/2008 | Forstall et al. | |
| 2008/0155471 A1* | 6/2008 | Lynn ............... | H04M 1/274583 715/811 |
| 2008/0189627 A1 | 8/2008 | Nikitin et al. | |
| 2008/0207188 A1 | 8/2008 | Ahn et al. | |
| 2009/0106648 A1 | 4/2009 | Mogilevsky et al. | |
| 2009/0160778 A1 | 6/2009 | Nurmi et al. | |
| 2009/0249247 A1 | 10/2009 | Tseng et al. | |
| 2010/0146437 A1 | 6/2010 | Woodcock et al. | |
| 2010/0269040 A1 | 10/2010 | Lee | |
| 2010/0302172 A1 | 12/2010 | Wilairat | |
| 2011/0035661 A1 | 2/2011 | Balinsky et al. | |
| 2011/0047149 A1* | 2/2011 | Vaananen ......... | G06F 17/30672 707/723 |
| 2011/0081889 A1 | 4/2011 | Gao et al. | |
| 2011/0087970 A1 | 4/2011 | Swink et al. | |
| 2011/0157029 A1 | 6/2011 | Tseng | |
| 2011/0179386 A1 | 7/2011 | Shaffer et al. | |
| 2011/0212430 A1 | 9/2011 | Smithmier et al. | |
| 2011/0219324 A1 | 9/2011 | Watanabe et al. | |
| 2011/0252369 A1 | 10/2011 | Chaudhri | |
| 2012/0017163 A1 | 1/2012 | Ragan | |
| 2012/0036556 A1 | 2/2012 | LeBeau et al. | |
| 2012/0046077 A1 | 2/2012 | Kim et al. | |
| 2012/0069231 A1 | 3/2012 | Chao | |
| 2012/0129496 A1 | 5/2012 | Park et al. | |
| 2012/0154303 A1* | 6/2012 | Lazaridis ............... | G06F 1/3203 345/173 |
| 2012/0180001 A1 | 7/2012 | Griffin et al. | |
| 2012/0236037 A1* | 9/2012 | Lessing ................... | G06F 3/017 345/661 |
| 2012/0278725 A1 | 11/2012 | Gordon et al. | |
| 2012/0284297 A1 | 11/2012 | Aguera-Arcas et al. | |
| 2012/0284673 A1 | 11/2012 | Lamb et al. | |
| 2012/0299968 A1 | 11/2012 | Wong et al. | |
| 2012/0304092 A1 | 11/2012 | Jarrett et al. | |
| 2012/0304133 A1 | 11/2012 | Nan et al. | |
| 2013/0060754 A1 | 3/2013 | Lazzaro et al. | |
| 2013/0061180 A1 | 3/2013 | Dongen et al. | |
| 2013/0080960 A1 | 3/2013 | McRae et al. | |
| 2013/0082974 A1 | 4/2013 | Kerr et al. | |
| 2013/0103680 A1 | 4/2013 | Arrasvuori | |
| 2013/0124449 A1 | 5/2013 | Pinckney et al. | |
| 2013/0145290 A1 | 6/2013 | Weber et al. | |
| 2013/0145295 A1* | 6/2013 | Booking ................. | G06F 3/017 715/764 |
| 2013/0159927 A1 | 6/2013 | Chuang et al. | |
| 2013/0162502 A1 | 6/2013 | Lee et al. | |
| 2013/0162516 A1* | 6/2013 | Paretti ................... | G06F 3/0488 345/156 |
| 2013/0162571 A1* | 6/2013 | Tamegai ............... | G06F 3/0412 345/173 |
| 2013/0162683 A1 | 6/2013 | Paretti et al. | |
| 2013/0191911 A1 | 7/2013 | Dellinger et al. | |
| 2013/0201092 A1* | 8/2013 | Prakash ................ | G06F 3/0483 345/156 |
| 2013/0215040 A1* | 8/2013 | Bose ..................... | G06F 3/0416 345/173 |
| 2013/0219340 A1 | 8/2013 | Linge | |
| 2013/0227470 A1 | 8/2013 | Thorsander et al. | |
| 2013/0227478 A1 | 8/2013 | Rydenhag et al. | |
| 2013/0230840 A1* | 9/2013 | Parkar ..................... | G09B 5/06 434/322 |
| 2013/0285925 A1 | 10/2013 | Stokes et al. | |
| 2013/0325892 A1 | 12/2013 | Edwards et al. | |
| 2013/0332831 A1* | 12/2013 | Birnkrant ........... | H04N 21/4622 715/719 |
| 2014/0026099 A1 | 1/2014 | Andersson Reimer et al. | |
| 2014/0082534 A1 | 3/2014 | Cleron et al. | |
| 2014/0136986 A1* | 5/2014 | Martin .................. | G06F 3/0488 715/748 |
| 2014/0149390 A1* | 5/2014 | Chen ................. | G06F 17/30867 707/722 |
| 2014/0189523 A1 | 7/2014 | Shuttleworth et al. | |
| 2014/0189549 A1 | 7/2014 | Shuttleworth et al. | |
| 2014/0189573 A1 | 7/2014 | Shuttleworth et al. | |
| 2014/0189578 A1 | 7/2014 | Shuttleworth et al. | |
| 2014/0189608 A1 | 7/2014 | Shuttleworth et al. | |
| 2014/0245214 A1* | 8/2014 | Singh .................... | G06F 3/0484 715/780 |
| 2014/0282208 A1* | 9/2014 | Chaudhri ............. | G06F 3/04883 715/779 |
| 2014/0375834 A1* | 12/2014 | Lohan .................. | G06Q 10/101 348/211.99 |
| 2015/0169071 A1* | 6/2015 | Jitkoff ................ | G06F 3/04883 715/863 |

FOREIGN PATENT DOCUMENTS

| | | |
|---|---|---|
| CN | 102566850 A | 7/2012 |
| EP | 2 059 868 B1 | 9/2010 |
| EP | 2434368 A1 | 3/2012 |
| EP | 2474894 A1 | 7/2012 |
| EP | 2637471 A1 | 9/2013 |
| JP | 2012511209 A | 5/2012 |
| WO | 2008/030779 A2 | 3/2008 |
| WO | 2010065296 A2 | 6/2012 |

OTHER PUBLICATIONS

HackerZ, "How to Use Gesture Shortcuts on Your iOS Lockscreen", Published: Aug. 28, 2011, HackerZ World!!!, http://hack-kinng.blogspot.com/2011/08/how-to-use-gesture-shortcuts-on-you.html.
GMD, "GMD GestureControl root 4.2.1", Published: Oct. 1, 2012,

(56) References Cited

OTHER PUBLICATIONS

Blog Android, http://androidkau.blogspot.com/2012/10/gmd-gesturecontrol-root-421.html.
Rehman, "Quick Launch: Android Lock Screen App With Widgets & iPhone-Style Notifications", Published: Oct. 29, 2012 by AddictiveTips.com, http://www.addictivetips.com/android/quick-launch-android-lock-screen-app-with-iphone-style-notifications/.
"Various Notification (Receiving) Widgets: Discussion of Android Apps in Executive Assistant, Xperia", Apr. 21, 2012, Accessed at http://xperia-freaks.org/2010/07/15/executive-assistant-adware/.
Chinese Office Action dated Apr. 13, 2018 in corresponding Chinese Patent Application No. 2013-80074275.3, 16 pages.
Japanese Office Action dated Jan. 23, 2018 in corresponding Japanese Patent Application No. 2015-550149, 5 pages.

* cited by examiner

USER INTERFACE FOR A COMPUTING DEVICE

CROSS-REFERENCE TO RELATED APPLICATIONS

This application is based on, and claims priority to, GB Application No. 1300031.0, filed Jan. 2, 2013; GB Application No. 1302901.2, filed Feb. 19, 2013; GB Application No. 1304696.6, filed Mar. 15, 2013; and U.S. Provisional Application No. 61/788,842, filed Mar. 15, 2013, the entire contents of each of which being fully incorporated herein by reference.

BACKGROUND OF THE INVENTION

1. Field of the Invention

This invention relates to a user interface for a computing device; in particular a touch-based device such as a smartphone or tablet.

2. Description of the Prior Art

Today, we use many different types of computing devices (such as TVs, laptops, tablets, phones). Their interfaces can be very different, even when from the same company. This makes it harder for users to transition rapidly between these types of devices; it requires users to learn new ways of interacting with these devices, which can be frustrating, especially for users who are less technically sophisticated, or are simply less willing to invest time and effort into learning new interaction skills. It also makes the process of designing these types of devices slower and riskier than necessary, since new interaction design approaches have to be conceived for each new type of device. And it makes it more difficult for developers to write applications for each of the devices, because they cannot reuse very much of their software for each different form factor. In part, this inefficiency arises because the underlying operating systems across these various kinds of devices are not common or shared; further, if one takes a user interface designed for a large device, such as a laptop, and presents it on a smartphone, the result is unusable—the challenges facing interaction designers working with the small screen of a typical smartphone are very considerable.

Overall, the interaction design problems creating a single unified family of interfaces that (a) enables fast one-handed operation of a smartphone and (b) will scale effectively from smartphone to tablet, where two-handed touch interaction is typical, (c) scales smoothly to accommodate keyboard and pointer input typical of a PC, and (d) scales to a TV form that is usable with a simple remote control, are very considerable and have not been successfully solved until now.

This patent specification describes not only various ideas and functions, but also their creative expression. A portion of the disclosure of this patent document therefore contains material to which a claim for copyright is made and notice is hereby given: Copyright Canonical Limited 2012 and 2013 (pursuant to 17 U.S.C. 401). A claim to copyright protection is made to all screen shots, icons, look and feel and all other protectable expression associated with the user interface and user interaction illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

In a first aspect, there is provided a smartphone, tablet or other computing device comprising:
(a) a touch sensitive display;
(b) one or more processors;
(c) computer memory;
(d) one or more computer programs stored in the computer memory and configured to be executed by the one or more processors and including instructions for detecting a swipe in from an edge of the display, and in response to the detected swipe causing a home screen to be displayed, the home screen listing running apps and user notifications, such as missed calls, irrespective of which screen the device was displaying immediately prior to the swipe in from the edge.

This document will describe innovations in the following areas:
A. Edge Gestures
B. Ranged gestures
C. The Welcome Screen
D. The Unlocking Mechanism
E. The Ubuntu search experience
F. The Home Screen in Ubuntu
G. The Ubuntu 'Side-Stage'
H. Scalable, Responsive Ubuntu UI In this section we summarise those innovations.

A. Edge Gestures

A central invention in the Ubuntu user experience (UX) is design of the role that each edge plays in the interaction of system, settings, applications and controls. In the Ubuntu UX, the layout of the screen is designed to ensure:
smooth scaling of the experience from phone, to tablet, to PC and to TV
productive touch interaction that maximises the space on the screen available for content and applications, and eliminates the need for physical or software 'system buttons'

The best expression of that design is 'edge magic'. In the Ubuntu UX, and especially in the touch versions of the Ubuntu UX, the edges of the screen play a crucial, distinctive and innovative role.

A.1 Application Launching or Switching is Driven from Left and Right Edges

A swipe in from the left edge is always used to access applications. This is easy in both phone (one-handed) and tablet (two-handed) interfaces, it offers more space for applications than the bottom edge of a phone (like WebOS) and it consumes relatively little of the screen compared to a horizontal dock at the bottom of the screen (like MacOS or Windows 7). Favourite and running applications are directly accessible through the 'Launcher' which is a vertical bar of application icons accessed through the left edge (e.g. a short swipe in from the left edge). In this document, we will refer to the Launcher as the 'Launcher', 'launcher' and 'app launcher'. More applications are reachable through the 'Home Screen' apps page (which is a grid of apps on the device, indicated which apps are running, which are closed; and also showing apps of potential relevance to the user can which can be obtained from a server). This Home Screen apps page can also be accessed directly from the left edge (e.g. by a longer swipe in from the left edge). So the left edge serves as a consistent gateway to any application. The launcher bar includes also an icon for the 'Home Screen'; the Home Screen shows icons for frequently used applications, calls the user has recently made or received (or missed, so the user can call them back easily by simply touching the item listing the missed call to directly initiate a call back to them). The Home Screen is fully customizable too, so it can include for example 'Recently Added Music'; New Film Releases; On-line Radio; Wikipedia; on-line stores etc.

A swipe in from the right edge, by contrast, accesses previously-used but still running applications. It provides a convenient way to return to the previous application. The use of opposite edges for 'switch to the next app' and 'switch back to the previous app' (namely, a swipe in from the left edge to access the Launcher bar, then the user's finger moving up or down to release on a specific app icon in the Launcher to switch to that app; conversely, a swipe in from the right edge to switch back to the previous app) is distinctive to Ubuntu and provides a usability benefit: people quickly learn the behaviour, it feels natural.

A.2 System Settings and Status are Reflected on the Top Edge

The top edge hosts a set of status indicators, and provides a means to access system-wide settings and features (typically icons for network, battery, clock and calendar, sound etc. are placed on the right side of the top edge) as well as system or system-wide capabilities (such as messaging and search; icons for these are typically placed on the left side of the top edge).

A.3 Application Controls are Accessed Through the Bottom Edge

Ubuntu uniquely defines the bottom edge of the screen as the way to access controls for the application—typically, these controls are implemented in a variety of forms, specific to each application: for example, playback controls and a timeline in a video player application; a toolbar with action buttons on an image editor application; a game menu for a gaming application, are all examples of controls that can be included in a bar, window or region that is revealed by a short swipe up from the bottom edge.

The consistent use of an edge as a gateway to application controls enables application developers to remove those controls from their interfaces by default, because users will know there is a standard way to access such controls. That has the benefit of giving more space for application content, making Ubuntu feel more spacious than previous systems on small screens like the phone.

The controls in question can be buttons, or they can be voice controls. For example, the Ubuntu HUD, which is a searchable command interface, is also invoked through the bottom edge. The HUD allows the user to access controls for an application which cannot fit into a simple touch toolbar or other chrome-based ('buttons on the screen') interface. The mechanism is called the HUD ('head-up display'), because it displays information to the user without forcing them to shift from their main focus of interest, analogous to a conventional HUD.

This document is written from the perspective of left-to-right language users. In the case or right-to-left languages, the UX might be horizontally reversed (so left becomes right).

The design of edge behaviours and conventions is one of the key innovations at the heart of Ubuntu UX innovation for touch devices. It sets Ubuntu apart from systems that have come before, even where those used the edges for other purposes. For example, the Nokia N9 used a generic edge gesture to return to the home screen, and Palm WebOS phones used the bottom edge to access favourite applications, but Ubuntu provides substantially richer patterns of use for the scarce resource of screen edges and combines them in unique ways to create a system that is more usable, with richer functionality, than any previous system.

B. Ranged Gestures

Another significant innovation in the Ubuntu UX for touch devices is the use of ranged gestures, by which we mean a gesture which can have a range of diverse outcomes depending on where it ends or how far it progresses. We don't just mean a progressive gesture, like sliding a control along a slider, where the result can be a variable. We mean a gesture which could have any number of quite different results depending on the extent of the gesture (such as, distance, length, direction, path, start-pint, end-point).

Ranged gestures are important in the Ubuntu UX because they allow a single resource, the edge of a screen, to be a gateway to a range of different outcomes or capabilities. They also allow the user to navigate through all of those capabilities in a faster and more fluid fashion, where multiple 'steps' or 'taps' or 'swipes' can be combined into a single, directed gesture by more sophisticated users.

Ranged gestures can contain stages (extending the gesture takes you through a series of modes, ending the gesture selects a particular action from the mode you are in at that point, or enables you to continue selecting with a subsequent gesture). They can also contain bifurcated pathways, where the gesture can flow in a series of different directions to expose different options.

B.1 Application Edge (Left Edge) Ranged Gestures

A swipe through the left edge is a ranged gesture with several stages.

The initial left edge swipe will simply reveal the launcher. The initial hint of the launcher can be undone by reversing the swipe back over the edge, or releasing very early in the hint. A small swipe, however, is enough to show the launcher with favourite apps. Releasing at this stage leaves the launcher visible, to be manipulated with further touches or swipes or taps.

A longer swipe will select the nearest application on the launcher (i.e. the application for the icon closest to the touch path of the user's finger, plus the Home Screen icon), and moving the contact or touch point up and down allows the user to select a particular application other than the one closest to their finger when they crossed the edge initially; an app which has been chosen (but not yet actually selected) will typically be shown with a larger icon that its neighbouring icons. This approach allows for fluid selection of an app to launch or switch to on the Launcher. Releasing the touch over a chosen icon for a specific app will select that application.

Pausing over an icon in the Launcher in the ranged gesture will show the Quicklist of that application, allowing the ranged gesture to bifurcate and pursue the items in that Quicklist. This allows for fluid access to a particular item in a particular application Quicklist in a single gesture starting with the edge swipe. A Quicklist for an application is a specific feature in an app that enables a user to rapidly access a feature or function or control for that app. For example, if the app is an e-mail messaging app, then the Quicklist could be to start composing a new e-mail message.

If, rather than pausing on an icon, the gesture ranges past the launcher to the right quickly, then a new stage is reached, which reveals the Apps page of the home screen. This stage enables access to applications which are not in the launcher (favourites or running) or not even installed.

So, ranged gestures allow the left edge to provide a comprehensive gateway to applications on the device—favourites, running, installed and not-yet-installed.

B.2 Right Edge Ranged Gesture

The right edge has a ranged gesture which controls access to the previous focused application (namely, the application the user was previously using) on touch devices such as the phone, or the tablet with visible 'side-stage' (the 'side-stage' is described more fully later in this document).

The initial stage of the gesture, swiping through the right edge, will show a hint of the previous application, or a hint that there was no previous application focused. Releasing in this early portion of the gesture would have no effect, returning the system to the state it was in before the hint—serving to prevent an unintended action—switching to a previous application.

Continuing the gesture would commit to showing that previous application as the focused app on the phone, or the focused app in the tablet 'side-stage' (see later for a description of how the 'side-stage' can display apps independently of what is shown on the rest of the display).

On a tablet where there is a side stage, the right edge swipe initially hints at the side stage, then commits to showing the side stage as an overlay, and ultimately commits to splitting the screen between main and side stages.

B.3 System (Top) Edge Ranged Gesture

The top edge provides access to system services, settings and searches, through a ranged gesture.

What is unusual about the Ubuntu UX top edge ranged gesture is that it allows very rapid and fluid access to the information that backs up the core system indicators at the top edge, right side of the screen.

On existing phones, it is difficult to interact with the system indicators. On iPhone iOS6 and earlier, you need to find and then switch to a special application, the settings app, which provides access to system settings (and, as it happens, application settings).

On Ubuntu, it is very easy to reach settings through the top edge. They are on the right of the top edge, so an initial swipe through the right part of the top edge reveals system indicators if they were off-screen (for full-screen applications) and selects the closest. That can be reversed by reversing direction and swiping back up off the screen through the top edge. At this point, the ranged gesture can be bifurcated—moving left or right (without lifting the finger) enables the selection of a particular system indicator, and moving downwards confirms the focus on the selected indicator.

This enables:

Fast access to any particular system setting or indicator,

Rapid inspection of a variety of system information (for example—'Which network am I on, and what new messages have arrived?')

In addition, the left part of the top edge is dedicated to search. So initiating the gesture on the top left of the screen provides access to a range of system search options.

B.4 Application Controls (Bottom) Edge Ranged Gesture

The bottom edge in Ubuntu provides access to and control over the application controls.

Given that applications might follow very different designs for very different purposes, the nature of those controls can vary. But in general, a bottom edge swipe should hide and reveal controls of the appropriate form for the application. Those controls might be a toolbar, or a playback control (play, pause, back, forward), or a timeline, or might involve change the status of the application (for example, pausing a game and presenting menu options).

The bottom edge also has a ranged gesture—the initial swipe through the edge hints at controls which can be reversed by changing direction and going back off the bottom edge, or releasing before the hint turns into a committed reveal of the controls. Once controls are revealed, the gesture can be continued, and new stage is revealed, which includes the ability to launch the HUD (a text and voice-searchable control system for the application). Releasing the gesture over the HUD icon, or one of the other ranged end points of the gesture, commits to that outcome.

C. The Welcome Screen

When the user turns on the device, the device provides a beautiful and refined reflection of the user and their activities in a live welcome screen, that is a data visualisation of data that is personal to the user or specific to the device.

C.1 Data Visualisation Rather than App Info or Wallpaper

It is innovative to display a data visualisation on the welcome screen. In existing phone and tablet devices, it is common to have a personal image ('wallpaper') on the lock screen, or in some cases to represent the status of an application ('5 new messages'). What is also innovative about Ubuntu is that the data visualisation can be a synthesis of data from multiple sources—from applications, online services, and the device—rendered in an artistic fashion.

The data visualisation may or may not be interactive, and may or may not trigger the launch of an application or content based on that interaction, thereby unlocking the device.

The data visualisation may be combined with or be part of a personal artwork, or wallpaper, and may draw its palette from the artwork so as to combine visualisation and wallpaper in an aesthetically pleasing way.

The data visualisation may be selectable from a range of options, or chosen randomly, or updated dynamically by the operator, OEM (or any other partner) or Ubuntu itself. It may also be possible for users to design and install their own visualisations.

D. The Unlocking Mechanism

This 'welcome screen' serves a similar purpose to the 'lock screens' found on existing phones and tablets—it prevents inadvertent disclosure of sensitive information, and it prevents inadvertent input when a device is unattended and perhaps being touched inside a handbag or pocket. However, it is distinctive and innovative in a number of ways:

In existing lock screens, the device behaves very differently when locked than when unlocked. For example, buttons that normally take you to the home screen cannot do so when the device is locked. On the Ubuntu phone and tablet, which use the edges of the screen to navigate between applications, controls and settings, the welcome screen behaves just like any other application. To 'unlock' the device you would use (namely, swipe in from) one of the edges to navigate directly to the application or setting that you want. On a traditional phone, you need to unlock before being able to do anything. On Ubuntu, you can start doing anything, and it will only ask for access control when needed.

It is possible to launch any favourite application when the welcome screen is showing. In existing lock screens, there would be a few (possibly customisable) applications that can be launched when locked, but the mechanism to launch them would be very different when locked than unlocked. For example, on the iPhone 4S there is an 'unlock' mechanism (a sliding switch) and a mechanism to launch the camera when locked, but those are completely different than the normal mechanism to launch the camera application, which takes place from the home screen. The Ubuntu approach is more consistent between locked and unlocked states.

On the Ubuntu phone and tablet, based on edge gestures, there is a clear distinction between unlocking to launch a favourite application, unlocking to the home screen, unlocking to the application which was running when the phone was locked, and unlocking to modify a system setting. On existing lock screens, 'unlocking' might take you to the home screen, or to an application, depending on what you were doing when the phone was locked.

BRIEF DESCRIPTION OF THE DRAWINGS

Implementations of the invention will be described with reference to the accompanying Figures, in which.

DETAILED DESCRIPTION

Figure 1:
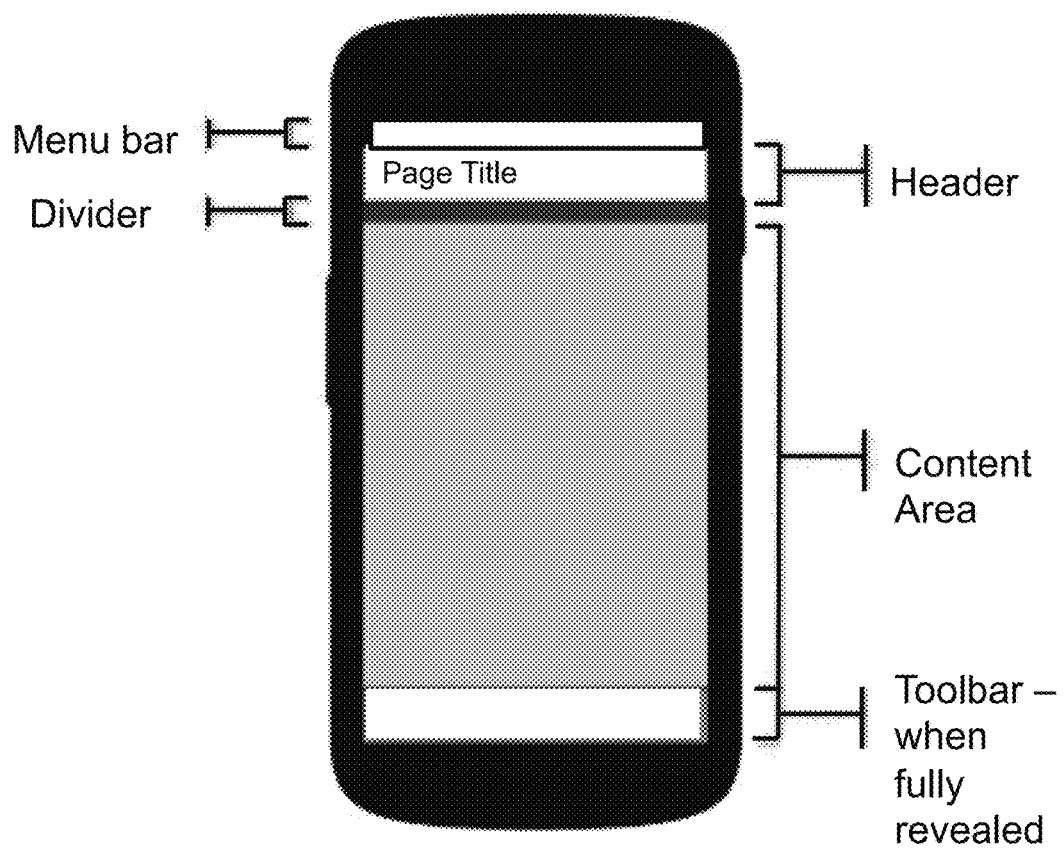
FIG. 1 shows an example of a user interface core layout for applications on the screen of a computing device.

One implementation of the invention is Ubuntu touch. This section describes in more detail Ubuntu Touch.
A.1 'Edge Gestures'

In Ubuntu, a swipe in from an edge causes the device to behave (e.g. display a user interface (UI) graphic or object or objects, open an app, open a control pane, invoke a function etc.), in a way that depends on the specific edge swiped-in from (e.g. left, right, top or bottom). The richness and intuitive simplicity of edge swipe behaviours in Ubuntu is a key element. Ubuntu uses many different gestures—where a gesture is a single touch-based interaction with the device touch screen.

One can re-cast this feature in terms of a problem and its solution. The Problem Statement is: how can you design a device interface that maximises the space on the screen available for content and applications?

Ubuntu 'edge gestures' illustrate many related solutions to this problem. For example, in Ubuntu, you swipe from the right edge to take you back to the previous app. So if you are in the Facebook app, but need to check something quickly (e.g. a diary event), it's easy to launch the diary app by a short swipe from the left edge to bring the launcher bar in from the left edge, then glide down to release on the diary app, check the event, and then do a swipe from the right edge to get back to the Facebook app. This combination of rapid opening (or tasking to) an app by swiping from the left edge, and then returning to the previous app by swiping from the right edge, makes interaction very fast, efficient and intuitive.

One can also re-cast this particular feature in terms of a problem and its solution. The Problem Statement is: how can you design a device interface that permits rapid, single handed launching of new apps and reversion to previous apps? One can generalize the solution as a smartphone, tablet or other computing device in which 'Start/launch' and 'Back' functions are controlled by swipe gestures in from opposite edges of the screen. In one implementation, Start is initiated with a swipe right from the left edge; this brings across the launcher. Conversely, a swipe from the right edge brings up previously opened apps, so acts as a 'back' function. Further swipes left from the right edge scroll the user back through all previously used apps, in the order in which they were last used.

The launcher-based unlock gives us the ability to unlock directly to the launcher to launch any favourite app; to unlock-to a quicklist (i.e. a specific feature in an app, for example, if the app is an e-mail messaging app, then the quicklist could be to start composing a new e-mail message).

Another Ubuntu feature is that at the top right of the screen are the system status and function icons, such as time and date, volume, network, messaging, battery. You can select an icon by moving your finger across the row and then swipe down from it (or touch it directly and then pull-down) to reveal a screen that lists the setting relevant to that icon, allowing you to rapidly update them without leaving the current app you are in. So for example, there is a network icon; if you swipe across to reach this network icon and then down from it, then you reveal the conventional network parameters, such as 'airplane mode', enable WiFi; check boxes for the 3G network to join and carriers to use etc. The user can rapidly check and alter any of these, without leaving the application he is in. This is different from, for example, how to reach settings on an iPhone where the user has to leave the current active app and then find the specific icon for the phones collected settings and then tap on the icon to view them. The solution implemented on the Ubuntu UI adds to the simplicity of the phone and follows the theme of the Ubuntu UI. Furthermore, it gives a more efficient user experience with the reduction of 'excise'. (Excise is the inessential work needed to reach a UX goal—it is a tax or 'excise' upon the idealised, perfect, frictionless user interaction with optimal cognitive load.

You can hide the status icons, giving 100% of the screen to an app so that you can be fully immersed in that content, by simply swiping them up. They can be revealed again by a short swipe down. This is very useful on a small screen device like a smartphone.

One can re-cast this feature in terms of a problem and its solution. The Problem Statement is: how can you enable a user to check and also alter system parameters on a phone without leaving a main app that the user is running? One can generalize the solution as a smartphone (or other personal computing device) in which the user can select a system status icon placed close to the top edge and swipe down from it (e.g. touch it directly and then pull-down) to reveal a screen that lists the setting(s) relevant to that icon, allowing the user to rapidly update the setting(s), and then swipe the settings page back up, to show the still-running current app. Equally, one could invert this approach and swipe up from the bottom edge to reveal a screen that lists the setting(s) relevant to an icon Another Ubuntu feature is how the space given over to on-screen controls for an app is optimised. In Ubuntu, these controls are placed at the bottom edge, and are only revealed by a short swipe up from the bottom edge, and then concealed by a swipe down on the controls through to the bottom edge. This design has to do with space managing and as a result ensures that 100% of the screen is devoted to the main visual experience of an app for most of the time, and the controls are rapidly and intuitively available, but only as and when needed.

This approach is used not just inside an application but also outside of applications, whether the user is viewing their home screen, welcome screen or maybe flicking through opened applications. In all cases, appropriate controls are revealed by a short swipe up from the bottom edge. Saving this space gives a cleaner, simpler look and only gives the user information that is important when specifically needed by the user.

One can re-cast this feature in terms of a problem and its solution. The Problem Statement is: how can you reconcile the need to provide app controls the user can interact with, yet not have those controls take up valuable screen real estate? One can generalize the solution as a smartphone, tablet or other computing device in which these app controls are placed at an edge (e.g. the bottom edge), but are only revealed by a short swipe up from the edge, and then concealed by a swipe down.

A.2 Re-Cap on Edge Behaviours

To re-cap on some of the key edge behaviours:

Swipe from left edge to bring up launcher; swipe further to bring up the running apps home page.

Swipe from right edge to bring up the most recent app; further swipes bring up earlier apps Swipe from top edge to bring up system status parameters for the system icons displayed on the right side of the top edge. Swipe up to hide them again Swipe from bottom edge to bring up app-specific controls and voice controlled parameters for that app. Swipe down to hide them again.

By concealing these items until a swipe reveals them, the screen is kept uncluttered and so the maximum amount of screen real-estate can be devoted to the running application. The phone itself feels larger and more spacious than phones running competing operating systems.

As noted above, some of these gestures are 'ranged gestures' (see Section C. Swiping and Ranged Gestures in Ubuntu) in that continuing the swipe will bring up further (but related) functions/screens etc.

It is possible also to speak a control input to an app (see 'HUD parameters' below); a long swipe up from the bottom edge opens the HUD search interface for that application, which is voice enabled.

A.3 Edge Interactions in the Welcome Screen

Ubuntu's comprehensive use of edge gestures—where each edge has a distinctive purpose that is consistent across all applications, and consistent whether or not the device is locked—creates a usability problem for new users, who may be unaware of the importance of the edges, their function, or how to use them. And since there is purposefully no 'chrome' (button or other visual indication of the edge) that might detract from the aesthetic and spaciousness of the interface, users have little to guide them to explore the edges.

Ubuntu implements a number of solutions to this problem:

Accelerometer-based edge hints on the welcome screen

In devices which have an accelerometer or other sensor to track movement, it is possible to show a visual hint on the edges of the screen when the phone moves. For example, shaking the phone might show a small portion of the launcher on the left edge of the screen, as if it were 'loose' just off the screen, and shaking was allowing it to 'jiggle' slightly onto the screen. Similar hints could draw the user's attention to the right, bottom and top edges, each of which has a specific purpose in the Ubuntu user experience.

Help launched by touch exploration

When confronted with a 'blank' or 'buttonless' welcome screen, users will often touch the image or data visualisation, or swipe, tap, or rub the welcome screen, in order to see what happens. It is undesirable for such gestures to unlock the screen, as that might allow inadvertent unlocking. Ubuntu's design solves this problem by showing a progress bar measuring the number of such gestures, with full completion triggering a 'help' experience that familiarises the user with the edge-driven Ubuntu experience, including the ability to play an 'edge learning' game.

Edge-learning game

One way to familiarise users with the edge-based user experience is to offer a game, which may be launched from the help experience, which encourages users to use the edges in the way that they will need to in order to make the most of the device.

A.4 Main Edge Gesture Concepts

In this section, we summarise the main 'Edge Gesture' concepts. They are as follows:

A smartphone, tablet or other computing device comprising:

(a) a touch sensitive display;
(b) one or more processors;
(c) computer memory;
(d) one or more computer programs stored in the computer memory and configured to be executed by the one or more processors and including instructions for detecting a swipe in from each and any of the four edges of the touch sensitive display and, in response to the detected swipe, causing the device to behave in a manner that depends on the specific edge swiped-in from (e.g. left, right, top or bottom).

Other optional implementation features include the following, each of which may be combined with any other feature:

the device behaves in a manner that depends on the specific edge swiped-in from, by displaying a specific type of UI graphic, object, or set of objects that depends on the edge swiped in from.

the device always responds to the detected swipe in a consistent manner, irrespective of what the device is displaying.

the device detects a swipe in from one edge of the screen and, in response to the detected swipe, causes the device to, either directly or after further intervening steps, open an app launcher, being a set or group of app icons, or start or switch to an app.

the device detects a swipe in from an edge of the screen and, in response to the detected swipe, causes the device to switch back to a previously opened app.

the device, in response to a swipe in from the left edge, the device opens, either directly or after further intervening steps, an app and, in response to a swipe in from the right edge, the device displays, either directly or after further intervening steps, previously used but still running apps.

if the device is displaying a welcome screen, then in response to a swipe in from the right edge, the device displays, either directly or after further intervening steps, the device home page.

'start' is initiated with a swipe right from the left edge to bring across an application launcher; and conversely, a swipe left from the right edge brings up previously opened apps, so acts as a 'back' function.

in response to further swipes left from the right edge, the instructions cause the device to scroll back through all previously used apps, in the order in which they were last used.

the device can detect when a user selects a system status icon placed close to one edge and in response to a swipe away from the icon, (e.g. the user touches it directly and then pulls-down) the instructions cause the device to reveal a screen that lists the setting(s) relevant to that icon, allowing the user to rapidly update the setting(s) and then swipe the settings page back to the edge, to show the still-running current app. The system status icon may be placed at the top edge of the display, such as on the right side of the top edge.

the instructions cause the device to display app controls in response to a short swipe up from an edge, and the app controls are displayed close to that edge whilst the app is running and controlling the device display, and the app controls are concealed by a swipe back to the edge. The app controls may be placed at the bottom edge of the display.

in response to a swipe from a message icon, such as an envelope, the instructions cause the device to display a panel or window or region listing one or more messages.

in response to a user selecting a message in the panel, window or region listing the message(s), then a response panel, window or region is displayed.

if the selected message is for a missed call alert, then the response panel, window or region includes buttons or icons that enable the user to do one or more of: make a call back to the person who left the message; write and send a reply message to that person; select and send a pre-made reply to that person.

in response to detecting a user pausing over an icon for an app in the app launcher, the device displays a 'quicklist' for that app, being one or more user interface objects associated with a feature or function or control for that app.

a swipe in from an edge must commence at the edge of or outside, the touch-screen display.

the device includes an accelerometer and the processor receives movement signals from the accelerometer and in response to those signals beyond a threshold shows a small portion of a different screen from the screen currently being displayed as a hint to the user. The threshold may be associated with shaking the device.

Other aspects are:

A method comprising the following steps, performed at a computing device with a touch sensitive display:
(i) detecting a swipe in from each and any of the four edges of the touch sensitive display and, in response to the detected swipe;
(ii) causing the device to behave in a manner that depends on the specific edge swiped-in from (e.g. left, right, top or bottom).

the device behaves in a manner that depends on the specific edge swiped-in from, by displaying a specific type of UI graphic, object, or set of objects that depends on the edge swiped in from.

A non-transitory computer readable storage medium storing one or more programs, the one or more programs comprising instructions, which when executed by a computing device with a touch-sensitive display, cause the device to:
(i) detect a swipe in from each and any of the four edges of the touch sensitive display and, in response to the detected swipe;
(ii) behave in a manner that depends on the specific edge swiped-in from (e.g. left, right, top or bottom).

A smartphone, tablet or other computing device comprising:
(a) a touch sensitive display;
(b) one or more processors;
(c) computer memory;
(d) one or more computer programs stored in the computer memory and configured to be executed by the one or more processors and including instructions for detecting a swipe in from any two opposite edges of the touch sensitive display and, in response to the detected swipe, causing the device to behave in a manner that depends on the specific edge swiped-in from;
and in which, in response to a swipe in from the left edge, the device opens, either directly or after further intervening steps, an app and, in response to a swipe in from the right edge, the device displays, either directly or after further intervening steps, previously used but still running apps.

'start' is initiated with a swipe right from the left edge to bring across an application launcher, from the left edge.

in response to further swipes left from the right edge, the device scrolls back through all previously used apps, in the order in which they were last used.

'start' is initiated with a swipe right from the left edge to bring across an application launcher; and conversely, a swipe left from the right edge brings up previously opened apps, so acts as a 'back' function.

a swipe in from an edge must commence at the edge of, or outside, the touch-screen display.

in response to detecting the swipe, two or more different outcomes or functions to be triggered or invoked, depending on the detected extent of the swipe. The detected extent may be a function of one or more of the following: parameters of the swipe: distance, length, direction, path, end-point or destination).

a swipe from an edge causes a first outcome, and if the user continues to swipe in from that edge, that leads to a different outcome. The two or more different outcomes or functions are typically related or connected outcomes.

if the swipe continues to a predefined region on the screen to select that region, then a specific outcome results.

detecting a continuance of the swipe in from the left edge further to the right, causes the device to display a home screen that includes icons for all the running apps.

a release up from the touch screen is a commit gesture.

a swipe involves the user's fingers continuously contacting the touch screen, moving across the screen in one or more directions.

A method comprising the following steps, performed at a computing device with a touch sensitive display:
(i) detecting a swipe in from any two opposite edges of the touch sensitive display and, in response to the detected swipe, causing the device to behave in a manner that depends on the specific edge swiped-in from;
(ii) and in which, in response to a swipe in from the left edge, the device opens, either directly or after further intervening steps, an app and, in response to a swipe in from the right edge, the device displays, either directly or after further intervening steps, previously used but still running apps.

B.1 Ranged Gestures

Ubuntu uniquely organises sets of actions into "ranged gestures", so you can access multiple actions from a particular gesture, based on how much of that gesture you complete.

Often, there is a collection of actions that are related, for example:
show the launcher;
show a particular item in the launcher
show a quicklist for a particular item in the launcher
show all the apps which are running
show all the apps which are installed and available.

Each of those actions is associated with one or more applications. In Ubuntu, a swipe through the left edge can take you to each of those actions, depending on how much of it you do. The actions are organised as a "ranged gesture". An initial swipe through the left edge reveals the launcher (which shows icons for all running and favourite apps), continuing that gesture allows you to select a particular item on the launcher (to launch or switch to), pausing a touch over an icon for an app opens a quicklist for that app, and continuing further to the right (in the same fluid gesture)

shows all the installed apps (these are shown as part of the "apps" page of the home screen; the home screen also shows available but not yet installed apps).

The way most conventional touch interfaces work is that one gesture or movement on the screen means one and one thing only, for example on iPhone to slide ones finger from left to right or from right to left lets the user flick through her pages of applications. Ubuntu has done something different and combined several meanings into one gesture. The outcome of the gesture depends on how much of the gesture is completed.

Like the case of removing the unlock feature of the phone, having ranged gestures removes excise. As a result, not only fewer steps are taken but also the amount of time to reach a specific view is reduced. Compared to how for example iPhones and Android phones work where there are several steps to reach different views, on the Ubuntu UI there is only one step to reach several different views, and therefore, excise has been reduced when starting an application, when changing from Welcome Screen to any other view and when swapping between applications; all this can be done in one single gesture.

From any view of the phone, in one move, an application can be found and launched. When having found a desired application with the help of a ranged gesture, simply by releasing the finger on top of the application icon will initiate its launch. This is different from other phones as for example iPhone, Windows 8 and Android require a single tap on the application icon in order to launch it, there would be no other gesture in order to launch an application on these phones.

With the help of ranged gestures, physical buttons on the phone are no longer necessary and can therefore be removed. Using iPhone as an example, which has only one button which lets the user go back to the home screen or to swap between apps, this is no longer a necessity to Ubuntu as all these things can be done with a simple stroke of one's finger.

In Ubuntu, there are three distinct forms of ranged gesture:

Progressive unselective gesture—as the gesture progresses, different outcomes or results are triggered; the specific region on the screen where the user terminates the gesture is not critical.

Progressive selective gesture as the gesture progresses, different outcomes or results are triggered; the specific region on the screen where the user terminates the gesture is critical—e.g. if the user progresses to and selects a specific region, then a specific result is triggered.

Selective gesture

One can re-cast this feature in terms of a problem and its solution. The Problem Statement is: there are more interesting "actions" than there are simple and memorable gestures, so how can we design an effective touch-centric interface? One can generalize the solution as a smartphone (or other personal computing device) in which a gestural input depends on the extent (e.g. distance, length, direction, path, start-point, end-point or destination) of a single gesture, with different (but typically connected) outcomes triggered depending on that extent.

Ranged gestures can be accompanied by a shrinking down of the page that is being passed over—e.g. as you swipe left to the right edge, the apps page minimizes in size as you continue the swipe.

B.2 Main Ranged Gesture Concepts

In this section, we summarise the main 'Ranged Gesture' concepts. They are as follows:

A smartphone, tablet or other computing device comprising:
(a) a touch sensitive display;
(b) one or more processors;
(c) computer memory;
(d) one or more computer programs stored in the computer memory and configured to be executed by the one or more processors and including instructions for detecting a single gestural input, and, in response to detecting the single gestural input, causing two or more different outcomes or functions to be triggered or invoked, depending on the detected extent of the gestural input.

Other optional implementation features include the following, each of which may be combined with any other feature:

the detected extent is a function of one or more of the following: parameters of the gestural input: distance, length, direction, path, end-point or destination)

the gestural input is a swipe from an edge.

a swipe from an edge causes a first outcome, and if the user continues to swipe in from that edge, that leads to a different outcome.

the two or more different outcomes or functions are related or connected outcomes.

if the gestural input continues to a predefined region on the screen to select that region, then a specific outcome results.

a swipe from one edge causes a different outcome compared with a swipe from a different edge.

detecting a short swipe from the left edge causes the device to display or reveal the app launcher, which is a set of app icons.

detecting a continuance of the short swipe further to the right, causes the device to display a home screen that includes icons for all the running apps.

a short swipe away from a system information icon for a system information function causes a pane, window or region relating to the system information function to be displayed, and continuing that swipe expands the pane, window or region to include user-selectable parameters for that function. The system information icon may be at the top edge, right side.

a short swipe from an edge when an app is open causes functions relating to that app to be displayed, and continuing that swipe to select a defined target region causes a search function to be invoked. The short swipe may be a swipe up from the bottom edge.

the device is a tablet device and in which a short swipe from an edge causes a region (the 'side-stage') to be displayed, the side-stage being a region that can display any of apps, utilities or functions independently of what is displayed on the rest of the screen, and continuing that swipe causes a previously opened app to be displayed. The short swipe may be from the right edge.

in response to detecting a user pausing over an icon for an app in the app launcher, the device displays a 'quicklist' for that app, being one or more user interface objects associated with a feature or function or control for that app.

a release up from the touch screen is a commit gesture.

a single gestural input involves the user's fingers continuously contacting the touch screen, moving across the screen in one or more directions.

Other aspects are:

A method comprising the following steps, performed at a computing device with a touch sensitive display:

(a) detecting a single gestural input, and, in response to detecting the single gestural input;

(b) causing two or more different outcomes or functions to be triggered or invoked, depending on the detected extent of the gestural input.

A non-transitory computer readable storage medium storing one or more programs, the one or more programs comprising instructions, which when executed by a computing device with a touch-sensitive display, cause the device to:

(a) detect a single gestural input, and, in response to detecting the single gestural input;

(b) cause two or more different outcomes or functions to be triggered or invoked, depending on the detected extent of the gestural input.

C.1 The Welcome Screen

This welcome screen is a pictorial data visualisation or infographic that graphically shows data that is personal to a user; in one implementation it is a circular arrangement of a large number of dots, e.g. 30 small white dots, each representing an activity or state (user-selectable or customizable), in which activity associated with a specific dot is represented by the size of a semi-translucent circle adjacent to the dot. The overall impression is of something organic, not unlike a flower.

Dots can relate to items like the number of tweets received, e-mails received, distance walked today; number of minutes of talk time left; hours left at rest, etc. There are various ways the data visualisation may work. For example, the system may cycle through the different dots every few seconds, labelling the meaning of the current dot with a short textual description inside the circle and subtly altering the colour palette used whenever it moves from one dot to the next. Or each dot may represent a particular day of the month, and the screen may cycle through different variables for today's dot every few seconds, or longer.

The welcome screen is hence regularly evolving and updating itself and the appearance is totally personal and unique to a specific user—particularly because the size of each overlapping translucent circle associated with a specific dot is specific to a particular user at a particular time. But this welcome screen is designed to not overwhelm the user with information (unlike, arguably, other operating systems such as Windows Phone), not least because the core information content, specifically the size of the circle that is related to any given dot, is graphical and non-textual and can hence be understood very rapidly, unlike tile-based systems such as Windows Phone and Windows 8, which fundamentally deliver information through text, as opposed to graphics. With a preserved simple interface the Ubuntu Phone Welcome screen still manages to show a lot more information than for example the welcome screen of an iPhone.

The Ubuntu Welcome Screen therefore manages to visually capture a lot of data without using much text, making the intake of information easier to comprehend and therefore making it faster for the user to get an overview of interesting and important data with minimal cognitive load. This can be compared to the iPhone screen where random notifications are put one after the other in a list, making it tedious and slow to know what important information the screen actually contains.

The default Ubuntu Welcome screen takes advantage of the power of visual recognition. The eye will quickly learn where on the screen certain information is found and which graphical circles represent what data. In this way, for a fast overview, the user of the phone saves time by not having to read at all but merely recognize the different sized circles on the screen.

One can re-cast this feature in terms of a problem and its solution. The Problem Statement is: How do you provide users with rapidly understandable, key performance or status information for multiple parameters for their phone, without requiring users to touch-interact with their phone in any way?

One can generalize the solution as a smartphone, tablet or other computing device which displays a welcome screen with a (potentially dynamic) infographic or a (potentially dynamic) data visualization that represents each of a number of variables relating to the device or one or more of its users. The variables may be a synthesis of data from multiple sources, applications, online services, and the device).

One implementation is a smartphone, tablet, or other personal computing device which displays a welcome screen with a dynamic data visualisation or infographic that graphically represents each of a number of variables relating to the status of the device (such as number of tweets received, e-mails received, distance walked today; number of minutes of talk time left; hours left at rest, or anything else of interest to the user) by assigning to each variable (a) a position in a geometric or other figure or figures and (b) a shape, proximate to the variable's position in the figure(s), whose size varies with the value of the variable.

In one implementation, the geometric figure is a circle and each shape is a portion of a (typically shaded) circle, like the head and petals of a flower; hence, if the user has received 10 tweets, but 20 e-mails, then the portion of the shaded circle associated with the tweets will be smaller than that associated with the e-mails. And as a tweet is received, then, the size of the associated shaded circle will grow; FaceBook comments could be another variable; a large number of FaceBook comments will be rewarded with a rapid inflation of the associated shaded circle. Many other data visualisation variants are possible.

Likewise, the user will rapidly become familiar with the position in the geometric figure (e.g. circle) of different variables—for example, the remaining talk-time variable might be a dot positioned at the very top of the circle and so the user will quickly learn to glance at the size of the shape associated with that variable to get a sense of the amount of remaining talk-time. In Apple iOS, for example, this information is only accessible after numerous interaction steps (unlock phone, locate and select 'Settings' icon, locate and select 'General' option, locate and select 'Usage' option).

Ubuntu is designed to be a multi-user platform, and the Ubuntu designs for phone and tablet express that by enabling user switching on the welcome screen. On the tablet, users are shown as a list, together with an anonymous guest account. On the phone, a list of users can be shown on demand (for example, using the bottom edge of the welcome screen). In this way, a single device can support both multiple users and also multiple user accounts for separate purposes, such as work and home.

The first glimpse of a new interface can be critical to that interface's acceptance by a broad user base: this welcome screen provides a playful, intriguing and inviting interface that users want to explore further; it is the first step in drawing users into engagement with the device. It allows the user, with a quick glance, to understand the status of key variables associated with the phone.

C.2 Main Welcome Screen Concepts

In this section, we summarise the main Welcome Screen concepts. They are as follows:

A smartphone, tablet or other computing device comprising:
(a) a touch sensitive display;
(b) one or more processors;
(c) computer memory;
(d) one or more computer programs stored in the computer memory and configured to be executed by the one or more processors and including instructions for displaying a welcome screen with a pictorial infographic or a data visualization that graphically represents each of a number of variables relating to the device or one or more of its users.

Other optional implementation features include the following, each of which may be combined with any other feature:

the infographic or data visualisation is dynamic.
the infographic or data visualisation dynamically updates in real-time
the variables are a synthesis of data from multiple sources, applications, online services, and the device.
the data visualisation is personal and unique to the user of the device.
the data visualisation is specific to a particular time period, such as each day over a month.
the data visualisation cycles, or can be cycled, to cover different types of variable.
the variables include one or more of the following: number of tweets received, e-mails received, distance walked today; number of minutes of talk time left; hours left at rest, or anything else of interest to the user.
a user can define different activities and states to include in the welcome screen.
the device graphically represents each of a number of variables by assigning to each variable a position, shape, space or volume in a geometric or other figure or figures.
the device graphically represents each of a number of variables by assigning to each variable a shape, whose size varies with the value of the variable.
the device graphically represents each of a number of variables by assigning to each variable a colour, that alters or varies in tone with the value of the variable.
the geometric figure is a circle and each shape is a portion of a shaded circle.
the data visualisation is personal and unique to a specific user at a specific time.
the data visualisation is personal and unique to a specific user at a specific time and also place.
the welcome screen is the default screen that is shown after the device has been idle for a predefined time period or is first switched on and it is not a home screen.
the infographic or data visualisation graphically represents each of a number of variables relating to the device (such as number of tweets received, e-mails received, distance walked today; number of minutes of talk time left; hours left at rest, or anything else of interest to the user) by assigning to each variable (a) a position in a geometric or other figure or figures and (b) a shape, proximate to the variable's position in the figure(s), whose size varies with the value of the variable.
a swipe in from an edge unlocks the phone or enables the phone to be accessed and in addition causes the device to behave (e.g. display a screen or part of a screen, or invoke a function) in a way that depends on the specific edge swiped-in from (e.g. left, right, top or bottom).
a user can unlock to the previous used state, i.e. the state before the device was locked, in the welcome screen by swiping from the right edge and then, depending on user settings, the device will then prompt for a pincode or passphrase before letting the user in.
from the welcome screen, the user can swipe from the left edge to reveal the launcher, showing favourite and running apps which can be launched directly, and, depending on the application that was launched may or may not prompt for a pincode or passphrase to use.
launching a camera app does not require a pincode or other authentication to be entered, while an email client does.
from the welcome screen, the user can swipe from the right edge to bring up a home page.
when the welcome screen is shown, the user can swipe down from the top to reveal system indicators.

Other aspects are:

A method comprising the following steps, performed at a computing device with a touch sensitive display:
(a) displaying a welcome screen with a pictorial infographic or a data visualization that graphically represents each of a number of variables relating to the device or one or more of its users.

A non-transitory computer readable storage medium storing one or more programs, the one or more programs comprising instructions, which when executed by a computing device with a touch-sensitive display, cause the device to:
display a welcome screen with a pictorial infographic or a data visualization that graphically represents each of a number of variables relating to relating to the device or one or more of its users.

D.1 The Unlocking Mechanism

Conventional phone interfaces require a specific lock screen—specifically, a screen that the phone reverts to displaying when the phone is not in use; the lock screen displays a lock of some sort that can be unlocked through a deliberate gesture by the user (in Apple iOS, the lock screen includes a 'slide to unlock' small white rectangle that the user slides along a channel to unlock the device). The lock screen hence prevents inadvertent use of the phone and is regarded as an essential requirement.

But Ubuntu has no need for a dedicated lock screen because edges of the screen in an Ubuntu can have a specific purpose: swiping from an edge not only acts to unlock the phone, but also to initiate another useful process that enables fast and efficient use of the device. So with Ubuntu, after the device reverts to a locked state (for example, displaying the welcome screen), there is no dedicated lock screen as such—inadvertent activation is unlikely to occur since it would require a swipe from an edge to unlock the device. Instead, the device can be unlocked simply by swiping from an edge.

User can "unlock" to the previous used state (before the device was locked) in the welcome screen by swiping from the right edge—depending on user settings this will prompt for a pincode or passphrase before letting the user in. It is also possible to integrate biometric identification (e.g. voice or fingerprint—if a fingerprint sensor is integrated into the front face of the device, then the user can swipe his finger over the fingerprint sensor, and continue to swipe in from the left edge to open the launcher, all in one single, fluid action.

Additionally, from the welcome screen the user can swipe from the left to reveal the launcher (with favourite and running apps) which can be launched directly, and (depending on the application that was launched) may or may not prompt for a pincode or passphrase to use. For instance, launching a camera app may not require pincode, while an email client would.

Additionally when in the welcome screen, the user can swipe from the top to reveal system indicators. Some of these may again prompt for pincode or passphrase to get full access to them.

Hence, from the welcome screen, a short swipe from the left edge brings up all your favourite apps as a column of app icons in the Launcher; you can glide your finger up and down the column of app icons in the launcher bar and release on the app you want to launch, thereby unlocking the device and launching the app in question. This launcher bar may also include non-favourite but running apps, to give quick access to them (once the app is no longer running, then it disappears from the launcher bar). Also, if there is insufficient space to show all favourite and running apps, then the non-favourite apps are shown as a stack of icons, which the user can drag up to expand, much like an accordion.

The most important unlock action is therefore a short swipe in from the left to drag open the launcher bar and a glide up or down this launcher bar to the desired app, and then a release to commit. It's just one single fluid action, with the finger kept on the screen until you release over the icon for the app you wish to launch, or the home screen icon.

Swipes from other edges can unlock too: A short swipe in from the right edge unlocks the phone and brings up the last app the user was working on (a degree of security will then be imposed—for example, if the last app was designated as a low security app, say a music player, then that app could be immediately opened; for more sensitive apps, such as a contacts list, then some user authentication would be required to proceed to that app).

A short swipe down through the top right edge provides access to system settings and status. The user can for example swipe through the top edge to invoke system settings, then glide sideways left or right to select the 'network' icon from the various system information icons on the top right edge and then swipe down to reveal the 'network' parameter information which the user can then access, all without lifting their finger—a single, fluid gesture.

Other system information icons on the top right include: messages (allowing the user to select a message by tapping on that message and then call back or message back directly by tapping a 'call back' or a 'message' button); sound (allowing the user to mute or vary volume); battery (allowing the user to see the charge remaining and alter screen brightness).

The design choices of how to unlock the phone go hand in hand with the elegant and simple design of the Ubuntu Welcome Screen as well as the whole Ubuntu experience. The approach here is that less is indeed more.

As mentioned previously, a difference compared to other smart phones is the absence of something on the welcome screen that is movable and in a sense asking to be interacted with. Compared to for example iPhone where the user has to swipe an interactive bar from left to right in order to unlock the phone, with the new Ubuntu this kind of visualization of an unlock mechanic is no longer necessary. Any kind of unlock looking object in the UI has been removed and instead Ubuntu takes advantage of the different edges of the screen in order to reach other views on the phone. In this way the Ubuntu UI takes full advantage of the screen space and removes the intermediary step of having to perform a specific task in order to unlock the phone.

The use of an edge to reach other views of the phone might sound similar to how Android (from 2010) unlocks their phone, by dragging a finger down on the screen which in turn opens up a new window; or how the Windows 8 phone unlocks by a short flick on the screen in an upward direction. One key difference with the Ubuntu phone is that any edge of the phone can be used, not only pulling the finger down or with a short flick in one direction; and each edge swipe unlocks to a different state (e.g. swipe from the left edge unlocks to a favourite app via the launcher; swipe from the right edge unlocks to the previous app.)

So there is no need for a distinct lock screen with an associated unlock movement, because the unlock movement in Ubuntu Phone is simply a swipe in from an edge.

We can compare this process more formally against Apple iOS 6 and earlier, in which a user first unlocks the screen by (i) touching down and then (ii) dragging the unlock white rectangle along its channel and then (iii) releasing to unlock, with the phone then optionally displaying a keypad the user has to (iv) enter his numeric passcode grid into, at which point (v) the device displays a grid of available apps, and the user then (vi) taps the desired app icon to open the app (or, if that app icon is not immediately visible, the user has to (vii) swipe through successive pages of icons until he finds the desired icon).

So in Apple iOS, there are typically six or seven discrete steps separating the user from a phone in a locked state, to one with the desired app open and running. But with Ubuntu, there is just a single fluid movement of the finger across the phone surface to unlock the phone, to open the launcher of your favourite apps and to then select the desired app, with an optional keypad for authentication. This is far faster and can also be done single-handed, with a thumb or finger swiping and gliding.

So Ubuntu uniquely offers its full launcher from the default screen (e.g. the screen shown when there has been no activity for a defined time—specifically, the welcome screen of the phone). That means you can unlock and go to any favourite application directly (and with a single gesture). On previous phones, you needed to unlock and then pick and peck a favourite app to launch. Some lock screens have had dedicated shortcuts to get you to the camera or a similar vendor-selected app set, but Ubuntu is the first to offer all the user's favourite apps directly from the default (e.g. welcome) screen.

The fact that Ubuntu has a launcher bar for the user's favourite apps is also something that may reduce excise ('excise' is the inessential work needed to reach a UX goal—it is a tax or 'excise' upon the idealised, perfect, frictionless user interaction with optimal cognitive load). Having had a phone for a while, a user might end up with several pages of different applications, making it easy to forget which application can be found on which page. By having a favourite apps section on the phone a user can quickly and easily open the application she wants.

Ubuntu also offers "Quicklist" menus for each item on the launcher. These items are also available directly from the lock screen, making it possible to go directly to a particular screen of any favourite item in the launcher without having to first unlock the device, then choose the item, then choose the screen or action for that item. From a usability perspective, this speaks once again to the efficiency, simplicity and reduction of excise on the phone.

Furthermore, on other devices it is always the same view being shown when having unlocked the phone; either the home view or the view which was active when turning off the screen. On Ubuntu this is not the case. Due to having removed the extra procedure of having to unlock the phone, different views can be accessed in the same way as if the phone was not locked at all. As a result, the Ubuntu phone lets the user immediately reach the view they want, saving several unnecessary intermediate steps hence removing excise by swiping in from the appropriate edge (and with the appropriate length or extent of swipe if a 'ranged gesture is used).

One can re-cast the unlock feature in terms of a problem and its solution. The Problem Statement is: how do you enable users to go as quickly as possible to a favourite application on their phone from the lock screen of the phone? One can generalize the solution as a smartphone (or other personal computing device) in which a swipe in from an edge unlocks the phone and also causes the device to display content (e.g. an app launcher bar, a home screen, one or more apps) that the user can then immediately interact with.

In one implementation, a short swipe in from the left edge will open the launcher bar (which features the user's favourite apps) and the user can then glide his finger up or down this launcher bar to the desired app, and then commit to (e.g. by releasing on) the desired app to launch that app. This approach works for apps that do not require any user authentication, such as a browser. For other apps, e.g. Facebook, the user will have to authenticate in the normal manner before entering the app.

One interaction feature we have described in this section is how a short swipe in from the left edge brings up the launcher bar, but if the user continues the swipe in from the left edge, then the launcher disappears and the apps section of the Home screen is shown instead. This is an example of what we call a 'ranged gesture'.

D.2 Main Unlocking Mechanism Concepts

In this section, we summarise the main Unlocking Mechanism concepts.

They are as follows:

A smartphone, tablet or other computing device comprising:
(a) a touch sensitive display;
(b) one or more processors;
(c) computer memory;
(d) one or more computer programs stored in the computer memory and configured to be executed by the one or more processors and including instructions for detecting a swipe in from one or more edges and then unlocking or making accessible the device from a screen in response to the detected swipe.

Other optional implementation features include the following, each of which may be combined with any other feature:
- the screen the device is unlocked from is a welcome screen.
- a user can unlock to the previous used state, i.e. the state before the device was locked, in the welcome screen by swiping from one edge, such as the right edge.
- depending on user settings, swiping from the edge will prompt for a pincode or passphrase before letting the user in.
- from the welcome screen, the user can swipe from an edge, such as the left edge, to reveal the launcher, showing favourite and running apps which can be launched directly, and, depending on the application that was launched may or may not prompt for a pincode or passphrase to use.
- launching a camera app does not require a pincode or other authentication to be entered, while an email client does.
- when the welcome screen is shown, the user can swipe from an edge, such as a swipe down from the top edge, to reveal system indicators.
- the device can be accessed or unlocked from at least the welcome screen, using a swipe in from one or more edges that can be continued in a single gesture to directly open any app in a collection of favourite apps.
- there is no dedicated, specific unlock action that serves solely to unlock or access the device, but instead each and any unlock or access action serves not only to unlock or access the device, but also a second purpose.
- the second purpose may be one of the following: open an app launcher; open a home screen or the apps page of a home screen; open a search bar; display information relating to one or more system information functions; display app-specific functions or icons; display previously opened screen.
- there is no general access control interaction to unlock or access the device, but instead an access control interaction is required only for those functions, settings or apps that specifically require it.
- there are multiple functions, settings or apps that do not require an access control interaction and which can be opened or invoked solely using a swipe-in from an edge gesture, irrespective of the state the device is in.
- a UI graphic displayed after unlocking is one of the following: an app launcher bar, a home screen, one or more apps, system icons, app related functions.
- a short swipe in from the left edge will open the launcher bar, which features at least the user's favourite apps, and the user can then glide his finger up or down this launcher bar to the desired app, and then commit to (e.g. by releasing on) the desired app to launch that app.
- the launcher bar includes the user's favourite apps and also all running apps.
- a swipe from any two or more different edges will unlock from any screen.
- a swipe from any three or more different edges will unlock from any screen.
- a swipe from any of the four edges will unlock from any screen.
- a single gesture directly opens an app from the locked screen with a single touch and release movement across the screen.
- multiple public (e.g. not password locked) apps, such as browser, camera etc., can be opened with a single gesture (e.g. touch and release movement).
- a quicklist item for one or more items can be opened with a single touch and release movement, the quicklist for an application being a specific feature in an app that enables a user to rapidly access a feature or function or control for that app.
- the device unlocks to different states depending on which edge you unlock from.
- unlocking is to system information comprising a list of messages, hence allowing the user to select a message by tapping on that message and then call back or message back directly by tapping a 'call back' or a 'message' button.
- unlocking is to system information comprising sound parameters, hence allowing the user to mute or vary volume.

unlocking is to system information comprising battery parameters, hence allowing the user to see the charge remaining and alter screen brightness.

a swipe in from an edge unlocks the device or enables the device to be accessed and in addition causes the device to display graphical user interface objects that depend on the specific edge swiped-in from (e.g. left, right, top or bottom).

Other aspects are:

A method comprising the following steps, performed at a computing device with a touch sensitive display: detecting a swipe in from one or more edges and then unlocking or making accessible the device from a screen in response to the detected swipe.

A non-transitory computer readable storage medium storing one or more programs, the one or more programs comprising instructions, which when executed by a computing device with a touch-sensitive display, cause the device to detect a swipe in from one or more edges and then unlocking or making accessible the device from a screen in response to the detected swipe.

E.1 The Ubuntu Search Experience

Search for content and applications, both online and on the device, is central to the Ubuntu UX. Searching takes place through the Home screen, which is a front-end for a range of search and data presentation tools, called 'Scopes'.

The Ubuntu search experience can be accessed from any page of the Home screen, which accesses the search for the Scope that is driving that page. The Home page of the home screen is a universal search system, by default, that will conduct an intelligent search across all the available search scopes. So the Home page on the home screen will find anything on the device or on-line (e.g. in on-line merchants stores, if appropriate; if the phone is supplied by a network operator, then the search could also surface matches from the operator's own store or associated merchants). It is a global search, covering e.g. apps, content, locally stored files, remotely stored files across a network, products and services from third parties.

Ubuntu will itself figure out what you are looking for and where best to search. So if you type in 'Tolkien' into the search bar, then a remote server to which the phone, tablet etc is connected, will return videos to buy for 'The Hobbit' and 'The Lord of the Rings'. The Home Screen can show local cinemas showing those films; the Home Screen can also show the books by Tolkien too. For each of these, a user can tap to select and be taken to an online merchant's website to complete the purchase, or the system can be configured to initiate the purchase with a tap to a 'buy' button on screen. Another variant displays to the user books etc from different online merchants, so the user can choose which merchant to buy from.

All of the results are now in one place, intelligently and automatically categorized, and all are located by the Ubuntu operating system, as opposed to an app like a browser. This is functionality that for example an operator can be sure will be provided to its customers with 100% confidence, since it is an integral part of the operating system unlike say even a very widely used search engine like Google running in a widely used browser like Safari—which will not in any event intelligently and automatically categorise hits into categories relevant for a mobile search (Ubuntu also uses location based filters so, for example, you are presented only with cinemas showing Tolkien films that are reasonably close to your current location—any other shopping, eating, drinking, cultural and entertainment results can also be location filtered by Ubuntu as well).

Ubuntu's search bar or tool is, due to its ease of access on the Home Screen, a convenient tool from a user's perspective. The term 'bar' will be used to refer to any search related screen or tool, including one that solely receives user inputs defining a search, and/or one that shows or surfaces results. It is not limited to a screen or tool that has a bar-shaped data input field.

Ubuntu's UI makes the search tool more efficient as there is only one step to reach it no matter what application is currently focused—a swipe down through the left part of the top edge always invokes the search experience. It is a ranged gesture that enables the selection of a particular search scope (by default, the Home scope is used, which searches everything).

The user types in what to search for and Ubuntu takes care of the rest. This can be compared to, for example, iOS where reaching the search tool can be several steps such as pressing the home button twice or flicking through several pages of apps before reaching the page with the actual tool. Having typed in what to search for, on iPhone, an additional step must be made if the user wants to search for something online.

The Ubuntu UX is clean and simple but beneath the surface, it's essentially a PC, so the full range of Ubuntu services are available. For instance, every app has the cloud built-in (with Ubuntu One) so all photos and settings are backed-up automatically, all music is backed up and searchable and available online from any Ubuntu device you log into; you can share content through the web with just one tap.

E.2 The Ubuntu HUD Search Bar

The Ubuntu HUD is a distinctive and innovative mechanism to support complex controls on touch applications in Ubuntu. It is largely a search-driven experience, it allows the user to access controls for the application which cannot fit into a simple touch toolbar or other chrome-based ('buttons on the screen') interface.

The mechanism is called the HUD ('head-up display'), because it displays information to the user without forcing them to shift from their main focus of interest, analogous to a conventional HUD.

The HUD can be invoked through the bottom edge ranged gesture. That is consistent with Ubuntu's use of the bottom edge for application controls, because the HUD is an extension of the visible ('chrome') application controls that are also accessed through the bottom edge.

The HUD presents recent actions in the form of a history of the latest or most-popular actions, frequent actions in the form of a toolbar, some standard actions such as 'quit', 'undo' and 'app settings'. It also presents a search capability, which allows for intent-driven exploration of the app capabilities. Search can be by text input or by voice input. So the HUD allows you to 'say what you intend to do' and have the application present you with potential actions.

In Ubuntu, it is possible to instrument the user interaction with the HUD, reporting searches, results and user actions, and then to remotely analyse that data, thereby prioritising the most relevant results. Ubuntu can also automatically order search results based on the previous search history of a specific user.

In the HUD, actions can have parameters that shape their impact, so the user does not need to invoke a dialog box (e.g. from a drop down menu) and task away to that separate dialog box. Pickers, sliders, inputs and other widgets can be integrated into the HUD to provide input for those parameters. This approach can be voice enabled too. So the HUD subsumes the capabilities of both a traditional menu, and traditional dialog boxes, into a touch-friendly mechanism that is unique and distinctive to Ubuntu. When searching in the HUD, it is useful to be able to search for actions in various running applications or system services. The HUD 'App Stack' across the top of the HUD shows running applications with potential matches for the current HUD search, and provides: the ability to see which apps have matching actions and to jump to that app directly. A user can search across multiple apps as before, but can now explicitly select the app from which matches will be displayed.

One can re-cast this feature in terms of a problem and its solution. The Problem Statement is: how can you provide an easy to access a (typically unified) search that provides results in a way that does not overwhelm the user?

One can generalize the solutions as follows:

A smartphone, tablet or other computing device in which the device operating system enables the user to reach a search bar with a single touch gesture to the touch screen, from screens other than the home screen.

Ubuntu also improves search relevancy using a synonym/fuzzy matching engine that matches user input against additional keywords/dictionaries/glossaries/thesauri.

Ubuntu can also search through system services ("screenshot") as well as running application actions.

The design of Ubuntu, which uses the bottom edge for HUD invocation, means that a user can access the HUD for apps in both the main stage and the side stage of the tablet with the same gesture.

E.3 Main Ubuntu Search and HUD Concepts

In this section, we summarise the main Ubuntu Search and HUD concepts. They are as follows:

A smartphone, tablet or other computing device comprising:
(a) a touch sensitive display;
(b) one or more processors;
(c) computer memory;
(d) an operating system computer program stored in the computer memory and configured to be executed by the one or more processors and including instructions for detecting a swipe gesture, and, in response to the detected swipe gesture, displaying a search bar.

Other optional implementation features include the following, each of which may be combined with any other feature:
- the search bar is reached by starting with a swipe from an edge.
- the swipe is a long swipe from the left edge, bringing up the home screen, which features the search bar at the top of the home screen.
- the search bar enables a general search across multiple data sources.
- the data sources are both internal and external to the device.
- the search bar is reached by a short swipe down from the top edge.
- there is a specific search bar that is limited to surfacing features and actions available within an open app.
- the search bar is reached by a swipe up from the bottom edge to a defined region and an icon or symbol is displayed at the region once that region is reached by the swipe gesture.
- in response to detecting selecting of the defined region, for example by the user releasing contact once the region is reached, the device displays the search bar together with items for controlling features or functions of an open app.
- the user can search for a feature or action in the current app by text input or by voice control.
- the results of the search will also list which other apps include that searched for feature or action.
- the other apps that include the searched for feature or action are shown as a set of icons.
- any app surfaced in a search can be jumped to directly (e.g. launched or accessed directly from the search results) by the user selecting the icon for that app.
- the set of apps surfaced in a search (+indicators and other action sources) becomes visible as an 'App Stack', being a set of app icons shown across the top of the search bar so that a user can search across multiple apps as before, but can now explicitly select the app from which matches will be displayed.
- unified searching relevancy is improved using a synonym/fuzzy matching engine that matches user input against additional keywords/dictionaries/glossaries/thesauri.
- the user interaction with search results can be instrumented or analysed and can be remotely analysed, enabling automatic re-ordering of the search results to prioritise the most relevant results based on historically determined usage analytics.
- search results can be automatically ordered based on the previous search history of a specific user.
- the ability to see which apps etc. have matches for any search and to jump to an app directly.
- the home screen includes a unified search bar.
- the swipe gesture may be made and detected when the device is not displaying a home screen.
- the search bar can be reached by a long swipe up from the bottom edge.
- the search bar can be reached by a swipe from an edge (such as a long swipe from the left edge, bringing up the apps page of home screen, which features the apps search at the top of the page.
- the search bar can be reached by a swipe from an icon for the search bar, such as a magnifying glass.
- the icon for the search bar is on the top edge.
- the search function for the general search operates across multiple data sources, both internal and external to the device, and the results are automatically categorized into multiple categories, such as people, places, videos, books, cinema etc. and are relevance ranked using factors such as location, previous search history, social graphs etc.
- multiple menu functions or features can be searched for in a search bar and surfaced in a user interface region, panel or window that includes the search bar and all variable parameters for the function or feature can be selected or controlled from within that user interface region, panel or window, so the user does not need to invoke a separate dialog box (e.g. from a drop down menu) and task away to that separate dialog box.

Other aspects are:

A method comprising the following steps, performed at a computing device with a touch sensitive display: detecting a swipe gesture, and, in response to the detected swipe gesture, displaying a search bar.

A smartphone, tablet or other computing device in which any or multiple menu functions can be surfaced in a search bar and all variable parameters for the function can be selected or controlled from within the search bar, so the user does not need to invoke a dialog box (e.g. from a drop down menu) and task away to that separate dialog box.

A smartphone, tablet or other computing device in which any app surfaced in a search can be jumped to directly (e.g. launched or accessed directly from the search results).

A smartphone, tablet or other computing device) in which unified searching relevancy is improved using a synonym/fuzzy matching engine that matches user input against additional keywords/dictionaries/glossaries/thesauri.

F.1 The Home Screen in Ubuntu

The Launcher (arranged as a bar or column) includes typically 10 icons. At the bottom is the icon for the home screen. If the user selects this icon (e.g. by a short swipe from the left edge to drag out the launcher, and then a glide down to the bottom 'home screen' icon, then a release on that home screen icon), the Home screen is displayed. The Apps page can be reached by a long swipe from the left edge; this takes you to an app screen that includes the full listing of all apps on the phone; a flick right across the top of the screen takes one to the Home screen.

This Home screen shows icons for frequently used applications, calls you've recently made or received (or missed, so you can call them back easily by simply touching the item listing the missed call to directly initiate a call back to them). The Home screen is fully customizable too, so it can include for example 'Recently Added Music'; New Film Releases; On-line Radio; Wikipedia; on-line stores etc. In fact, the user can select from hundreds of different filters to populate their Home Screen. In one typical installation, the Home Screen is divided into a number of sections the user reaches by flicking up or down on the screen; the sections are: Frequent Apps; Favourite People; People Recently in Touch; Recent Music; Videos Popular Online.

Once again intermediate steps and excise have been reduced. In the Home Screen, missed calls and other recent calls can instantly be interacted with if for example wanting to return a call; the user scrolls to the 'People Recently in Touch' section by flicking up or down the screen; this section will list the name of the person whose call was missed; the user touches this and a button labelled 'Call' is then displayed—if the user touches this, a voice call is automatically placed to the person. We can contrast this simple and efficient process with the more conventional approach of having to find your phone icon, tap it, and then find your recent phone calls tab, tap it, and then to finally tap on the contact you want to call.

Because the Home screen can be reached so readily by a swipe from the left edge of the phone, there is no need for a dedicated hardware Home button, unlike iOS, or soft button as in Android. Further, in iOS and Android, the dedicated home button is needed whenever the user wishes to switch applications—the user has to first press the home button, which then calls up a grid of apps for the user to tap to select. But in Ubuntu, switching apps is done in a single fluid swipe gesture, from the left edge as described above (see section above titled 'B. Swiping to Unlock Ubuntu') or from the right edge (see section titled 'E. More Edge Behaviours in Ubuntu' below).

If you're in the Home Screen and you swipe sideways, you see the information you use the most often (e.g. a page with the People you communicate with most often (each listing can be accompanied with Twitter or Facebook feed data); another page with the Music you listen too most; another page with the apps you use most. You can jump to any of these pages with a single gesture. Full swipe across the screen from the left edge opens the apps page listing all your installed apps, plus available apps.

In brief, in a typical installation, swiping right from the Home Screen takes you to the Apps page of the Home Screen; a further swipe right takes you to Videos. A swipe left takes you to People (contacts) and a further swipe right takes you to Music.

On the Apps page, you find icons for all installed apps, plus apps available for download—so there's one consistent way to find apps on any Ubuntu device; specifically, there are sections for Running Apps; Frequently Used Apps; Installed Apps; Apps available for download. There is no need to go into a special app store but instead all apps are gathered in one and the same place. For the user, this is a more logical way of distributing apps and therefore reduces the mental effort of the user making the experience easy and effortless.

Ubuntu supports web, HTML5 and native apps. Web apps (Facebook, Gmail Twitter, Spotify etc.) can send notifications and use system features (e.g. Facebook app can use the messaging menu just like a local app would.

One can re-cast this home screen feature in terms of a problem and its solution. The Problem Statement is: how can you reach a 'home' screen, but without the need for a 'home' button that takes up valuable screen or case real estate? One can generalize the innovative solution as a smartphone (or other personal computing device) in which a swipe in from an edge brings up a home screen, listing for example all available apps. There is no longer a need for a physical 'home' button.

In one implementation, the swipe is a long swipe in from the left edge; a commit gesture (e.g. a release) after the home screen appears causes the home screen to be displayed after the commit; if the user swipes back to the left without committing, then the home screen disappears. An additional variant is a short swipe in from the left edge, bringing up a launcher bar of favourite apps, and a selectable icon for the home screen, which the user glides over to and selects by releasing over that home screen icon. Unlike other soft home screen icons, this is only ever called up when specifically required, but calling it up and selecting it is a very quick, fluid one-handed operation.

F.2 Main Home Screen Concepts

In this section, we summarise the main 'Home Screen' concepts. They are as follows:

1. A smartphone, tablet or other computing device comprising:
(a) a touch sensitive display;
(b) one or more processors;
(c) computer memory;
(d) one or more computer programs stored in the computer memory and configured to be executed by the one or more processors and including instructions for detecting a swipe in from an edge of the display, and in response to the detected swipe causing a home screen to be displayed, the home screen listing running apps and user notifications, such as missed calls, irrespective of which screen the device was displaying immediately prior to the swipe in from the edge.

Other optional implementation features include the following, each of which may be combined with any other feature:
    the swipe in from the edge brings up the home screen and requires only a single gesture to be detected.
    the swipe in from the edge brings up the home screen and requires a single gesture and a commit or select action to be detected.
    the swipe is a long swipe in from the left edge.
    a short swipe from the left edge brings up an app launcher and continuing that swipe to a long swipe causes the home screen apps page to be displayed.

if a reversal in the direction of the long swipe is detected, then the home screen is progressively removed as the swipe continues in its revered direction back to the left edge.

home screen content is user customizable.

the home screen includes one or more of: recently added music, new film releases, on-line stores.

the home screen includes missed call notifications and enables the user to return the call without tasking away to a phone app.

the device has no dedicated physical 'home' button.

the home screen includes apps sections listing all installed apps and also apps available for download.

swiping right from the home screen takes you to the home screen Apps page; a further swipe right takes you to Videos.

swiping left takes you to People (contacts) and a further swipe right takes you to Music.

a short swipe in from the left edge brings up a launcher bar, including icons for various apps, plus an icon for the home screen.

Other aspects:

A method comprising the following steps, performed at a computing device with a touch sensitive display: detecting a swipe in from an edge of the display, and in response to the detected swipe causing a home screen to be displayed, the home screen listing running apps and user notifications, such as missed calls, irrespective of which screen the device was displaying immediately prior to the swipe in from the edge.

G.1 The Ubuntu 'Side-Stage'

Ubuntu uniquely places phone apps on the right edge of the touch screen (tablet, or touch-PC). This gives them a phone-shaped space that can be touched with the right hand and thumb in exactly the same way as those applications would be touched on a phone. The right-hand-feel of the app on tablets and phones is identical. The indicators are at the top right of both tablet and phone screens. The phone-shaped space (called a 'side-stage') can display any running app (including any phone app), hence allowing multi-tasking across two sections of the display—the main section running one app, and the side stage running a different app (e.g. a phone app) shown over-laying the first app (e.g. a translucency effect is applied to the side stage so that some aspects of the underlying app running in the main section are just visible), or else with a split-screen format. Also, because the side-stage has the same format and proportions as a smartphone screen, there are no issues in scaling or re-formatting phone apps to run correctly within the side stage.

As an additional feature, defining the right edge behaviour of the phone screen as "previous app" (i.e. a short swipe from the right edge brings up the previous app the user was using) and on the tablet as either "reveal the phone space" (i.e. a short swipe from the right edge on the tablet reveals the 'side-stage') or, if the swipe is continued further, then the previous app is shown over and replacing anything in the phone space. This provides a coherence of the right edge across phone and tablet—a swipe from the right edge in either will reveal the previously used app.

One can re-cast this feature in terms of a problem and its solution. Problem statement: how do you allow phone applications to run well as part of a tablet, or touch-PC environment? One can generalize the solution as a computing device, such as a tablet or PC, in which phone apps are displayed within a space on the right edge or side of the device (tablet, or touch-PC) within a generally rectangular (e.g. phone-shaped) space in response to a swipe in from the right edge. This allows apps to be touched with the right hand and thumb in exactly the same way as those applications would be touched on a phone.

G.2 Main Side-Stage Concepts

In this section, we summarise the main 'Side Stage' concepts. They are as follows:

A computing device, such as a tablet or PC, comprising:
(a) a touch sensitive display;
(b) one or more processors;
(c) computer memory;
(d) one or more computer programs stored in the computer memory and configured to be executed by the one or more processors and including instructions for displaying one or more apps, utilities or functions within a window, pane or region on the right side of the device in response to detecting a swipe in from the right edge.

Other optional implementation features include the following, each of which may be combined with any other feature:

the window, pane or region is rectangular, such as phone display shaped.

the window, pane or region (called a 'side-stage') can display a running app (including any phone app), utility or function, hence allowing multi-tasking across two sections of the display.

the main section runs one app, and the side stage runs a different app or a utility or function.

the main section runs any of: a video player; a web browser; a productivity app such as a word processor; a social network app; a search engine; and the side-stage runs any of: a text messaging app; a telephone dialler function; an e-mail app; an instant messenger; a systems setting utility.

the side-stage has the same format and proportions as a smartphone screen, so there are no issues in scaling or re-formatting phone apps to run within the side stage.

apps are phone apps.

an app running in the rectangular-shaped space over-lays (with translucent effect) an app running on the main section.

the screen is split into two sections, each running a different app.

a swipe from the right edge displays the window, pane or region.

continuing a swipe from the right edge displays previous apps.

Other aspects:

A method comprising the following steps, performed at a computing device with a touch sensitive display: displaying one or more apps, utilities or functions within a window, pane or region on the right side of the device in response to detecting a swipe in from the right edge.

In the preceding sections, we have focused on Ubuntu for phone and tablet. But a key attribute of Ubuntu is that it is a single operating system with interfaces that scale smoothly from phone, to tablet, to desktop, to TV.

H.1 Scalable, Responsive Ubuntu UI

Ubuntu in its touch-enabled form complements and completes the family of interfaces operating across the single, unified Ubuntu operating system. The interfaces are:

Ubuntu TV—ideal for interaction at a distance with a simple (six buttons and four edges) remote control unit Ubuntu Desktop—ideal for creating content and serious computing tasks, using a keyboard and pointer such as a mouse or trackpad Ubuntu Phone and Tablet—ideal for touch-based one-handed (phone) or two-handed (tablet) operation, with distinctive mechanisms to access desktop application richness As a major benefit of this convergent design of user interface families, it becomes possible to have a single OS provide the appropriate interface for all of those form factors, which in turn enables the creation of convergence devices that provide alternative interfaces for different form factors when docked to the appropriate accessories.

It also becomes possible to write a single application that runs on many different device types, or transitions smoothly from one form factor to another when a device is docked to accessories that provide the means to present a different form factor interface.

For example, it enables a smartphone or a tablet to be used as a PC when connected to a keyboard, mouse and display; the smartphone or tablet then provides all the computational resources of a conventional PC, hence providing enterprise customers with a single device that can provide all phone and PC functions (we refer to this as the 'Superphone' category).

The Ubuntu Superphone or tablet can thus provide a rich and complete desktop environment; including providing access to Windows applications through an integrated Thin Client capability.

A convergent device greatly reduces the complexity and thus cost of management, testing, and support, because a single version of the operating system can be used across many devices, and fewer devices are needed in total. Convergence of the operating system avoids fragmentation—for example, in the Windows ecosystem you have Windows PC, Windows RT, and Windows Phone, all of which have different degrees of compatibility and different management processes.

Convergent design means that Ubuntu running on all of these devices has the full capabilities of the PC OS (operating system). So Ubuntu phone apps can take advantage of all cores of the CPU, and the full native OpenGL (Open Graphics Library) and Open GL ES (OpenGL for Embedded Systems) of the phone's GPU (graphics processing unit), as if they were Ubuntu PC applications. By contrast, apps written for iOS and MacOS are subject to very different constraints, tools and capabilities.

The Ubuntu approach exemplifies the benefits of convergence—the same, unified operating system for all device types, and a family of coherent interfaces optimized for each category, but sharing many common features. The technical benefits of a single, unified OS for all device types is especially attractive for app developers (who can write an application once, and have it run on phone, tablet, desktop, TV and any other computing device) and for large enterprise customers and network operators (who can manage Ubuntu phones using exactly the same tools they already use for Ubuntu on the server, cloud and desktop).

Ubuntu's UI is arranged in a particular way that has distinctive and unique benefits when transformed across a range of form factors—phone, tablet, PC and TV. The arrangement of items: indicators, menus, launcher, notifications, side-stage and the use of the edges of the screen in each of these form factors is optimally coherent across the full range. This arrangement ensures that a device can transform from one form factor (say, tablet) to another (say, PC) with minimal disruption or change in the placement and behaviour of the items.

Considering user experience, there is a clear advantage that the Ubuntu UI is scalable across several devices without changing looks or controls and therefore keeping a consistency throughout their products. Having learnt the interface on one device, the user can move on to work on another device without any effort, saving time on not having to learn yet another interface with its own controls; as a result making the whole experience user friendly and efficient.

Not only the looks of the interface is the same across devices but the actual system is also the same. Being able to use one's phone as a computer is smart and convenient and makes it easy for users to bring what they need wherever they are.

One can re-cast this feature in terms of a problem and its solution. The Problem Statement is: how do you design a UI which "scales" smoothly from phone, to tablet, to desktop and to TV? By smooth scaling, we mean the disruption or change in the presentation and placement of an element of the UI as it scales from phone, to tablet, to desktop and to TV. One can generalize the solution as a computing device in which certain core interaction elements remain in the same screen position as you scale from phone to tablet to laptop to desktop to TV, providing a consistent UI across all screen sizes and device types.

The core interaction elements may include:
launcher bar (positioned vertically down the left edge, and revealed by a short swipe in from the left edge); So the application launcher is always on the left across all form factors: phone, tablet, tv, and PC. The left edge is the long edge on a phone, but the short edge on a tablet and a desktop; but it is generally the most intuitively comfortable to start things from, using either a phone and a tablet.
HUD search bar (positioned horizontally across the top), and revealed by selecting the Home screen)
System indicator icons on the top right
And keeping the right edge free from interaction elements (for example, to accommodate the 'Side Stage' area in a tablet to run phone apps, see above—G.1 The Ubuntu Side-Stage).

This scheme is consistent across all form factors (smartphone, tablet, desktop, TV).

H.2 Resolution Independence in the Ubuntu UI

Devices running Ubuntu can range in size from a small phone to a 50" TV, and in resolution from a low-res phone to high-res monitor or tablet.

These devices can also have very different resolutions and pixel densities, ranging from 320×240 to 3840×2160 and 100 dpi to 400 dpi and above.

Ubuntu has a framework to handle UI across these sizes and resolutions to retain a uniform experience. This is done by defining a resolution independent unit, which is large enough to also help aligning UI elements consistently The display is divided in a grid both horizontally and vertically, and instead of pixels, UI element sizes are commonly defined in Grid units (units.dp(x)).

Depending on the pixel density and viewing distance, each device has its' own unique ratio of actual pixels per Grid Unit defined in the system settings for that particular device.

For instance, a 4.7" phone with a 1280×720 display could have 18 pixels/Grid Unit. A 10" 2560×1600 tablet could have 20 pixels/Grid Unit. A 5" phone with a 1920×1080 display could have 27 pixels/Grid unit. The exact px/GU setting will be defined individually for each particular device.

Depending on the size and orientation of the device, there are a different number of Grid Unit rows and columns. For example, on phones in portrait mode there are typically 40 columns, and on a 2560×1600 10" tablet in landscape mode there are 128 columns.

By avoiding defining sizes in actual pixels, our UI elements automatically scale between devices—and retains similar perceived size across devices.

Grid units also help aligning things consistently—it's easy to define consistent margins and UI element sizes and positions that align in a visually pleasing way.

Lastly, the grid is valuable when communicating between designers and developers. An app designer can start with one of our templates with the grid already defined, and align all UI elements to the grid. When the design is finished in the design software, saving the design with the grid overlaid will clearly show the size and positioning of each element in grid units, without having to write a detailed spec for the developer.

This way we reduce the margin of error on the UI implementation from the developer's point of view.

H.3 Automatic Scaling of Design Assets

It is possible to use either vector or bitmap assets with our framework. Vector assets (SVG—scalable vector graphics) are by nature resolution independent, and scale perfectly to any size and resolution.

For bitmap assets, it is possible to create only one set of original bitmap assets at super high resolution (30 px/gu), and saving the assets as "filename@30.png". Our framework will automatically scale these down (using high quality filtering algorithms with minimal visual data loss) to the correct pixel density for each device—so developers only have to prepare one set of assets.

However, if one wants to prepare different levels of detail for different displays, it is also possible also can save separate assets at different px/GU ratios (ie. asset1@12.png, asset1@18.png, asset1@30.png). The framework will automatically pick the file that is closest to the current device's px/GU setting, and if needed, scale it to match the px/GU exactly.

H.4 Main Scalable UI Concepts

In this section, we summarise the main Scalable UI concepts. They are as follows:

A computing device comprising:
(a) a display;
(b) one or more processors;
(c) computer memory;
(d) one or more computer programs stored in the computer memory and configured to be executed by the one or more processors and including instructions for generating UI elements designed to remain in the same screen position as the device size scales from smartphone to tablet to laptop to desktop to TV, providing a consistent UI across all of the respective screen sizes and device types.

Other optional implementation features include the following, each of which may be combined with any other feature:

the core interaction elements include a launcher bar including app icons that can be selected to open or switch to the associated app.
the launcher bar is positioned vertically down the left edge, and revealed by a short swipe in from the left edge.
the core interaction elements include a search bar.
the search bar is positioned horizontally across the top of the screen.
the search bar is revealed by selecting a Home screen the Home screen is displayed if a long (such as greater than a certain length) swipe from the left edge of the device is detected.
the core interaction elements include system indicator icons.
the system indicator icons are on the top edge of the screen.
the core interaction elements include keeping the right edge free from interaction elements.

Other aspects are:

A method comprising the following steps, performed at a computing device with a touch sensitive display: generating UI elements designed to remain in the same screen position as the device size scales from smartphone to tablet to laptop to desktop to TV, providing a consistent UI across all of the respective screen sizes and device types.

A smartphone, tablet or other computing device comprising:
(a) a touch sensitive display;
(b) one or more processors;
(c) computer memory;
(d) one or more computer programs stored in the computer memory and configured to be executed by the one or more processors and including instructions for generating UI elements designed using a logical grid unit size that is independent of screen resolution.
depending on pixel density and viewing distance, each device has its own unique ratio of actual pixels per logical grid unit defined in the system settings for that particular device.

The above-described steps, techniques and processes can be implemented using standard well-known programming techniques. The novelty of the above-described embodiments lie not in the specific programming techniques but in the use of the steps, techniques and processes described to achieve the described results. Software programming code which embodies the present invention is typically stored in permanent, non-transitory storage. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, techniques and processes or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the Figs. support combinations of means for performing the specified functions, combinations of steps for performing the specified functions, and program instruction means for performing the specified functions.

I. Detailed Description Relating to the Figures

There is provided a user interface core layout for applications on the screen of a computing device e.g. a portable computing device, which may be a tablet computer or a smartphone, for example. At the top of the screen there is provided a menu bar. Below the menu bar there is provided a Header, which may include a page title. Below the Header there is provided a divider. Below the divider there is provided a content area. At the bottom of the screen there is provided a Toolbar, when fully revealed. The core layout provides a visual identifier. An example is shown in FIG. 1.

Figure 2:
FIG. 2 shows an example of a user interface core layout which is responsive and scalable across devices.

The user interface core layout may be responsive and scalable across devices, from phone to tablet to PC to TV. An example of a user interface that is adapted for use on several devices with a wide range of screen sizes (eg. a TV, a laptop, a tablet and a smartphone) is shown in FIG. 2.

For a uniform experience of the user interface across devices of different sizes and resolutions, a special framework may be provided. Instead of using pixels for measurements, the display may be divided into a grid and user interface (UI) elements' sizes may be commonly defined in Grid units. Depending on the pixel density and viewing distance, each device has its own unique ratio of actual pixels per Grid unit. Therefore Resolution Independence is provided in the user interface.

Figure 3:
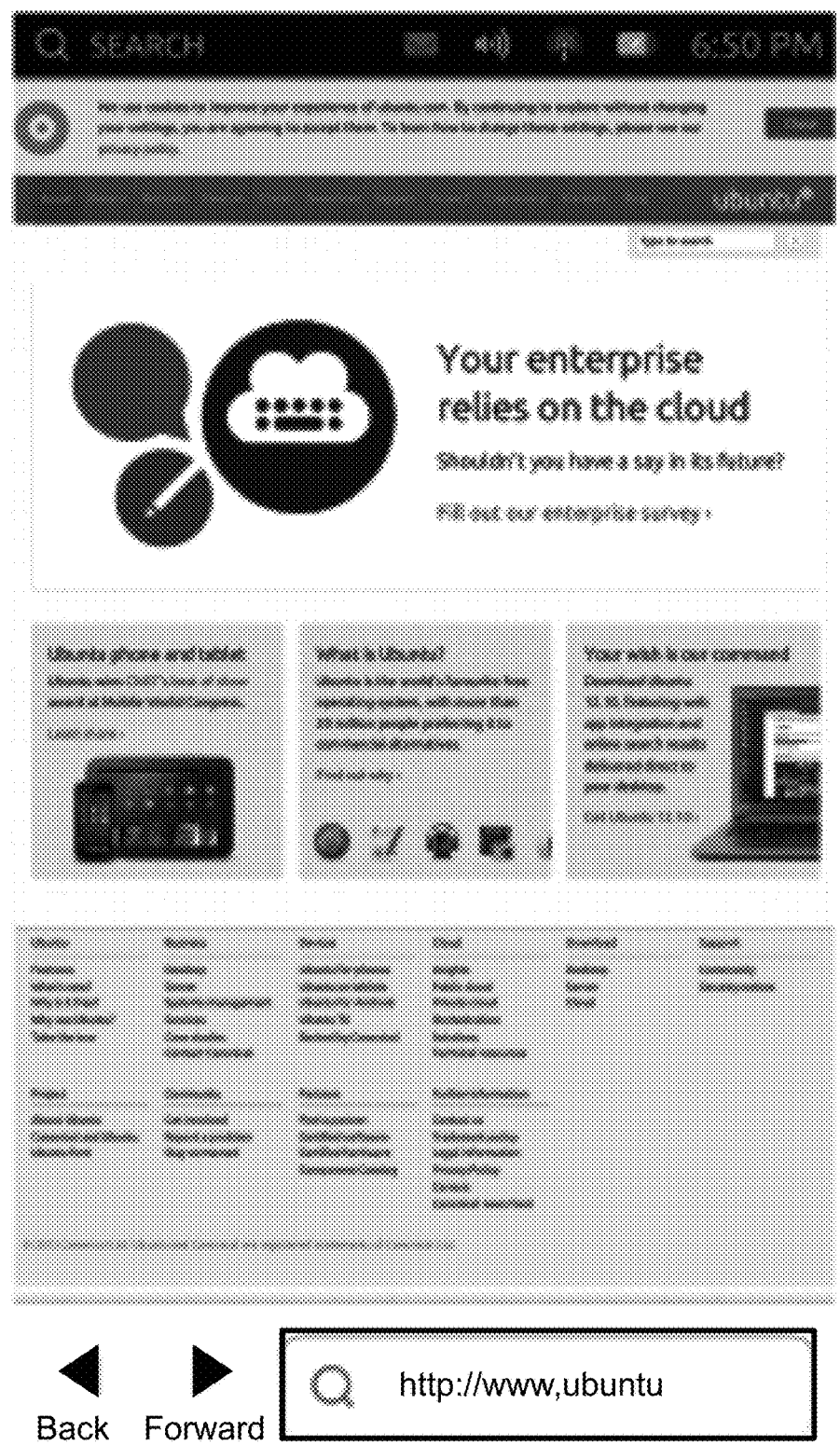
FIG. 3 shows a smartphone user interface example in which there are provided bottom controls.
Figure 4:
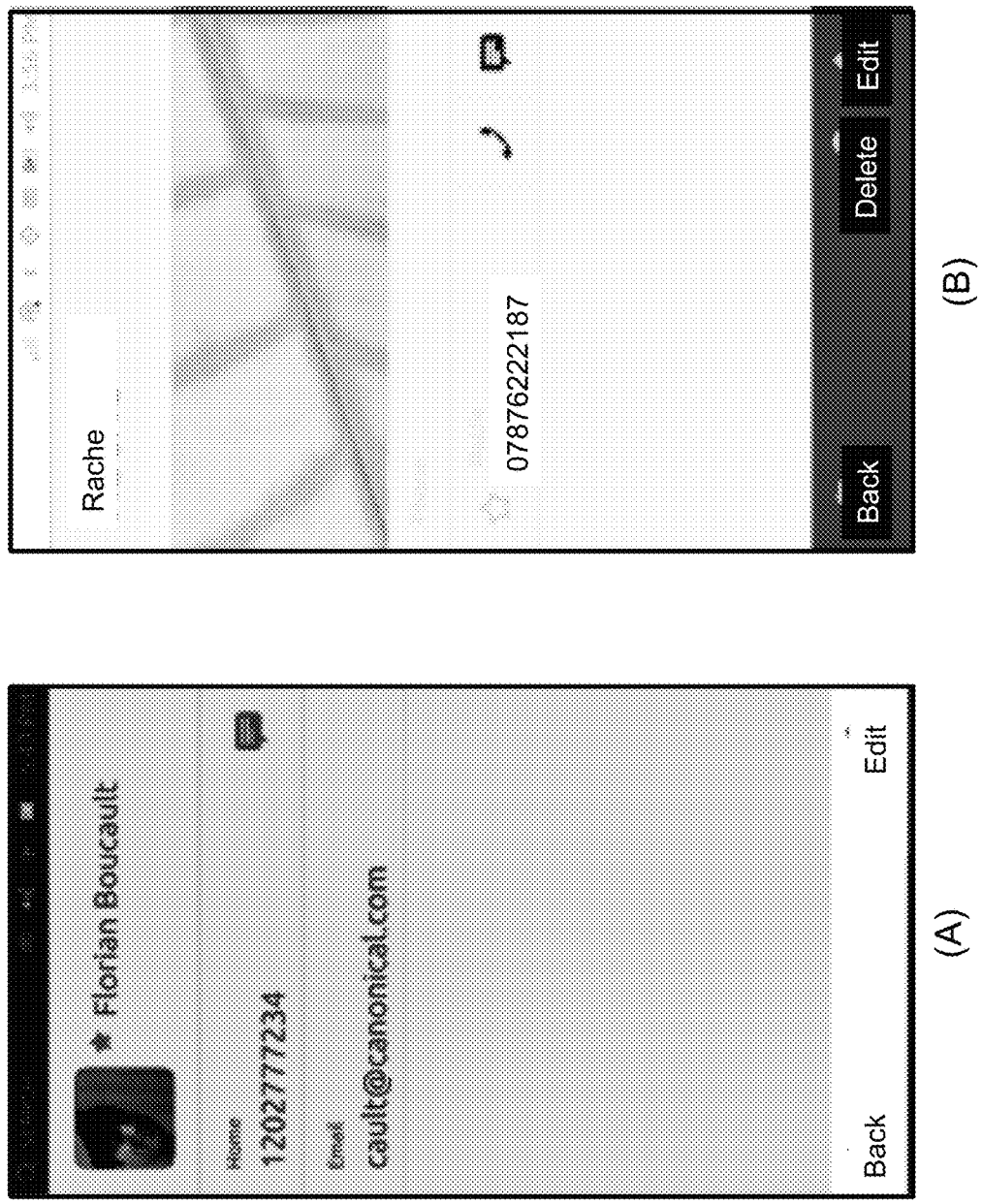
FIG. 4 shows smartphone user interface examples in which there are provided bottom controls.

In a phone user interface example, there are provided bottom controls. In an example, bottom controls of the browser (for example, "Back", "Forward"), are revealed with a short swipe up from the bottom edge of the screen. An example user interface screen is shown in FIG. 3. Further examples (A) and (B) are shown in FIG. 4, which each correspond to viewing a contact. The bottom controls (for example "Back", "Edit") are revealed with a short swipe up from the bottom edge of the screen. Bottom controls may also be provided in a picture view, and may be revealed with a short swipe up from the bottom edge of the screen.

Figure 5:
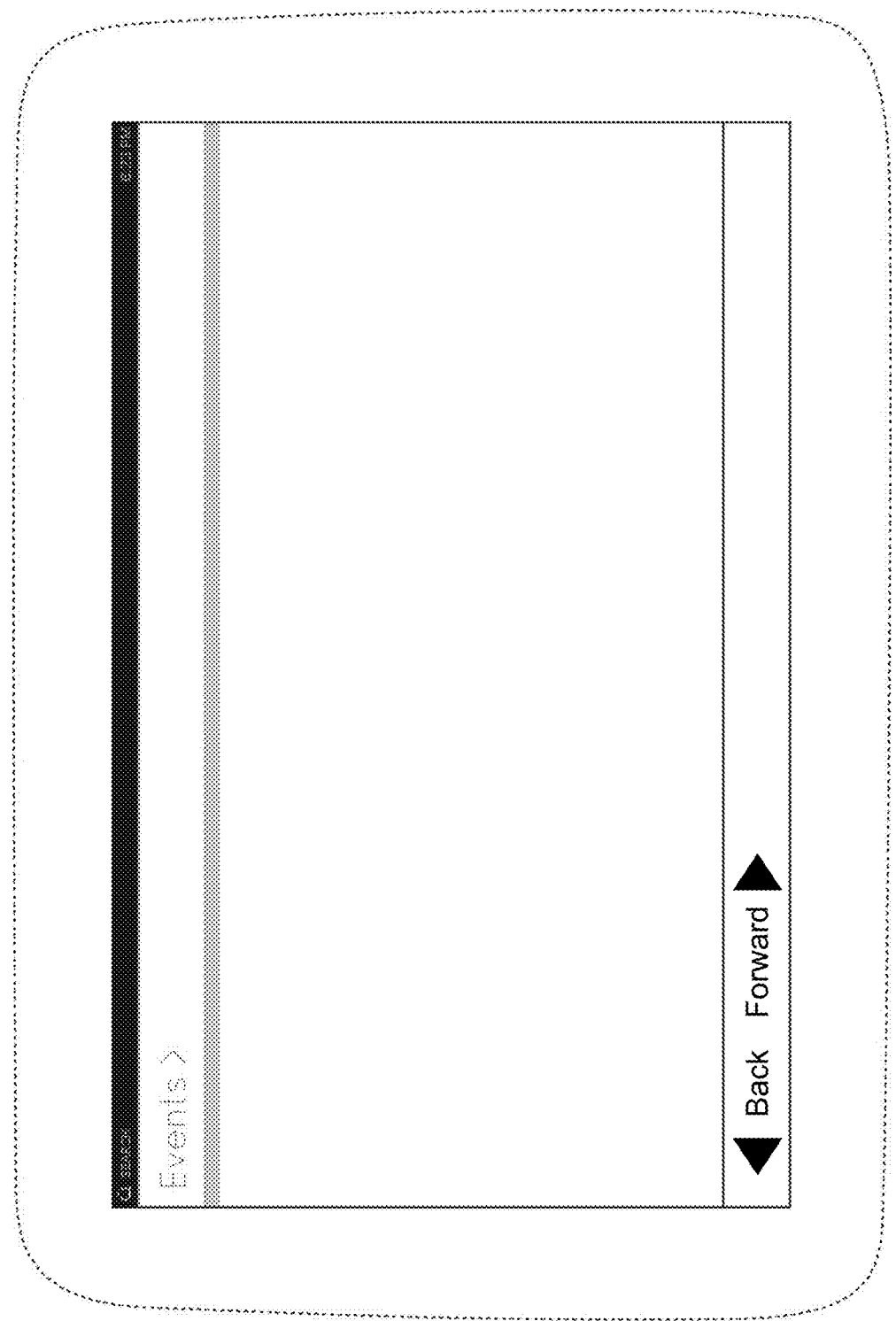
FIG. 5 shows a tablet user interface example in which there are provided bottom controls.

In a tablet user interface example, there are provided bottom controls. In an example, bottom controls of the browser (for example, "Back", "Forward"), are revealed with a short swipe up from the bottom edge of the screen. In an example, bottom controls of a gallery (for example, "Back", "Forward"), are revealed with a short swipe up from the bottom edge of the screen. An example is shown in FIG. 5. In an example, bottom controls of a picture view are revealed with a short swipe up from the bottom edge of the screen. In an example, bottom controls of the Conversations view in the Side stage are revealed with a short swipe up from the bottom edge of the screen.

Figure 6:
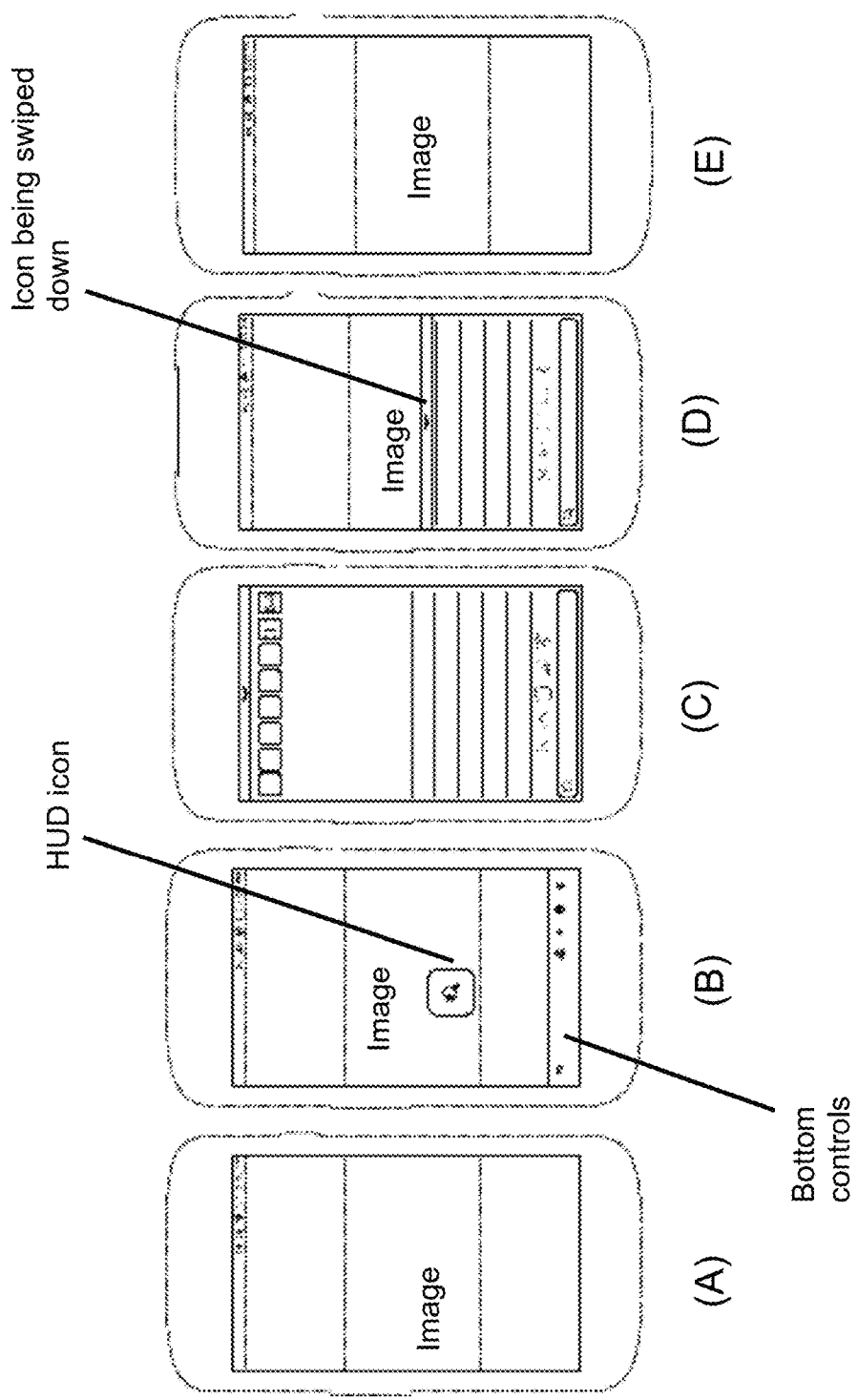
FIG. 6 shows a sequence of device screen configurations from (A) to (E) relating to a HUD interface example.

There is provided a searchable command interface. The mechanism is called the HUD ('head-up display'), because it displays information to the user without forcing them to shift from their main focus of interest, analogous to a conventional HUD. In an example, a HUD is provided on a smartphone. In an example, to reach the HUD of an app, a user starts with swiping up from the bottom of the screen to reveal bottom controls and the HUD icon. Releasing the finger on top of a HUD icon may reveal the HUD and its available features, for example to search for a control or action within the application. To hide the HUD again a user may swipe down from the top of the HUD. An example is shown in FIG. 6. FIG. 6 shows a sequence of device screen configurations, from (A) to (E). In the example of FIG. 6, the display includes an image in (A). In (B) bottom controls are displayed in response to a swipe up from the bottom of the screen, and a HUD icon is displayed. Releasing the finger on top of the HUD icon leads to the HUD interface in (C). A user swipe from the top of the screen begins to hide the HUD in (D), as the HUD interface moves down in response to the user swipe. In (E), the screen of (A) is returned to.

Figure 7:
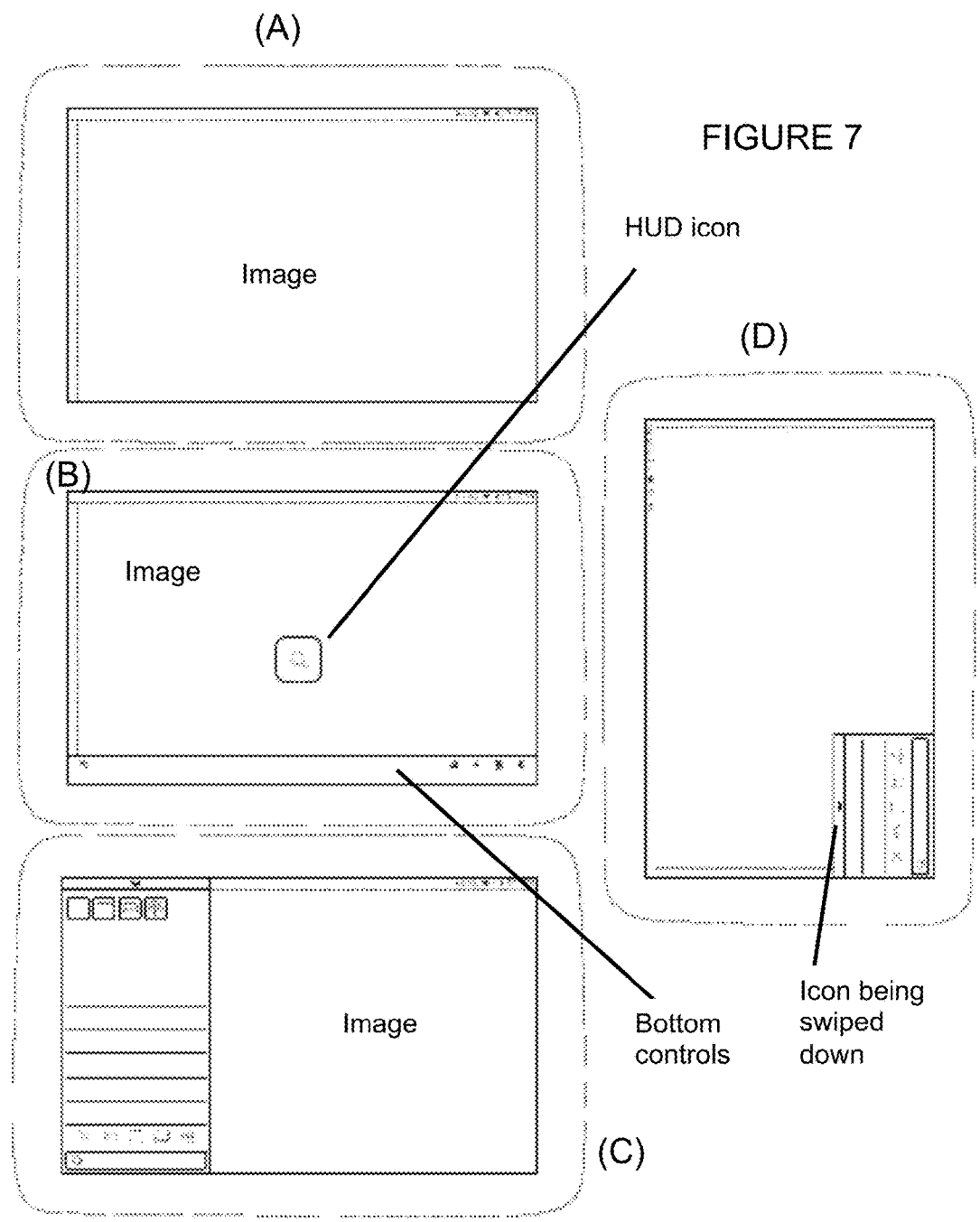
FIG. 7 shows sequence of device screen configurations from (A) to (D) relating to a HUD interface example.

In an example, a HUD is provided on a tablet. To reach the HUD of an app, a user may start with swiping up from the bottom of the screen to reveal bottom controls and a HUD icon. Releasing the finger on top of the HUD icon may reveal the HUD and its available features, for example to change colour balance. To hide the HUD again a user may swipe down from the top of the HUD. An example is shown in FIG. 7. FIG. 7 shows a sequence of device screen configurations from (A) to (D). In the example of FIG. 7, the display includes an image in (A). In (B) bottom controls are displayed in response to a swipe up from the bottom of the screen, and a HUD icon is displayed. Releasing the finger on top of the HUD icon leads to the HUD interface on the left hand side of the screen in (C). A user swipe from the top of the screen begins to hide the HUD in (D) (the (D) screen image is rotated by 90 degrees compared to (A) to (C)), as the HUD interface moves down in response to the user swipe. In a final screen (not shown), the screen of (A) is returned to.

Figure 8:
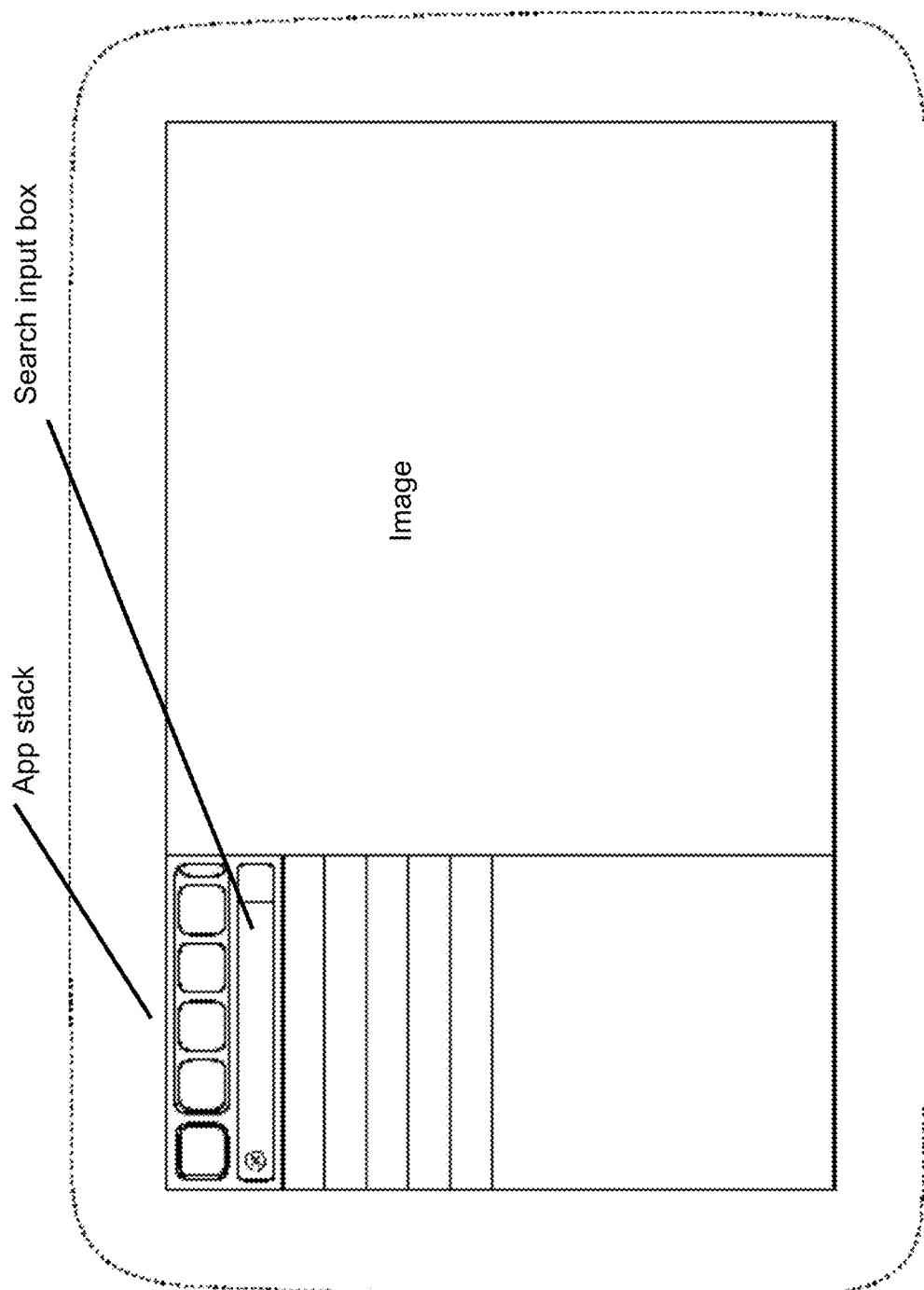
FIG. 8 shows a device screen configuration in which a search input box and an app stack are indicated, relating to a HUD interface example.

In an example, a HUD is provided on a device, such as a smartphone, a tablet, a laptop, desktop monitor, or a TV screen. In the HUD, the user may search for a feature of the current app, such as either by text input or by voice control. The search will display what is available but will also show in which one of other open apps this feature is available. To show the other apps that have the same feature, the user interface may use an app stack which may be viewed in the top of the HUD as a set of icons. An example is shown in FIG. 8. In FIG. 8, a search input box and an app stack are indicated.

Figure 9B:
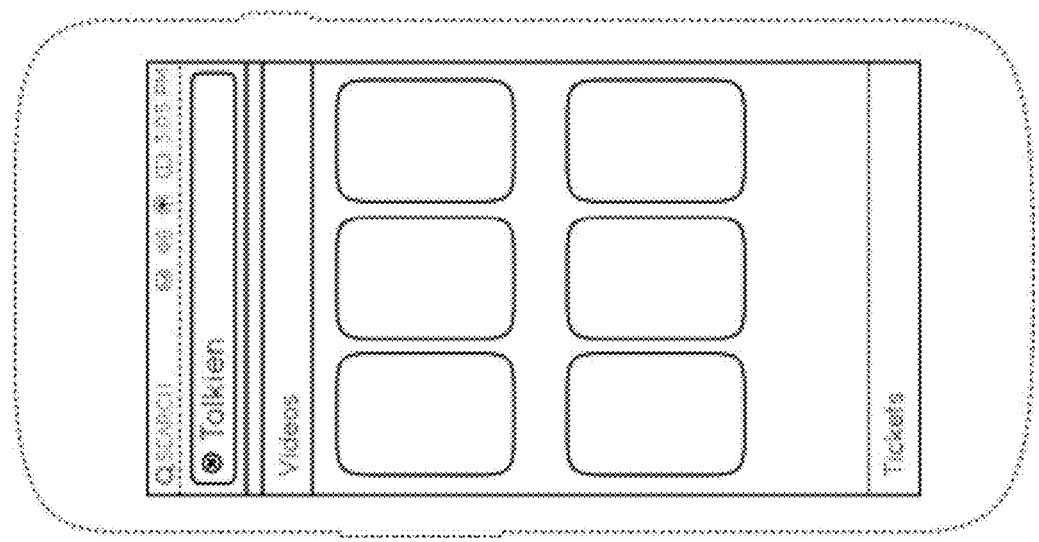
FIG. 9B shows an example of organized search results.
Figure 9A:
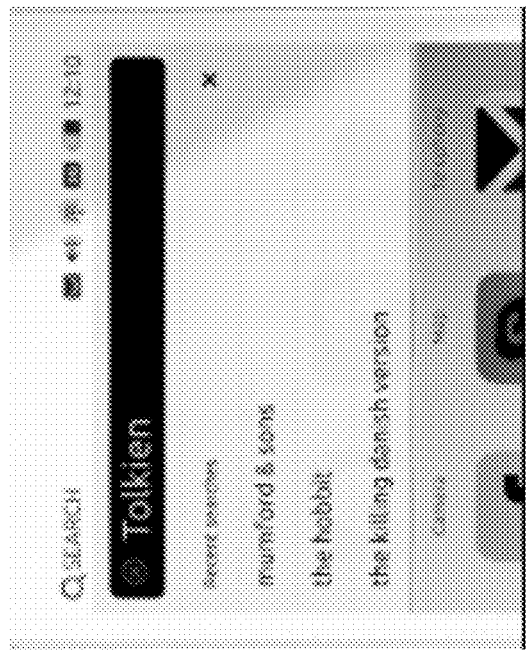
FIG. 9A shows an example, in which in a home screen, swiping down from the top left corner brings down the Search.

There is provided a search function. In an example, in a home screen, swiping down from the top left corner brings down the Search. An example is shown in FIG. 9A. From here searches may be made both locally and globally over the internet. The search results may be organised into appropriate categories for an easier overview of the result. An example of organized search results is shown in FIG. 9B.

Figure 10:
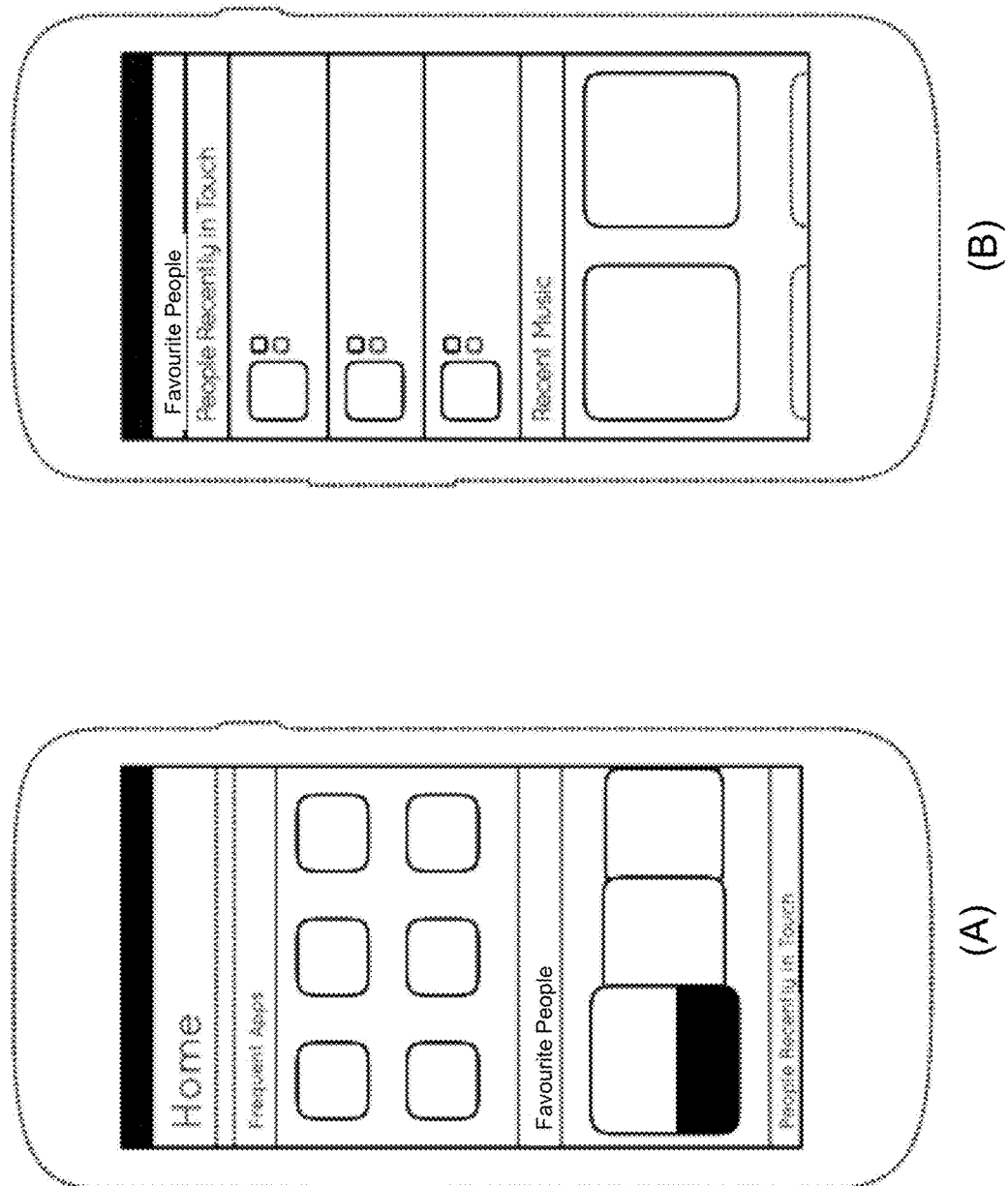
FIG. 10 shows an example in which the "Favourite People" field in (A) collapses when scrolling down to leave a collapsed field "Favourite People" in (B).

There is provided a Home page for a smartphone. The Home page may be such that scrolling down on the Home page collapses fields that are being scrolled out of view, and when being scrolled back into view those fields may expand again. The Home page may be such that swiping right to left on the screen brings up the Apps page and swiping left to right brings up the Social scope. An example is shown in FIG. 10, in which the "Favourite People" field in (A) collapses when scrolling down to leave a collapsed field "Favourite People" in (B).

Figure 11:
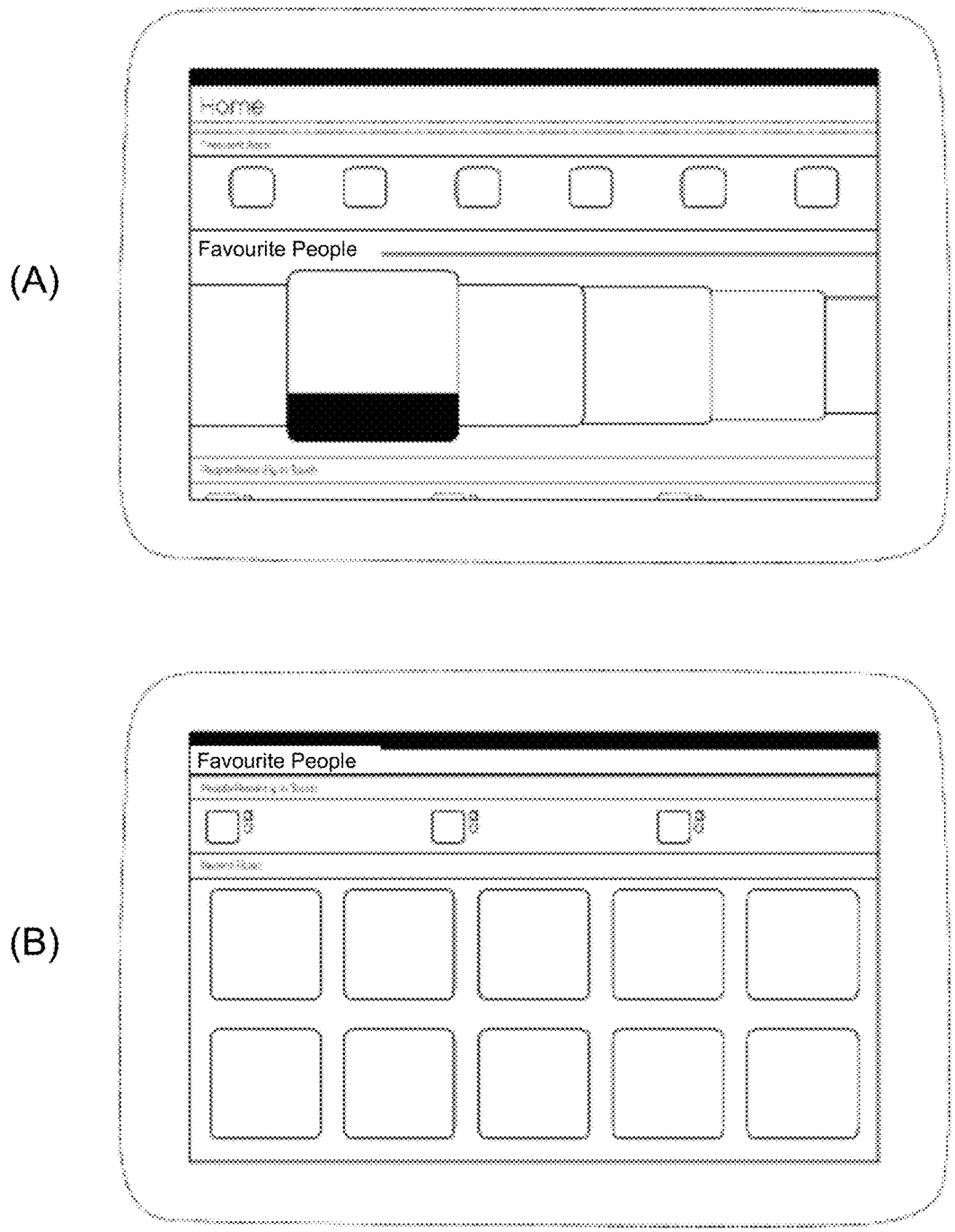
FIG. 11 shows an example in which the "Favourite People" field in (A) collapses when scrolling down to leave a collapsed field "Favourite People" in (B).

There is provided a Home page for a tablet. The Home page may be such that scrolling down on the Home page collapses fields that are being scrolled out of view, and when being scrolled back into view those fields may expand again. The Home page may be such that swiping right to left on the screen brings up the Apps page and swiping left to right brings up the Social scope. An example is shown in FIG. 11, in which the "Favourite People" field in (A) collapses when scrolling down to leave a collapsed field "Favourite People" in (B).

There is provided an Apps page for a smartphone. The Apps page may be such that scrolling down on the Apps page collapses fields that are being scrolled out of view, and when being scrolled back into view those fields may expand again. The Apps page may be such that swiping right to left on the screen brings up a Videos page and swiping left to right brings back the Home page.

Figure 12:
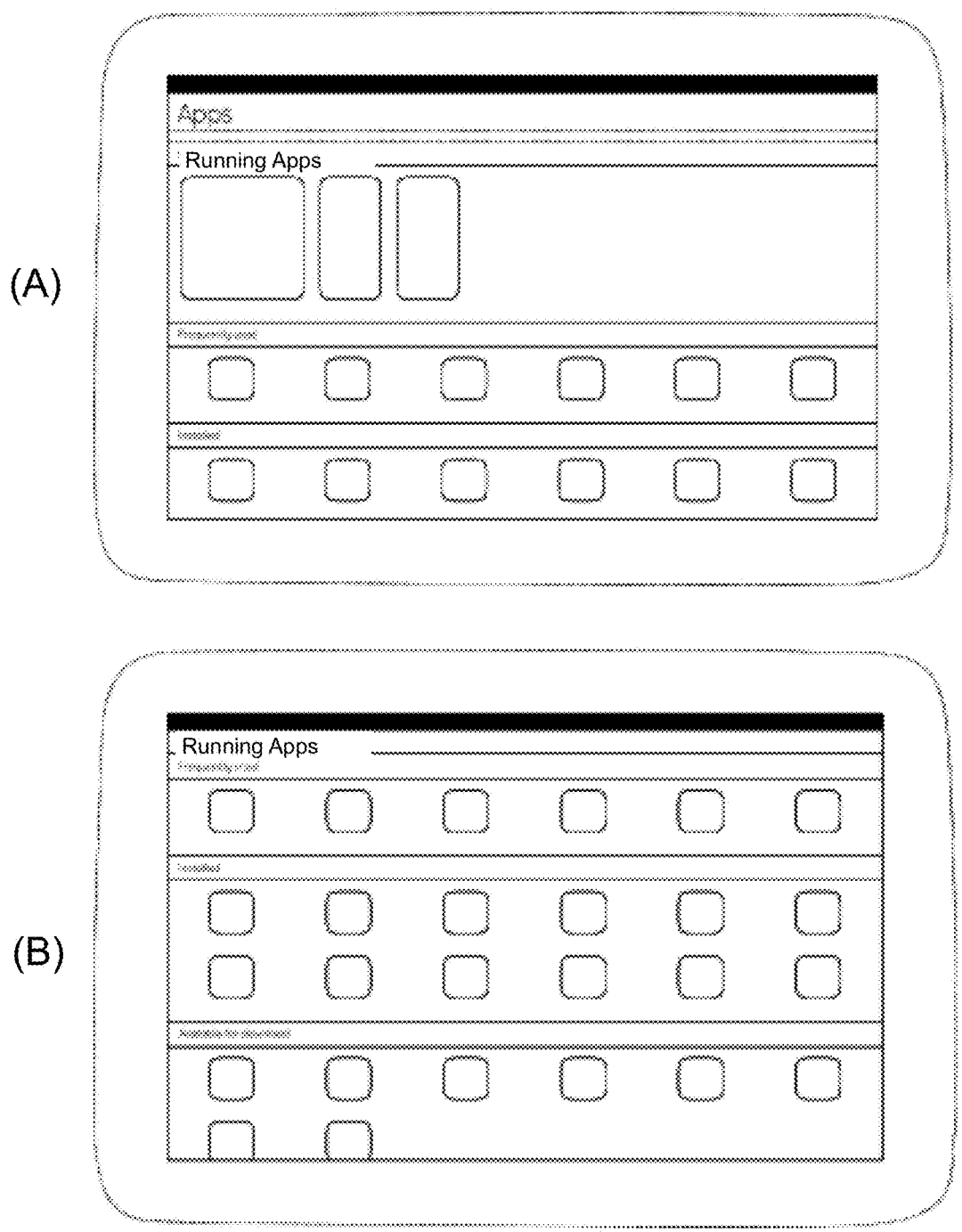
FIG. 12 shows an example in which the "Running Apps" field in (A) collapses when scrolling down to leave a collapsed field "Running Apps" in (B).

There is provided an Apps page for a tablet. The Apps page may be such that scrolling down on the Apps page collapses fields that are being scrolled out of view, and when being scrolled back into view those fields may expand again. The Apps page may be such that swiping right to left on the screen brings up a Videos page and swiping left to right brings back the Home page. An example is shown in FIG. 12, in which the "Running Apps" field in (A) collapses when scrolling down to leave a collapsed field "Running Apps" in (B).

There is provided a Videos page for a smartphone. The Videos page may be such that scrolling down on the Videos page collapses fields that are being scrolled out of view, and when being scrolled back into view those fields may expand again. The Videos page may be such that swiping left to right on the screen brings back the Apps page.

Figure 13:
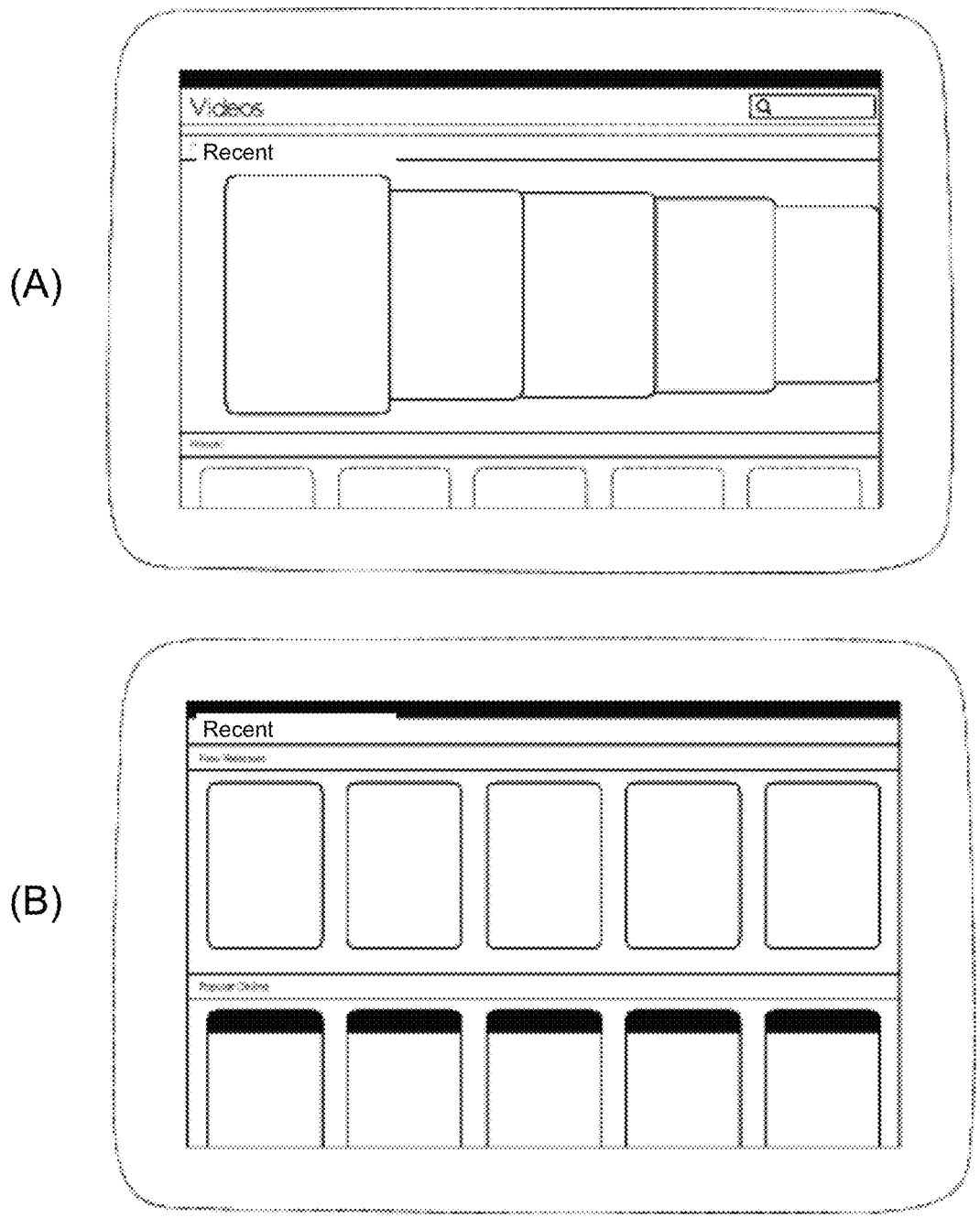
FIG. 13 shows an example in which the "Recent" field in (A) collapses when scrolling down to leave a collapsed field "Recent" in (B).

There is provided a Videos page for a tablet. The Videos page may be such that scrolling down on the Videos page collapses fields that are being scrolled out of view, and when being scrolled back into view those fields may expand again. The Videos page may be such that swiping left to right on the screen brings back the Apps page. An example is shown in FIG. 13, in which the "Recent" field in (A) collapses when scrolling down to leave a collapsed field "Recent" in (B).

Figure 14:
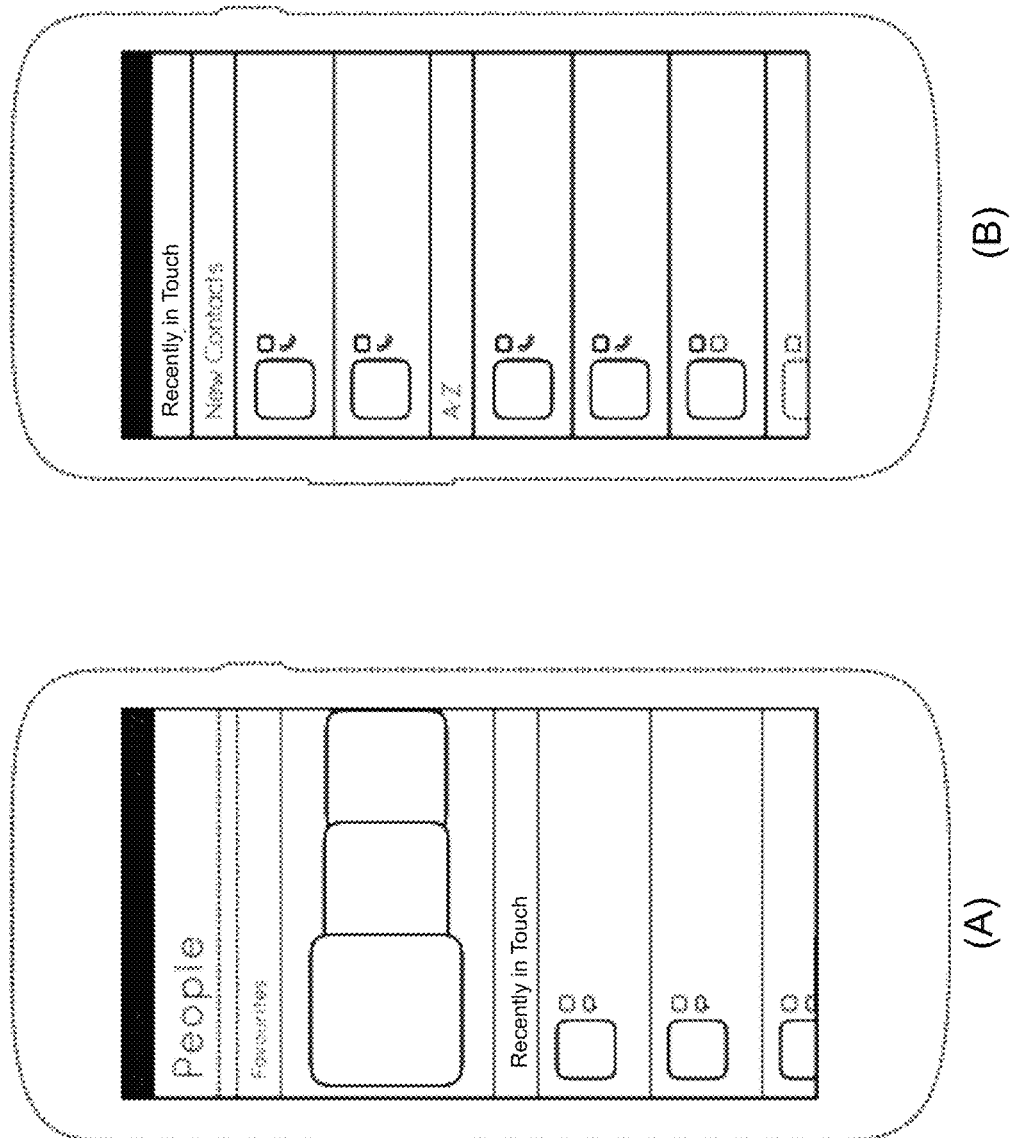
FIG. 14 shows an example in which the "Recently in Touch" field in (A) collapses when scrolling down to leave a collapsed field "Recently in Touch" in (B).

There is provided a Social Scope page for a smartphone. The Social Scope page may be such that scrolling down on the Social scope page collapses fields that are being scrolled out of view, and when being scrolled back into view those fields may expand again. Swiping left to right on the screen may bring up the Music page. Swiping right to left may bring back the Home page. An example is shown in FIG. 14, in which the "Recently in Touch" field in (A) collapses when scrolling down to leave a collapsed field "Recently in Touch" in (B).

Figure 15:
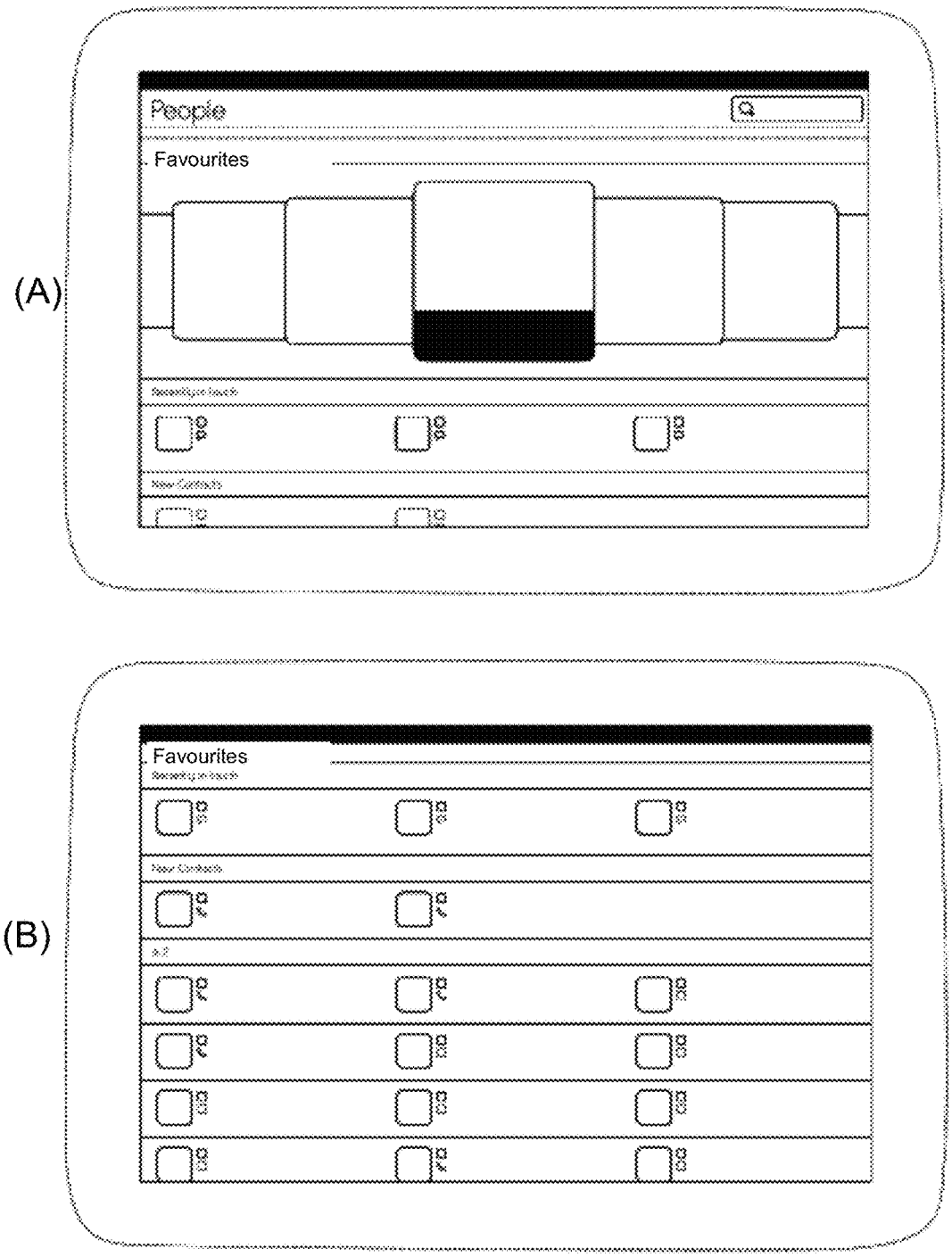
FIG. 15 shows an example in which the "Favourites" field in (A) collapses when scrolling down to leave a collapsed field "Favourites" in (B).

There is provided a Social Scope page for a tablet. The Social Scope page may be such that scrolling down on the Social scope page collapses fields that are being scrolled out of view, and when being scrolled back into view those fields may expand again. Swiping left to right on the screen may bring up the Music page. Swiping right to left may bring back the Home page. An example is shown in FIG. 15, in which the "Favourites" field in (A) collapses when scrolling down to leave a collapsed field "Favourites" in (B).

Figure 16:
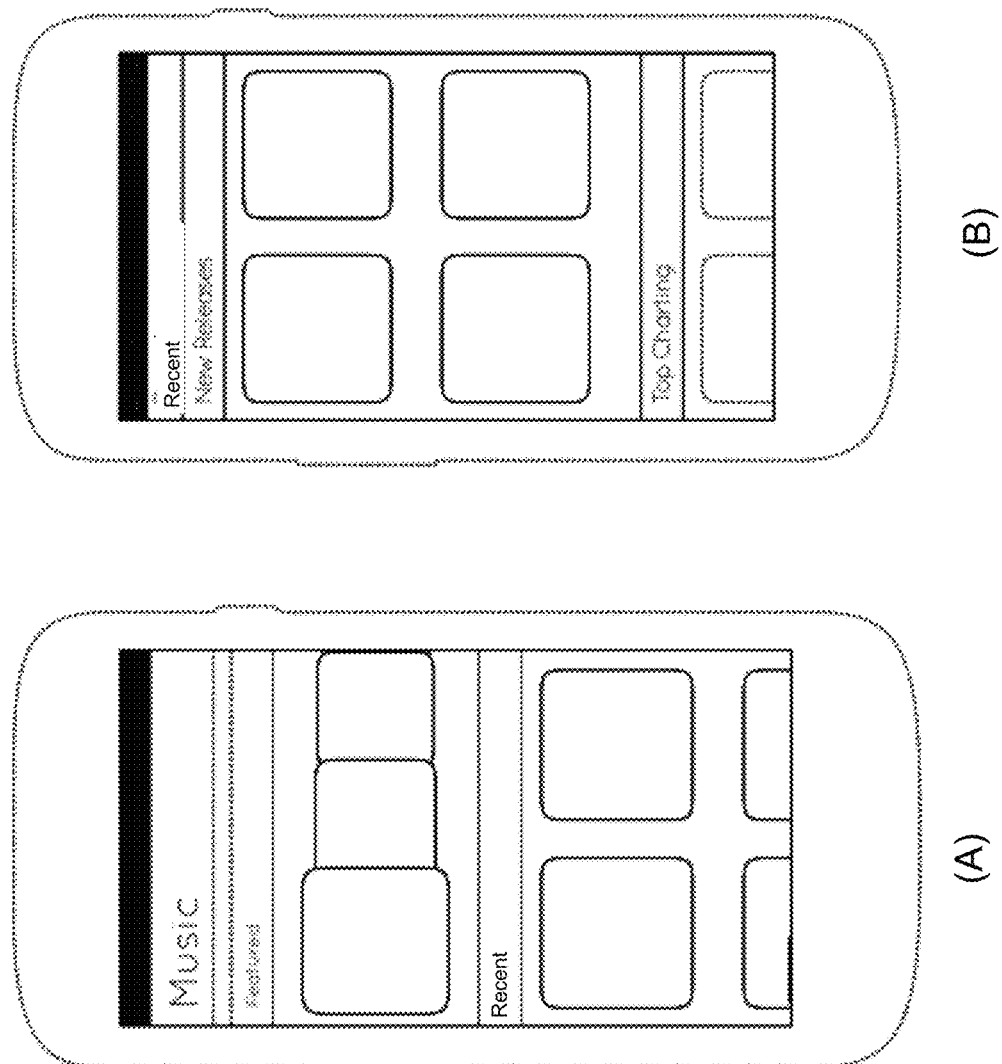
FIG. 16 shows an example in which the "Recent" field in (A) collapses when scrolling down to leave a collapsed field "Recent" in (B).

There is provided a Music page for a smartphone. The Music page may be such that scrolling down on the Music page collapses fields that are being scrolled out of view, and when being scrolled back into view those fields may expand again. Swiping right to left on the screen may bring back the Social scope screen. An example is shown in FIG. 16, in which the "Recent" field in (A) collapses when scrolling down to leave a collapsed field "Recent" in (B).

Figure 17:
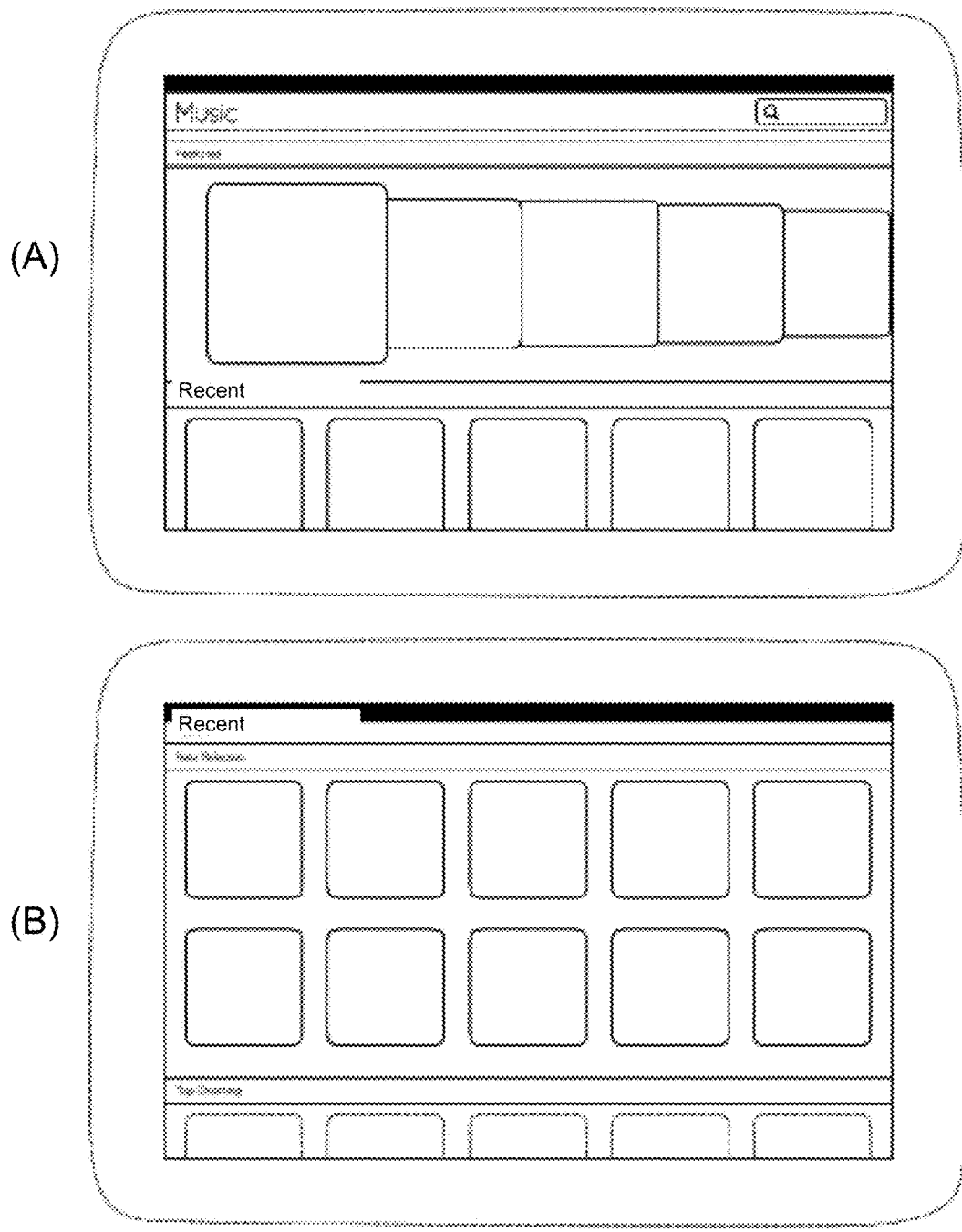
FIG. 17 shows an example in which the "Recent" field in (A) collapses when scrolling down to leave a collapsed field "Recent" in (B).

There is provided a Music page for a tablet. The Music page may be such that scrolling down on the Music page collapses fields that are being scrolled out of view, and when being scrolled back into view those fields may expand again. Swiping right to left on the screen may bring back the Social scope screen. An example is shown in FIG. 17, in which the "Recent" field in (A) collapses when scrolling down to leave a collapsed field "Recent" in (B).

Figure 18:
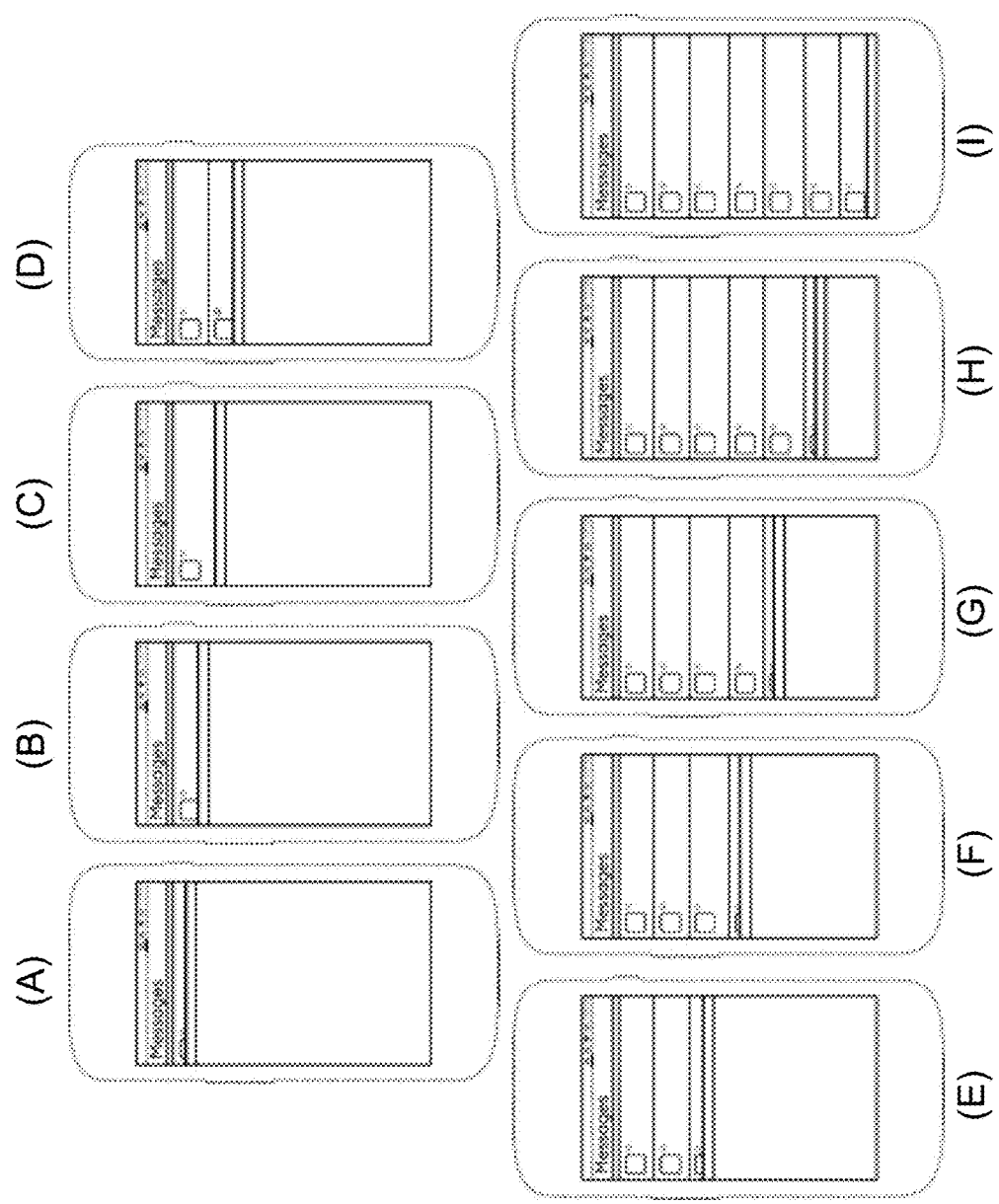
FIG. 18 shows an example in which the messages list is brought down as a finger is swiped down from the message icon, in the sequence from (A) to (I).

There is provided a Messages page for a smartphone. A user may bring down the Messages list by swiping a finger down from the message icon in the top right of the screen. An example is shown in FIG. 18, in which the messages list is brought down as a finger is swiped down from the message icon, in the sequence from (A) to (I).

Figure 19:
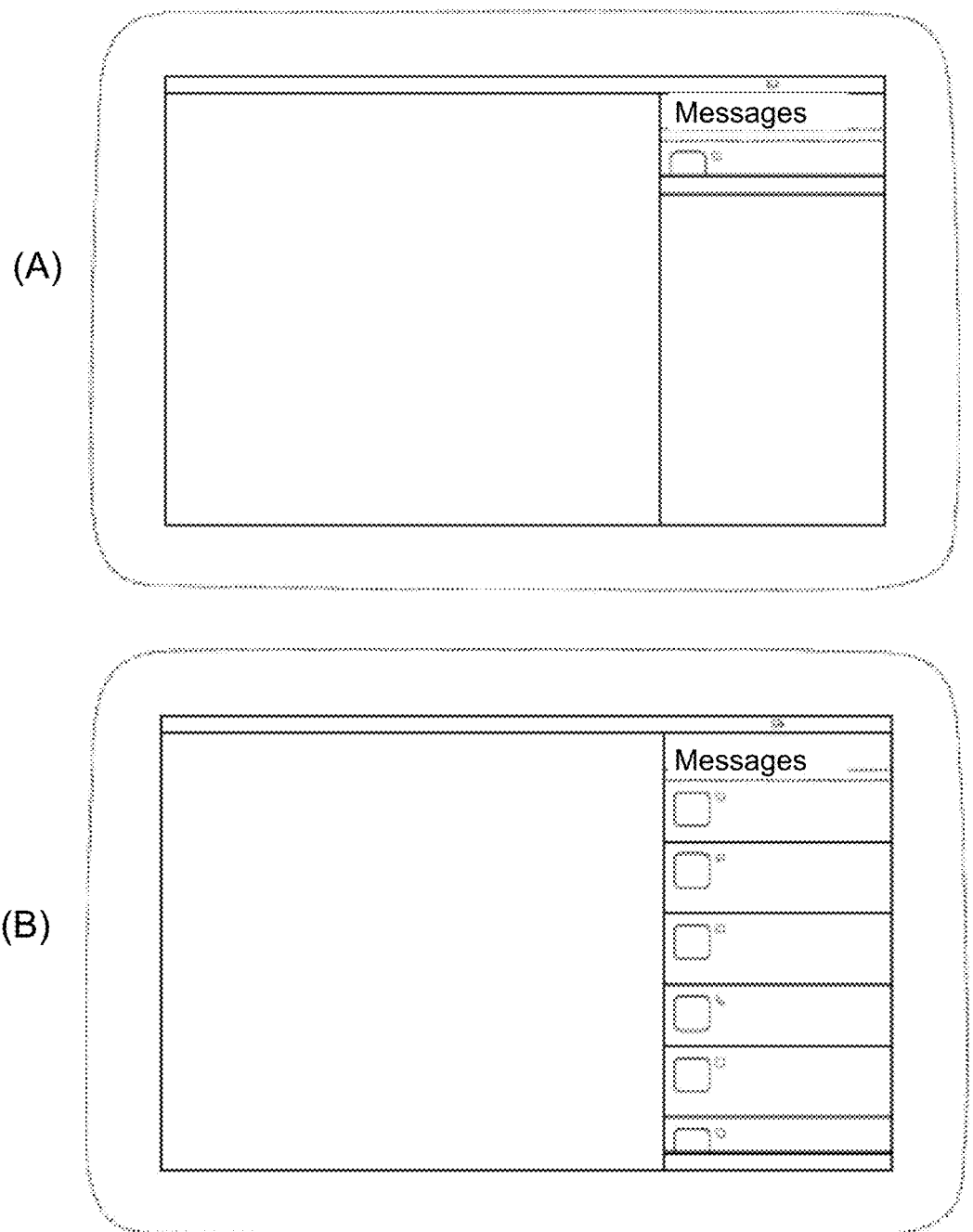
FIG. 19 shows an example in which the messages list is brought down as a finger is swiped down from the message icon, in the sequence from (A) to (B).

There is provided a Messages page for a tablet. A user may bring down the Messages list by swiping a finger down from the message icon in the top right of the screen. An example is shown in FIG. 19, in which the messages list is brought down as a finger is swiped down from the message icon, in the sequence from (A) to (B).

Figure 20:
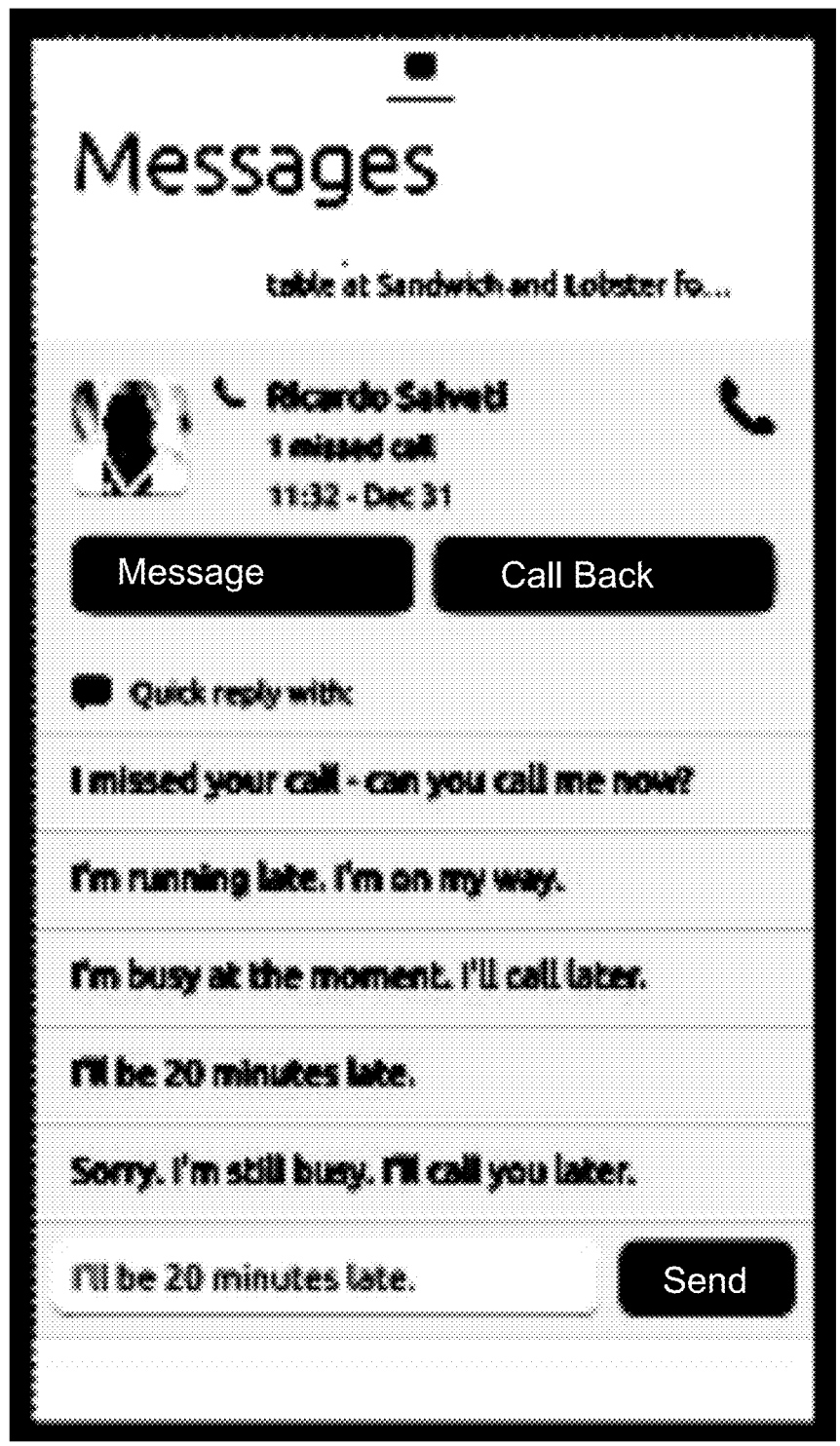
FIG. 20 shows an example of a list of pre-made messages from which a quick reply may be selected for sending.

There is provided a Messages page for a smartphone. The Messages page may provide for message interaction. For example, from a drop down message list, a user may choose to directly call back on a missed call, to write a message or to send a quick reply with a pre-made message. From the message list, several different types of messages may be replied to including (but not restricted to) missed skype calls and messages, emails and Facebook messages. An example is shown in FIG. 20, which shows a list of pre-made messages from which a quick reply may be selected for sending.

There is provided a Messages page for a tablet. The Messages page may provide for message interaction. For example, from a drop down message list, a user may choose to directly call back on a missed call, to write a message or to send a quick reply with a pre-made message. From the message list, several different types of messages can be replied to including (but not restricted to) missed skype calls and messages, emails and Facebook messages. In an example, a user may reply back to an email.

Figure 21:
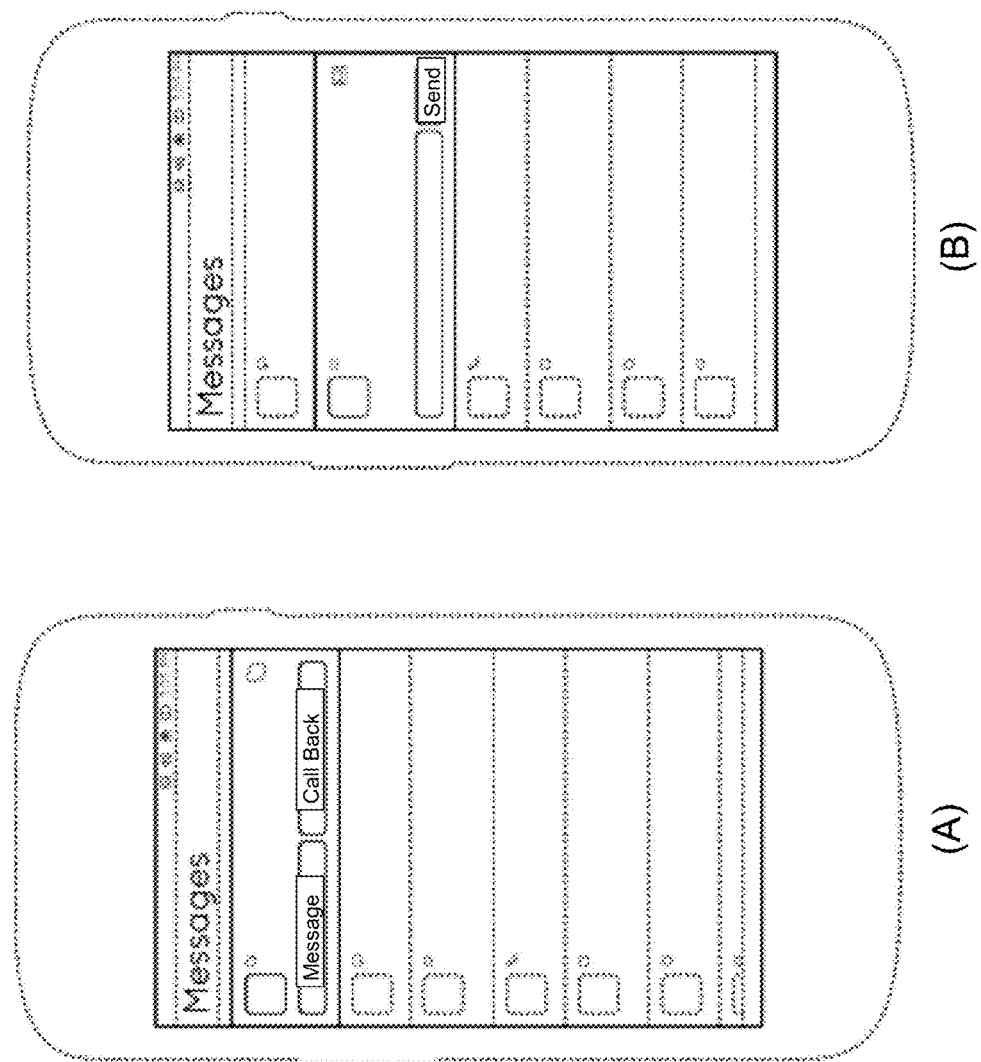
FIG. 21 shows an example (A) in which an area is expanded from which a user can select to send a text message or to call back, and an example (B), in which a text box for entering a text message is opened up within a message in a list of messages.

There is provided a Messages page for a smartphone. An accordion function may be provided in that when a message is selected, the messages above and/or below are pushed away to make space for an area in which a reply can be composed. Examples are shown in FIG. 21. In an example (see eg. (A)) an area is expanded from which a user can select to send a text message or to call back. In an example (see eg. (B)), a text box for entering a text message is opened up within a message in a list of messages. In a further example, an area is opened up from which a quick reply text can be selected from a pre-prepared list of replies.

There is provided a Messages page for a tablet. An accordion function may be provided in that when a message is selected, the messages above and/or below are pushed away to make space for an area in which a reply can be composed. In an example, an area is expanded from which a user can select to send a text message or to call back. In an example, a text box for entering a text message is opened up within a message in a list of messages. In a further example, an area is opened up from which a quick reply text can be selected from a pre-prepared list of replies.

Figure 22:
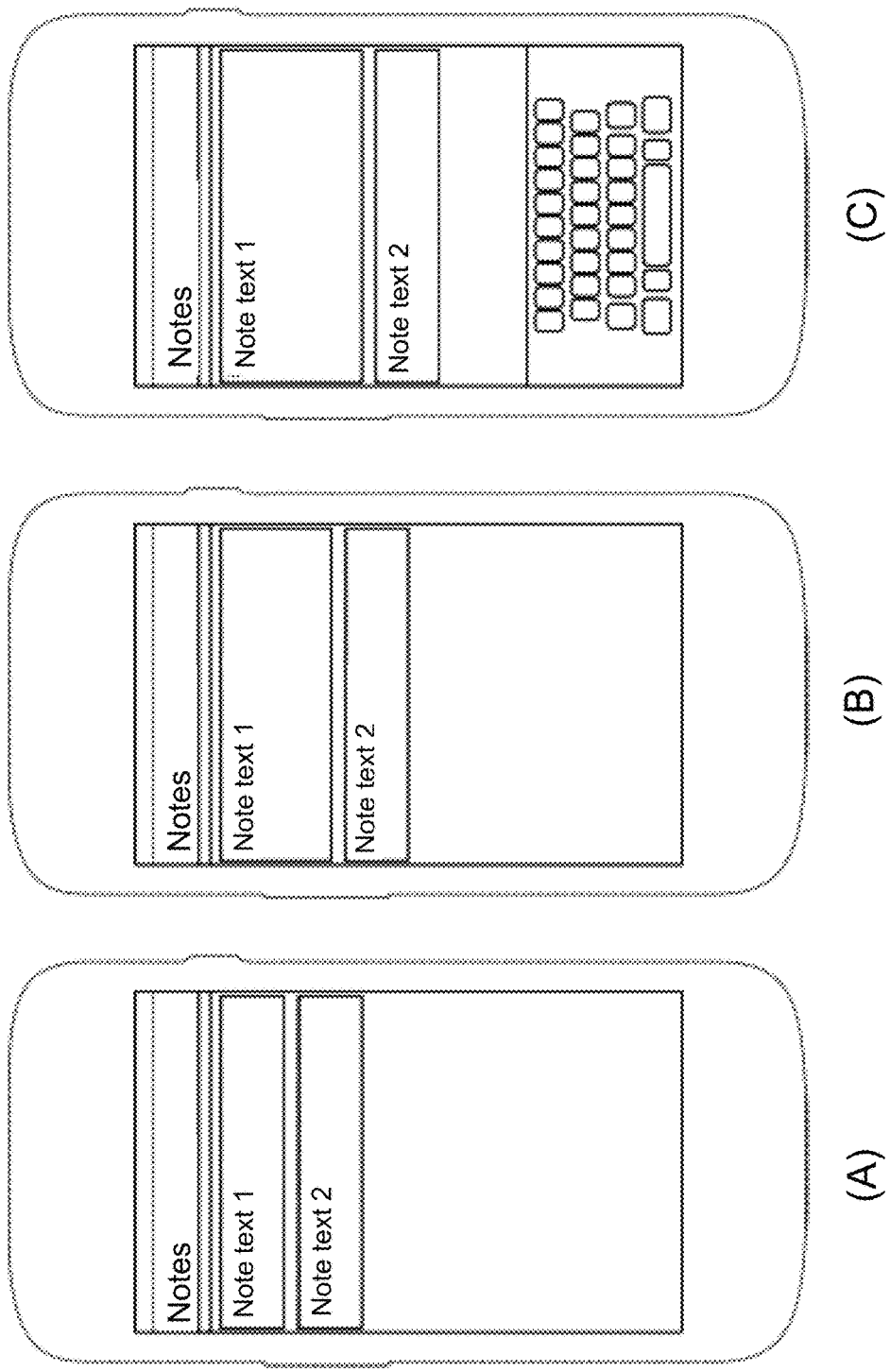
FIG. 22 shows an example in which in the sequence from (A) to (C), a Note expands when tapped on, and a touch screen keyboard is provided for editing the Note contents.

There is provided a Notes page for a smartphone. An accordion function may be provided in that when a note is tapped on, it will expand (eg. like an accordion), to facilitate editing. An example is shown in FIG. 22. In FIG. 22, in the sequence from (A) to (C), the Note expands when tapped on, and a touch screen keyboard is provided for editing the Note contents.

Figure 23:
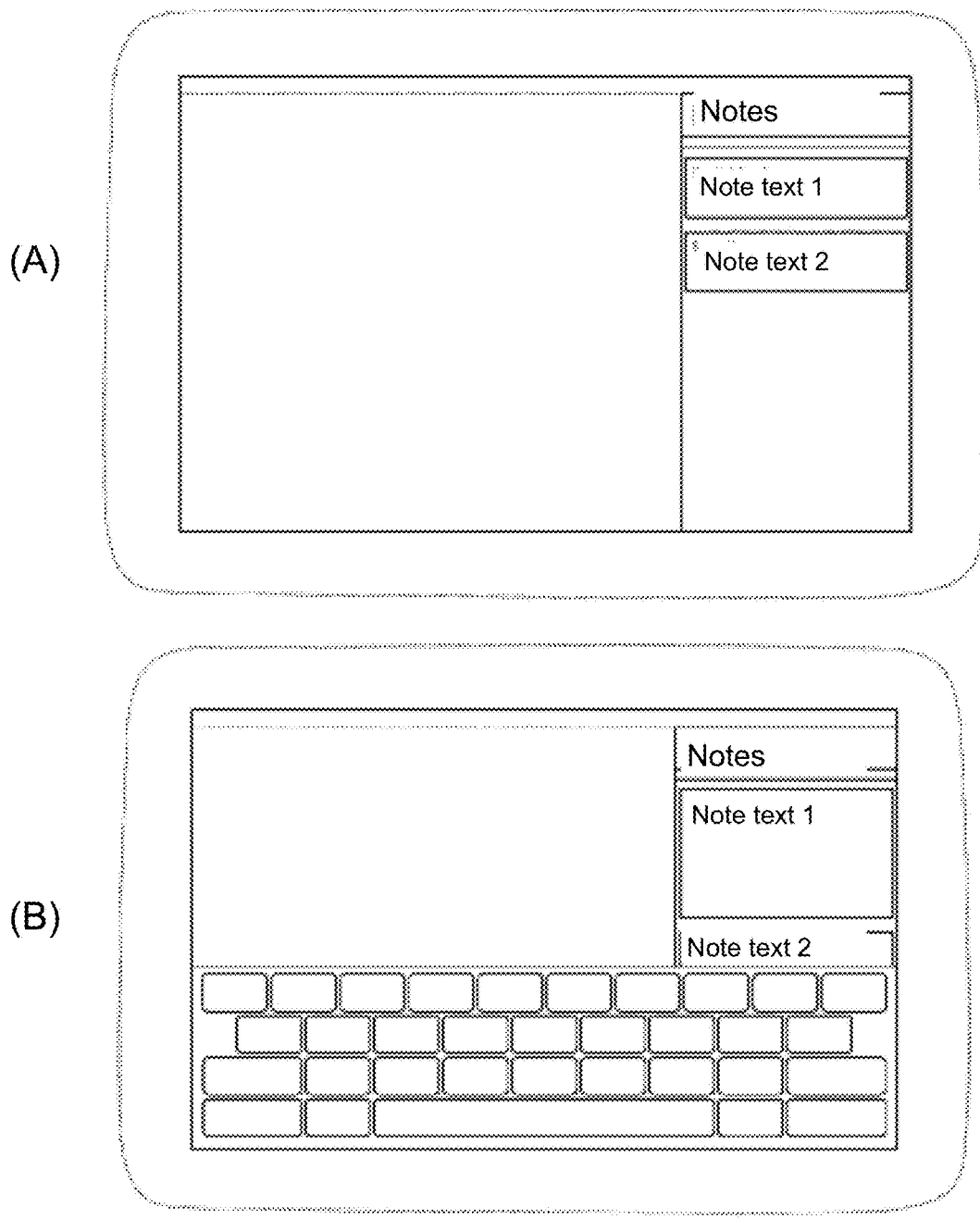
FIG. 23 shows an example in which in the sequence from (A) to (B), the note expands when tapped on, and a touch screen keyboard is provided for editing the Note contents.

There is provided a Notes page for a tablet. An accordion function may be provided in that when a note is tapped on, it will expand like an accordion, to facilitate editing. The note may expand when tapped on, and a touch screen keyboard may be provided for editing the Note contents. An example is shown in FIG. 23. In FIG. 23, in the sequence from (A) to (B), the note expands when tapped on, and a touch screen keyboard is provided for editing the Note contents.

Figure 24:
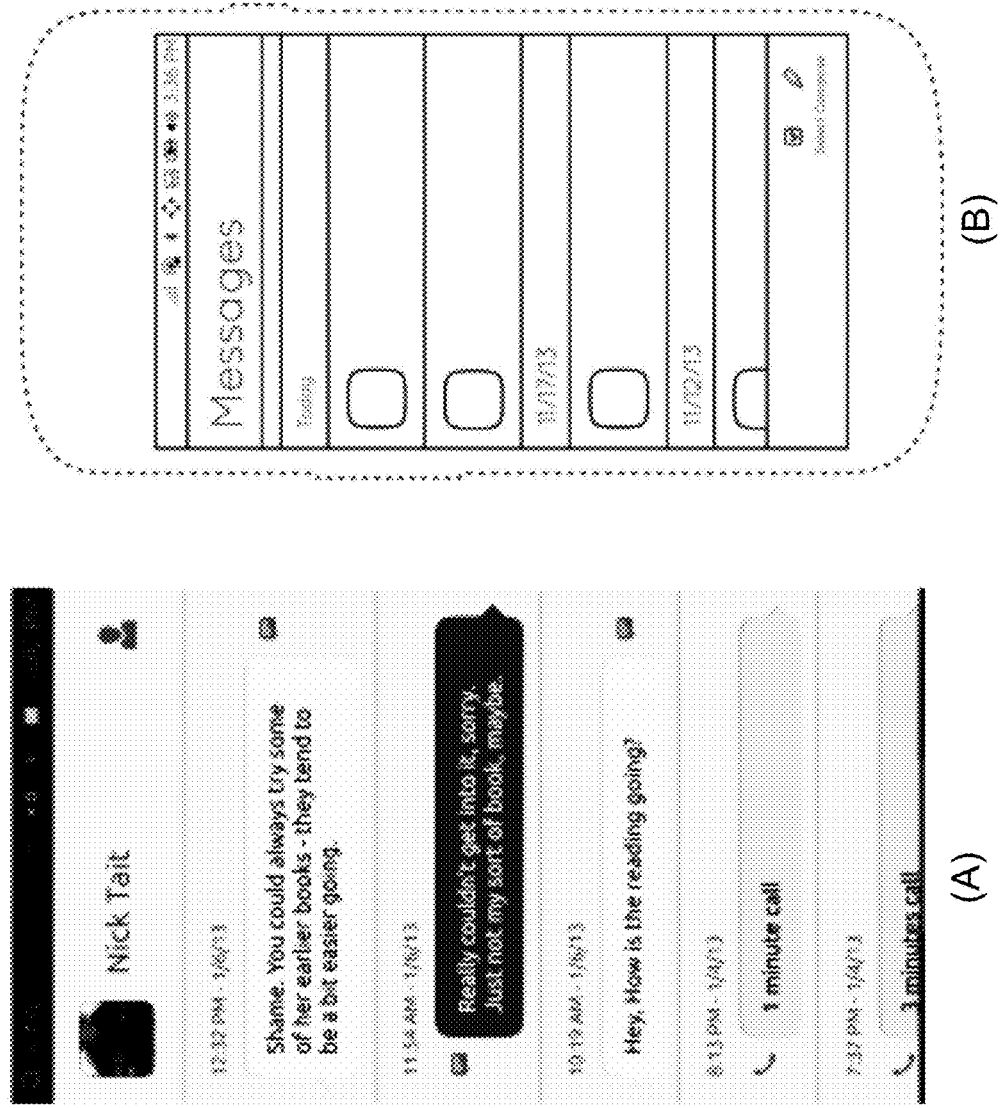
FIG. 24 shows in (A) an example in which a conversation field page shows missed calls and messages, and in (B) SMS messaging is split into its own application called Messaging and no longer shows phone calls as a part of the conversation history.

There is provided a Conversation Field page for a smartphone. In an implementation, a conversation field page shows missed calls and messages. An example is shown in (A) in FIG. 24. In an alternative implementation, SMS messaging is split into it's own application called Messaging and no longer shows phone calls as a part of the conversation history. An example is shown in (B) in FIG. 24.

There is provided a Conversation Field page for a tablet. In an implementation, a conversation field page shows missed calls and messages.

Figure 25:
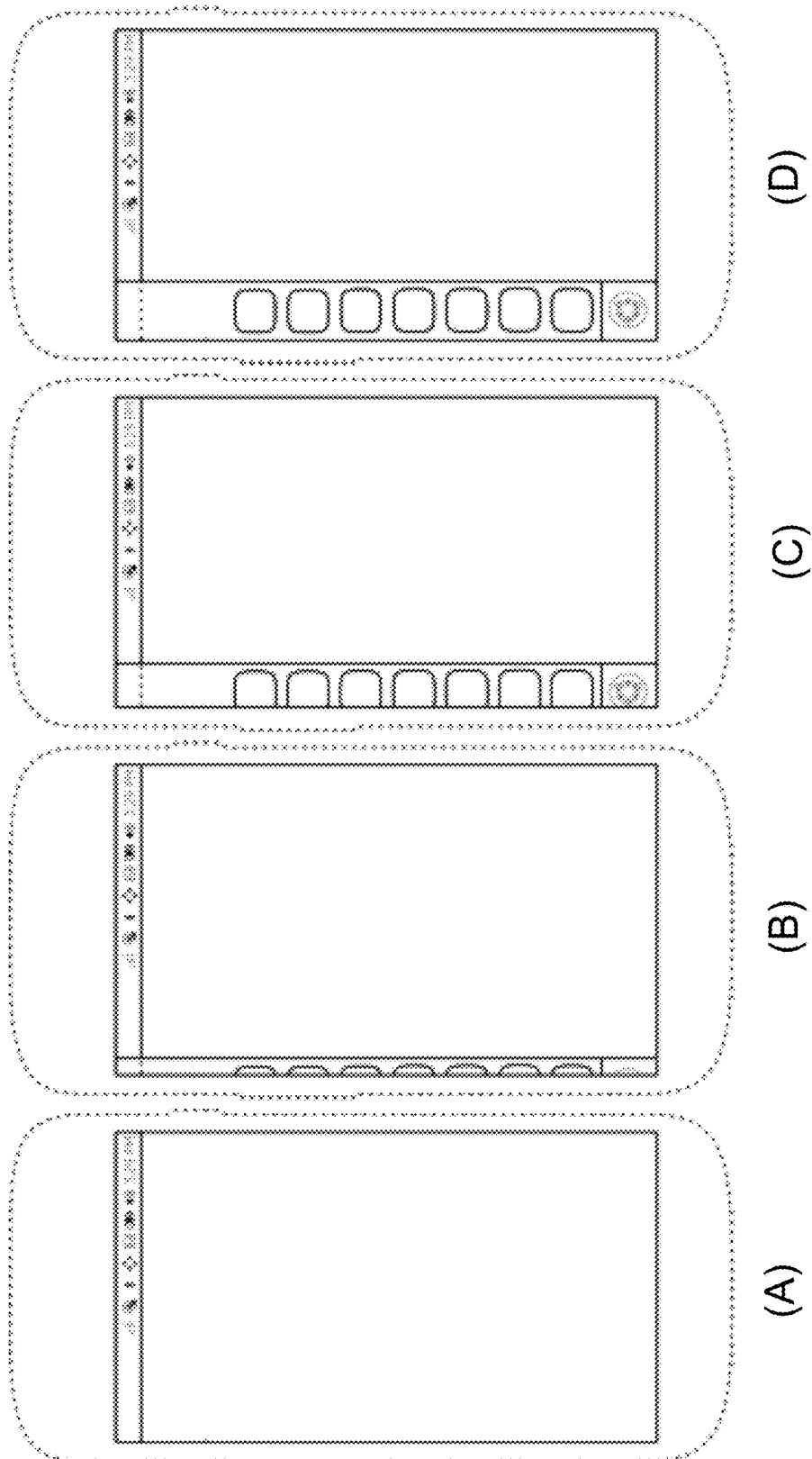
FIG. 25 shows an example in which the sequence from (A) to (D) shows an example of the launcher bar being revealed after a short swipe from the left edge of the screen.
Figure 26:
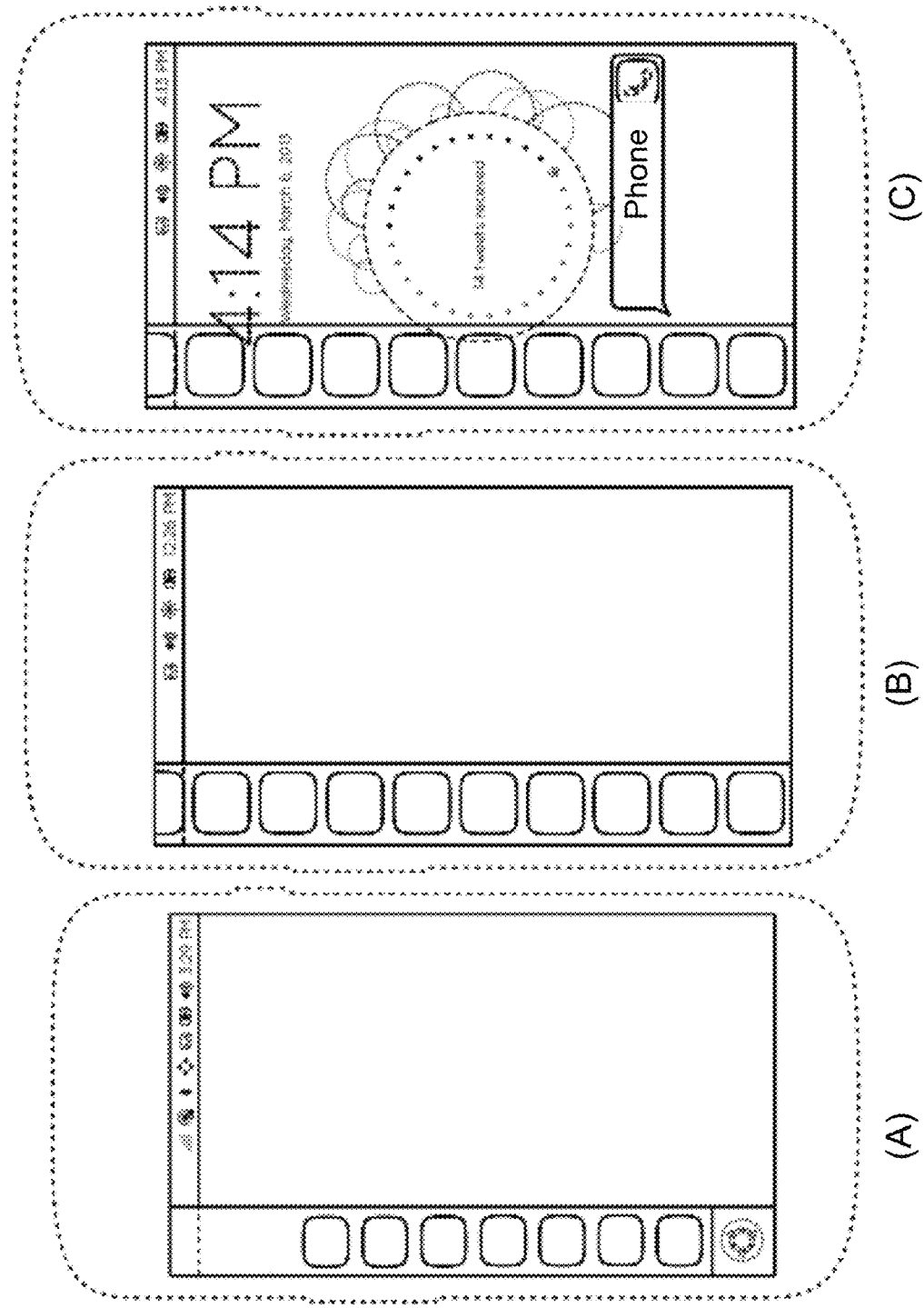
FIG. 26 shows an example in which the sequence from (A) to (C) shows an example of a launcher bar scrolling down (from (A) to (B)) and an app icon revealing the name of that app (from (B) to (C), for the App "Phone" in this example).

There is provided a Launcher bar for a smartphone. The Launcher bar is available from all views of the phone, a Welcome screen, a Home screen or inside an app. It may be revealed with a short swipe from the left edge of the screen. Holding a finger on an app icon may reveal the name of that app. The launcher bar may show favourite and opened apps. An example is shown in FIG. 25. In FIG. 25, the sequence from (A) to (D) shows an example of the launcher bar being revealed after a short swipe from the left edge of the screen. An example is shown in FIG. 26. In FIG. 26, the sequence from (A) to (C) shows an example of a launcher bar scrolling down (from (A) to (B)) and an app icon revealing the name of that app (from (B) to (C), for the App "Phone" in this example).

Figure 27:
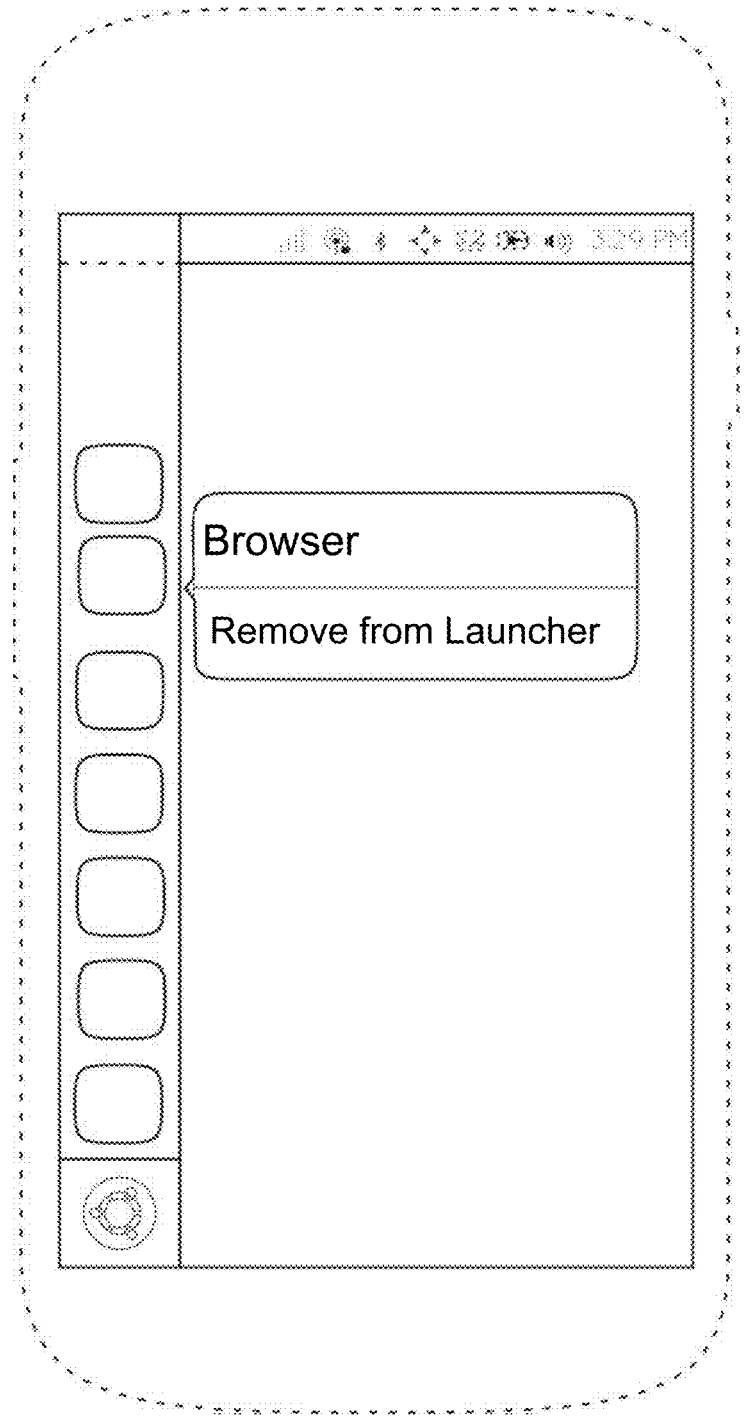
FIG. 27 shows an example in which long pressing on a launcher icon shows the app name.

There is provided a Launcher bar for a smartphone. In an alternative implementation, long pressing on a launcher icon shows the app name and may show a quicklist. An example is shown in FIG. 27, for the App "Browser". An option to remove a launcher icon from the Launcher bar may be provided. It is also possible to reorder launcher icons by long pressing an icon, and then dragging and dropping it to a new place in the launcher.

Figure 28:
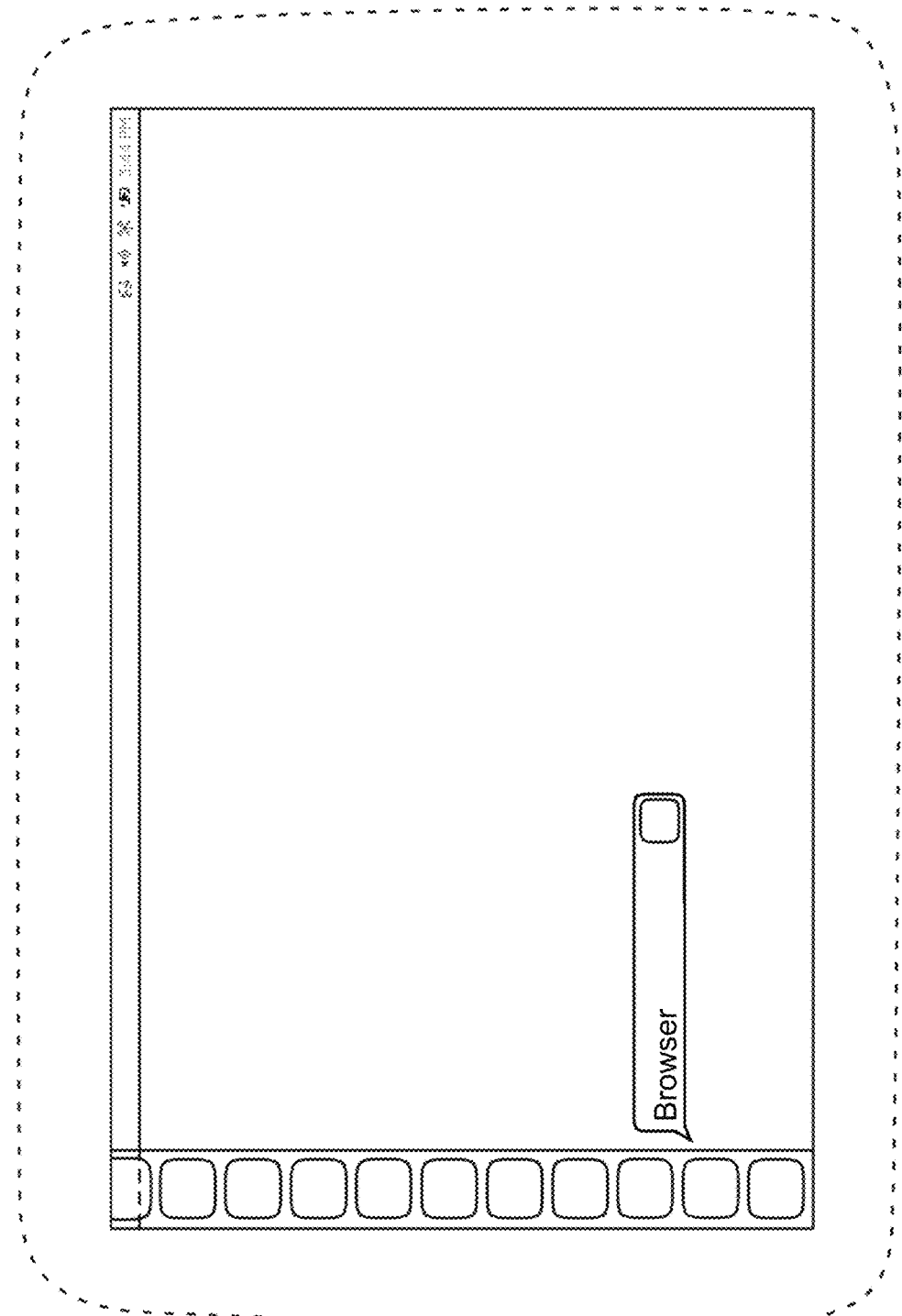
FIG. 28 shows an example in which long pressing on a launcher icon shows the app name.

There is provided a Launcher bar for a tablet. The Launcher bar is available from all views of the tablet, a Welcome screen, a Home screen or inside an app. It may be revealed with a short swipe from the left edge of the screen. Holding a finger on an app icon may reveal the name of that app. An example is shown in FIG. 28. The launcher bar may show favourite and opened apps.

Figure 29:
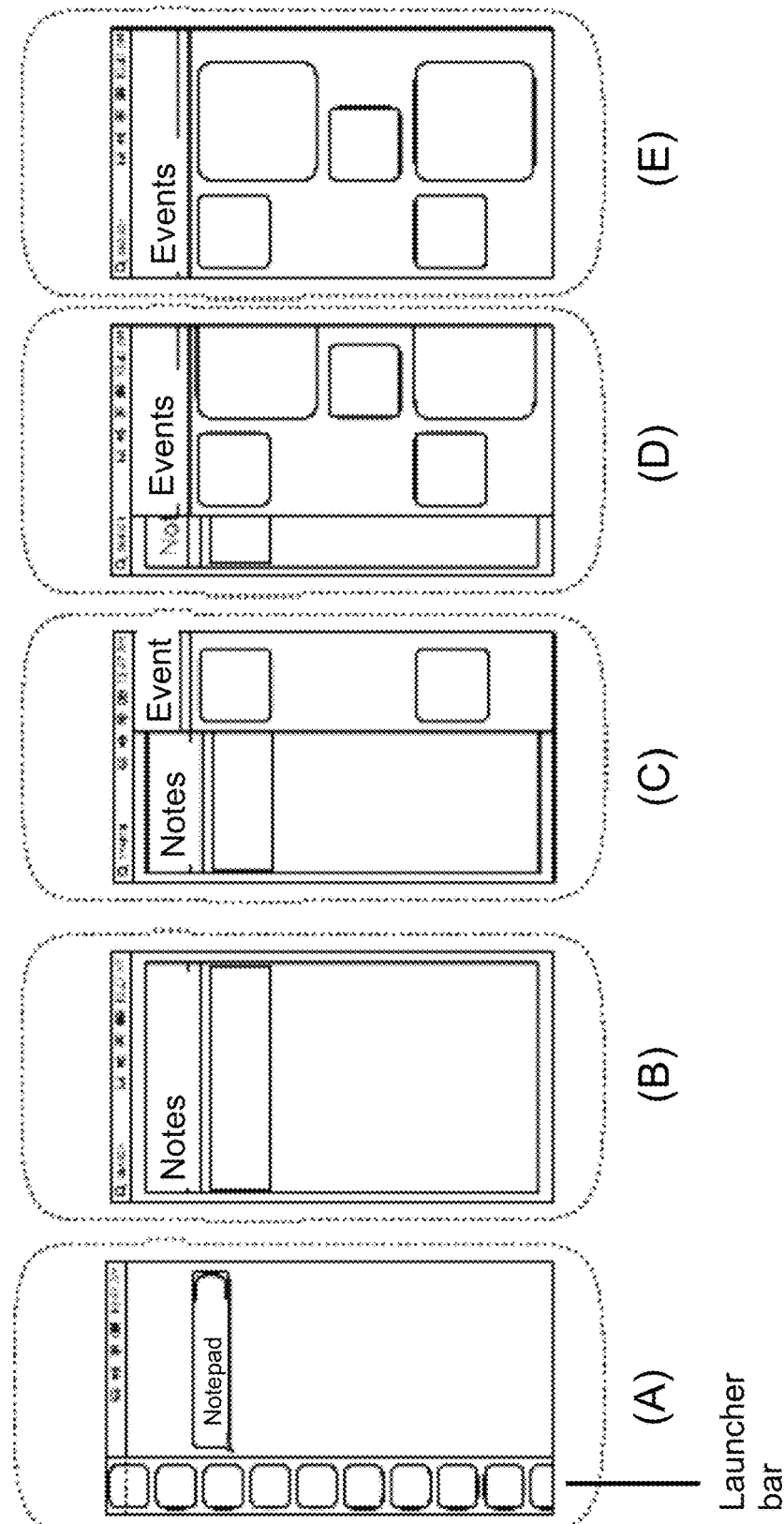
FIG. 29 shows an example including a sequence of screen images from (A) to (E). In (A), a user chooses the application "Notepad" from the launcher bar. In (B), the screen displays the Notepad application screen output. In (C), a user is swiping a finger across the screen from the right edge of the screen to return to the previous application "Events". In (C) and (D), screen output from the previous application "Events" is returning to the screen from the right. In (E), screen output from the application "Events" is shown.

There is provided a Launcher bar for a smartphone. It may be possible to go back between apps. To start a favourite application, a user may choose an application from the launcher bar. To go back to a previous app, a user may swipe with the finger across the screen from the right edge of the screen. An example is shown in FIG. 29, which presents a sequence of screen images from (A) to (E). In (A), a user chooses the application "Notepad" from the launcher bar. In (B), the screen displays the Notepad application screen output. In (C), a user is swiping a finger across the screen from the right edge of the screen to return to the previous application "Events". In (C) and (D), screen output from the previous application "Events" is returning to the screen from the right. In (E), screen output from the application "Events" is shown.

Figure 30:
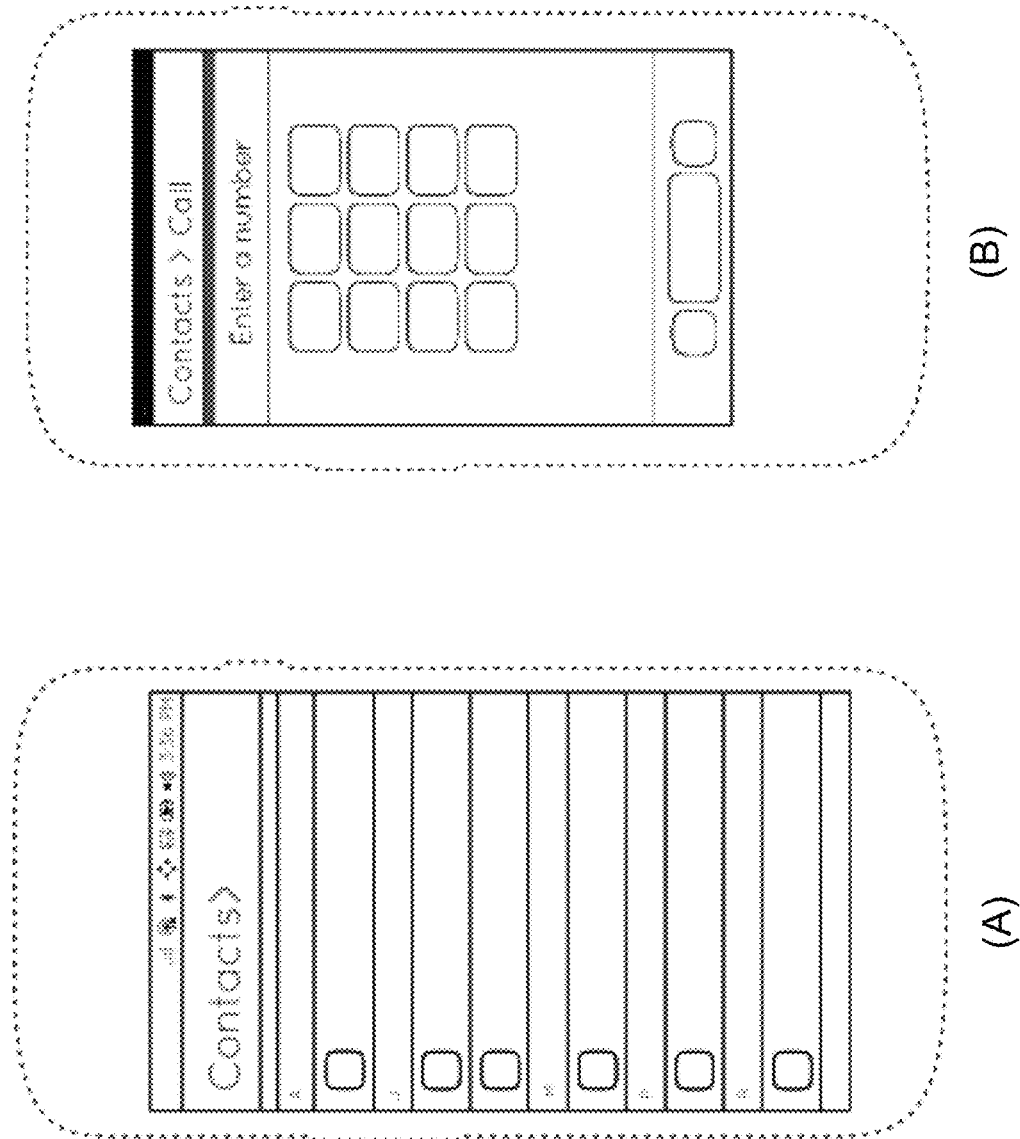
FIG. 30 shows an example in which a Contacts screen changes to a Call screen for a Contacts screen, in the sequence from (A) to (B).

There is provided a navigation function for a smartphone. In implementations, a user swiping a finger horizontally, in the header (eg. where it says Contacts), brings out a navigation function screen that helps the user navigate and change screen with a simple tap of the finger. An example is shown in FIG. 30, in which a Contacts screen changes to a Call screen for a Contacts screen, in the sequence from (A) to (B).

Figure 31:
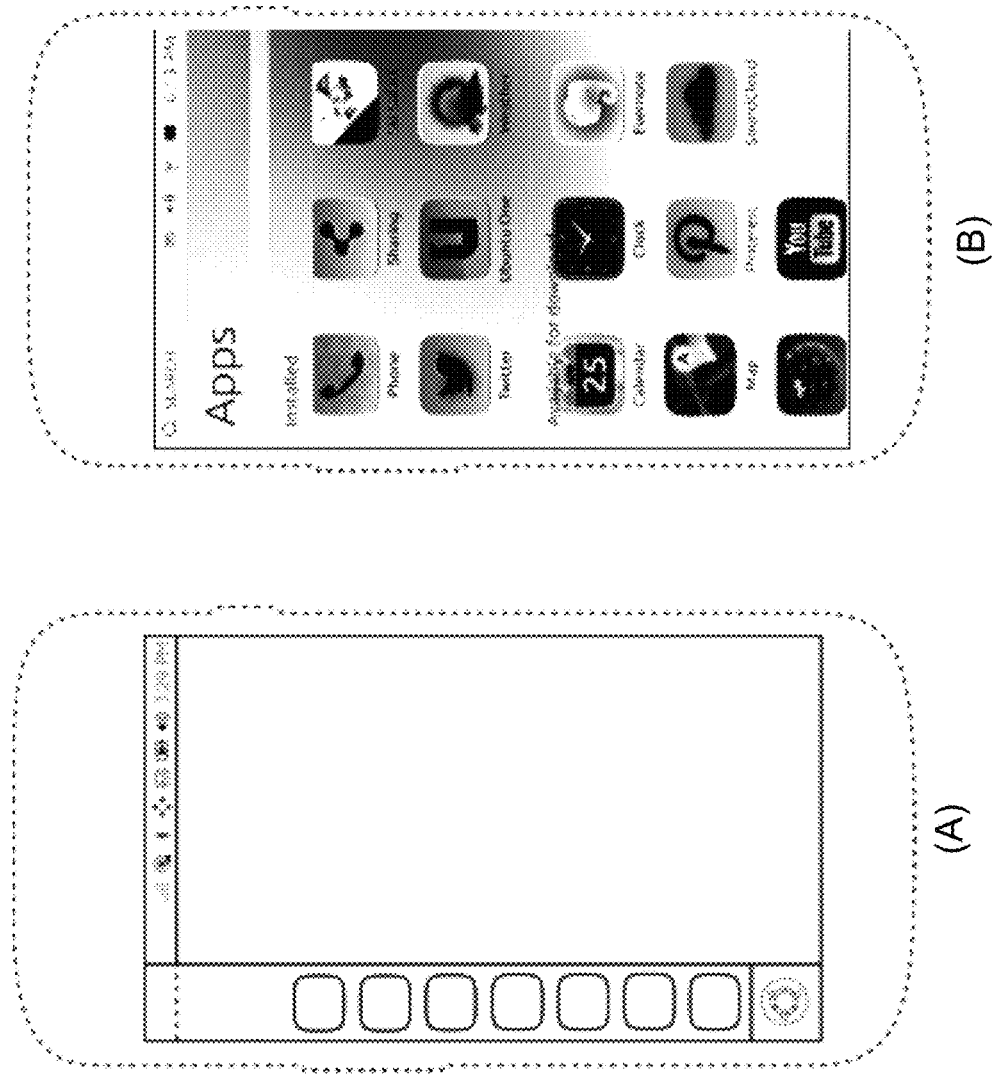
FIG. 31 shows an example in which for the sequence from (A) to (B) a long swipe from the left edge of the screen brings up the Apps page.

There is provided a Left Edge Swipe function for a smartphone or for a tablet. On both phone and tablet, a long swipe from the left edge of the screen will bring up the Apps page except when in the Home screen. An example is shown in FIG. 31, for the sequence from (A) to (B).

Figure 32:
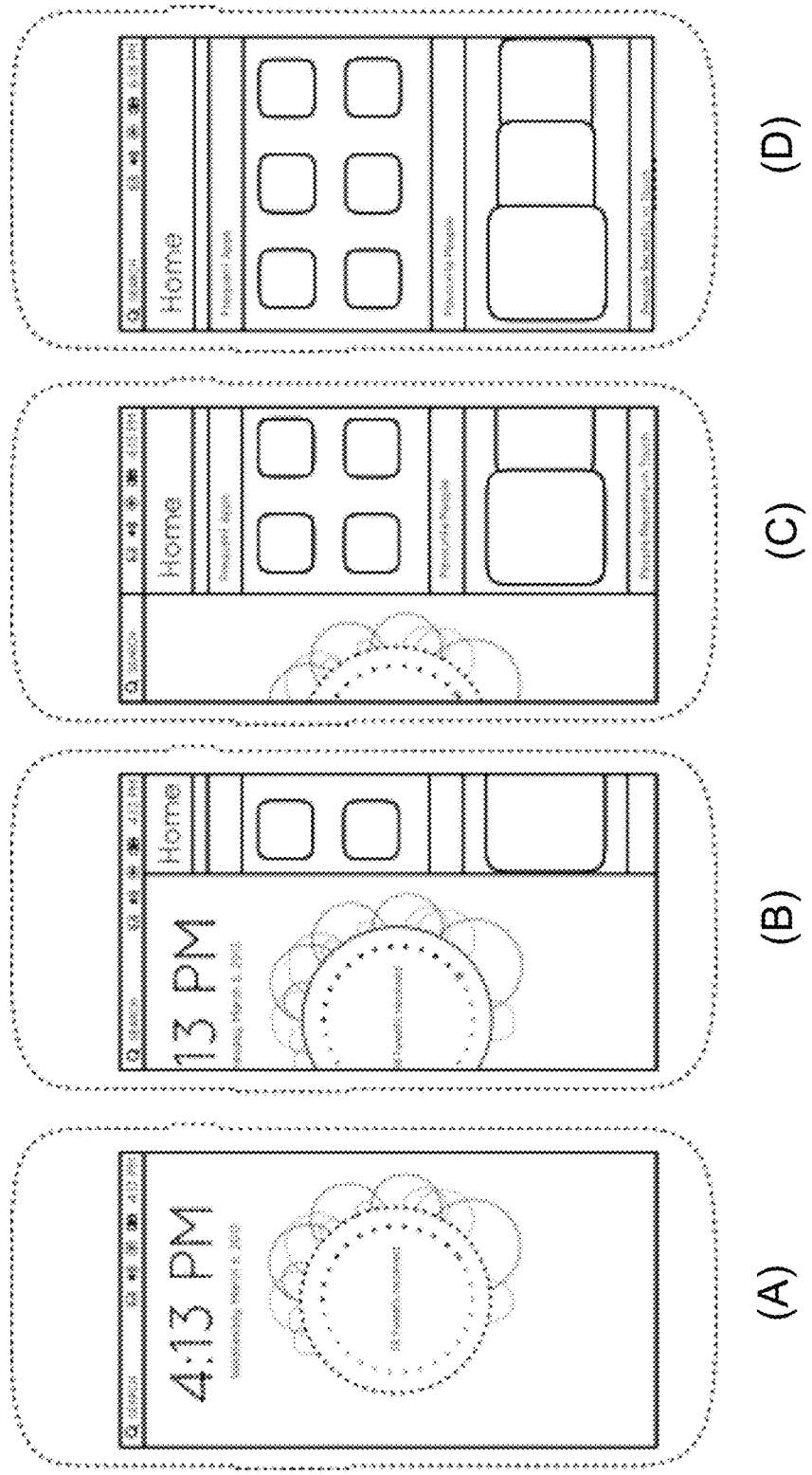
FIG. 32 shows an example in which for the sequence from (A) to (D), swiping left from the right edge of the screen brings up the Home page.

There is provided a Right Edge Swipe function for a smartphone. When viewing the Welcome screen, swiping left from the right edge of the screen brings up the Home page. An example is shown in FIG. 32, for the sequence from (A) to (D). In all views except the Welcome Screen, swiping left from the right edge of the screen may bring up the previously used and open app.

Figure 33:
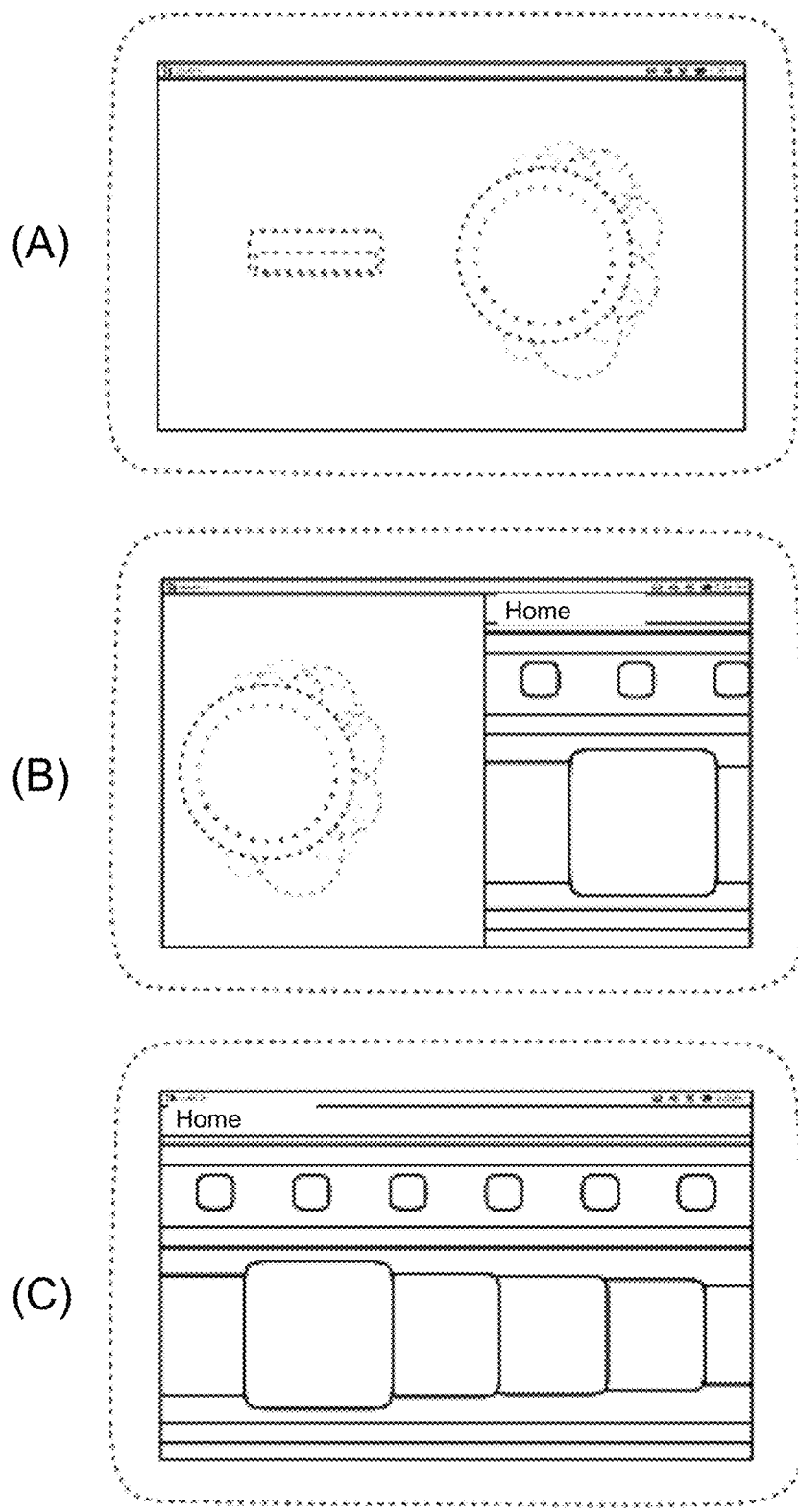
FIG. 33 shows an example in which for the sequence from (A) to (C), swiping left from the right edge of the screen brings up the Home page.

There is provided a Right Edge Swipe function for a tablet. As on the phone, swiping left from the right edge of the screen brings up the previously used and open app within the side stage of the tablet. In all views except the Welcome Screen and when the side stage is in view, swiping left from the right edge of the screen may bring up the previously used and open app. When viewing the Welcome screen, swiping left from the right edge of the screen brings up the Home page. An example is shown in FIG. 33, for the sequence from (A) to (C).

Figure 34:
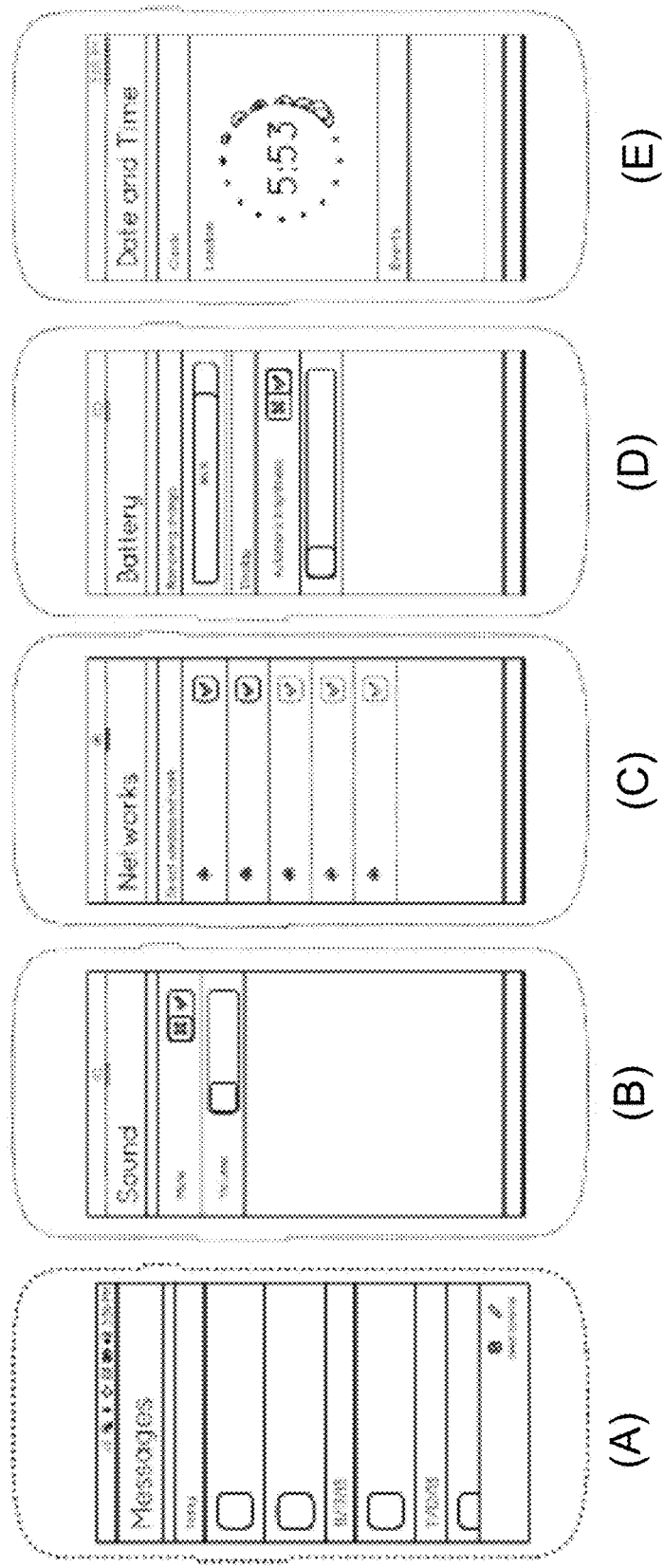
FIG. 34 shows an example in which for the sequence from (A) to (E), starting from (A), a succession of settings pages are brought up.

There are provided reaching indicators for a smartphone. In an example, swiping down from an indicator icon brings down the settings related to that icon. Without releasing the finger when swiping down, moving the finger horizontally lets the user choose what indicator to display. Tapping on the indicator bar displays a hint of the indicators coming down. It is also possible to navigate between indicator screens by tapping on the tab header to reveal more indicator tabs, and then selecting one of them by tapping it. An example is shown in FIG. 34. In FIG. 34, a sequence from (A) to (E) is shown. In (A), a sound icon is swiped down from, to provide the screen (B). Without releasing the finger when swiping down, moving the finger horizontally lets the user choose what indicator to display, so that moving the finger horizontally provides the sequence of screens from (B) to (E). FIG. 34 shows an example of available views from swiping down (and then sideways, as mentioned above) from the top right edge of the screen where the indicators are displayed.

In one implementation on a smartphone, an overview of settings can be reached by tapping on top of the screen where the indicator icons are found. This may bring into view a settings screen which can redirect the user to other settings views. There is provided an "overview of settings" screen. Indicators may be accessed by swiping down and sideways from the top edge. It is also possible to navigate between indicator screens by tapping on the tab header to reveal more indicator tabs, and then selecting one of them by tapping it. Detailed system settings may be accessed through a dedicated settings app, which can be accessed by tapping on a shortcut on some individual indicator screens, and also by opening the System Settings app from the Applications scope.

Figure 35:
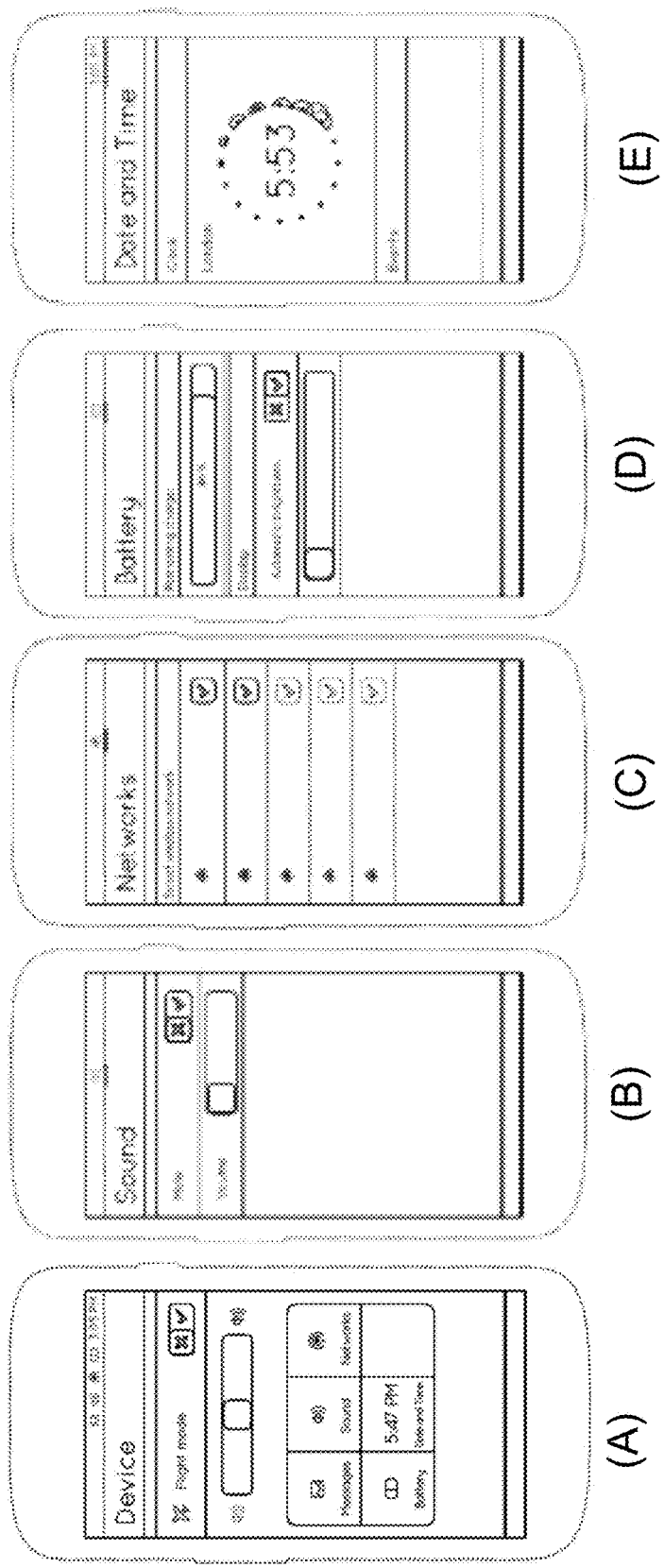
FIG. 35 shows examples in which for the screens (B) to (E), starting from screen (A), the settings screens shown in (B) to (E) may be brought up.

In an implementation, tapping on an icon at the top of the screen provides a corresponding settings screen. A settings example for a smartphone is shown in FIG. 35. In FIG. 35, a sequence from (A) to (B) is shown. In (A), a sound icon is tapped at the top of the screen, where the sound icon is found, to provide the screen (B). Starting with screen (A), tapping on the networks icon at the top of the screen provides screen (C). Starting with screen (A), tapping on the battery icon at the top of the screen provides screen (D). Starting with screen (A), tapping on the date and time icon at the top of the screen provides screen (E).

Figure 36:
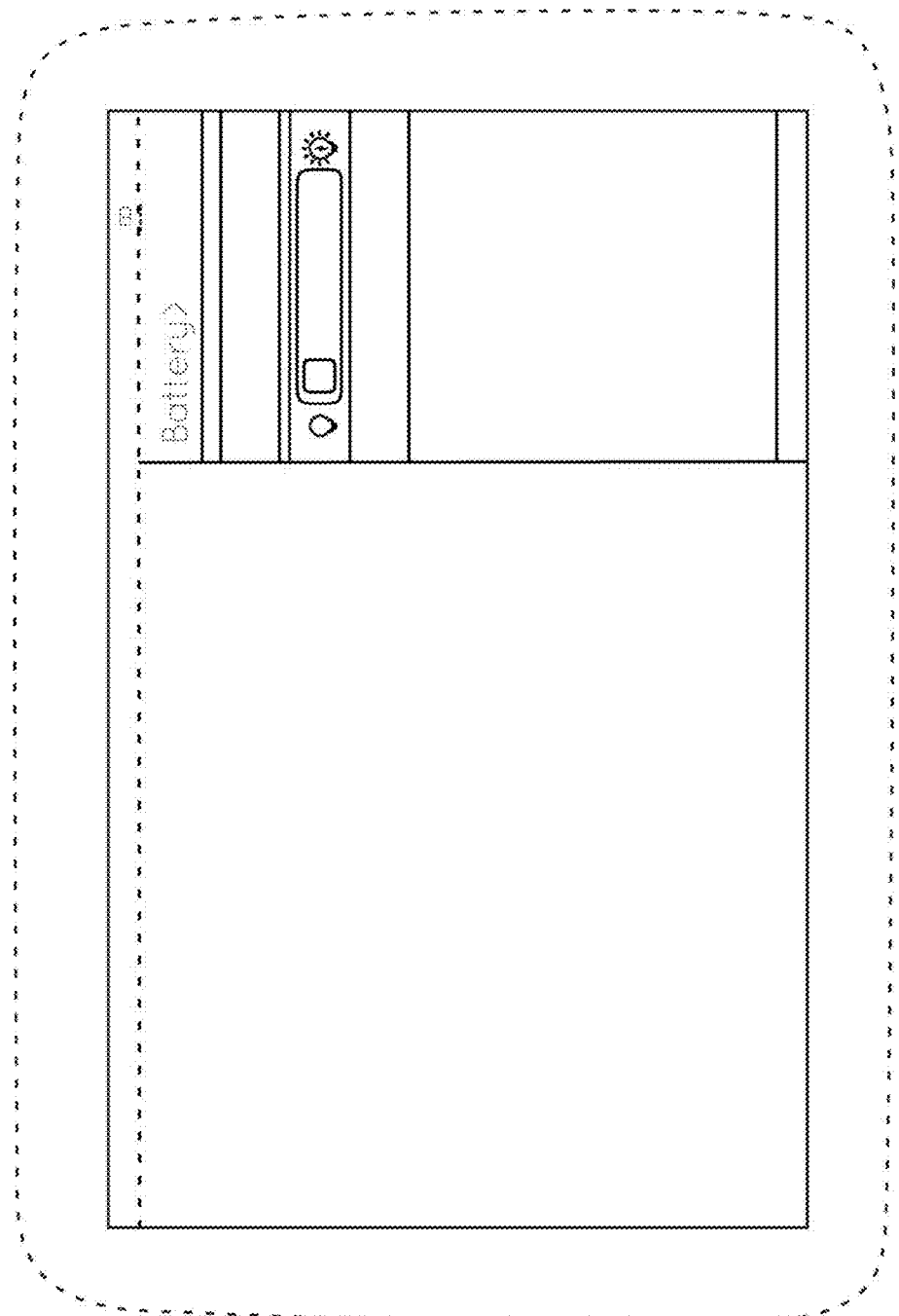
FIG. 36 shows an example of a battery settings screen on a tablet computer screen.

There are provided reaching indicators for a tablet. In an example, swiping down from an indicator icon (eg. in the top right of the screen) brings down the settings related to that icon. Without releasing the finger when swiping down, moving the finger horizontally lets the user choose what indicator to display. Tapping on the indicator bar displays a hint of the indicators coming down. It may also be possible to navigate between indicator screens by tapping on the tab header to reveal more indicator tabs, and then selecting one of them by tapping it. FIG. 36 shows an example of a battery settings screen on a tablet computer screen.

In one implementation on a tablet, an overview of settings can be reached by tapping on the top of the screen where the indicator icons are found. This may bring into view a settings screen which can redirect the user to other settings views.

Figure 37:
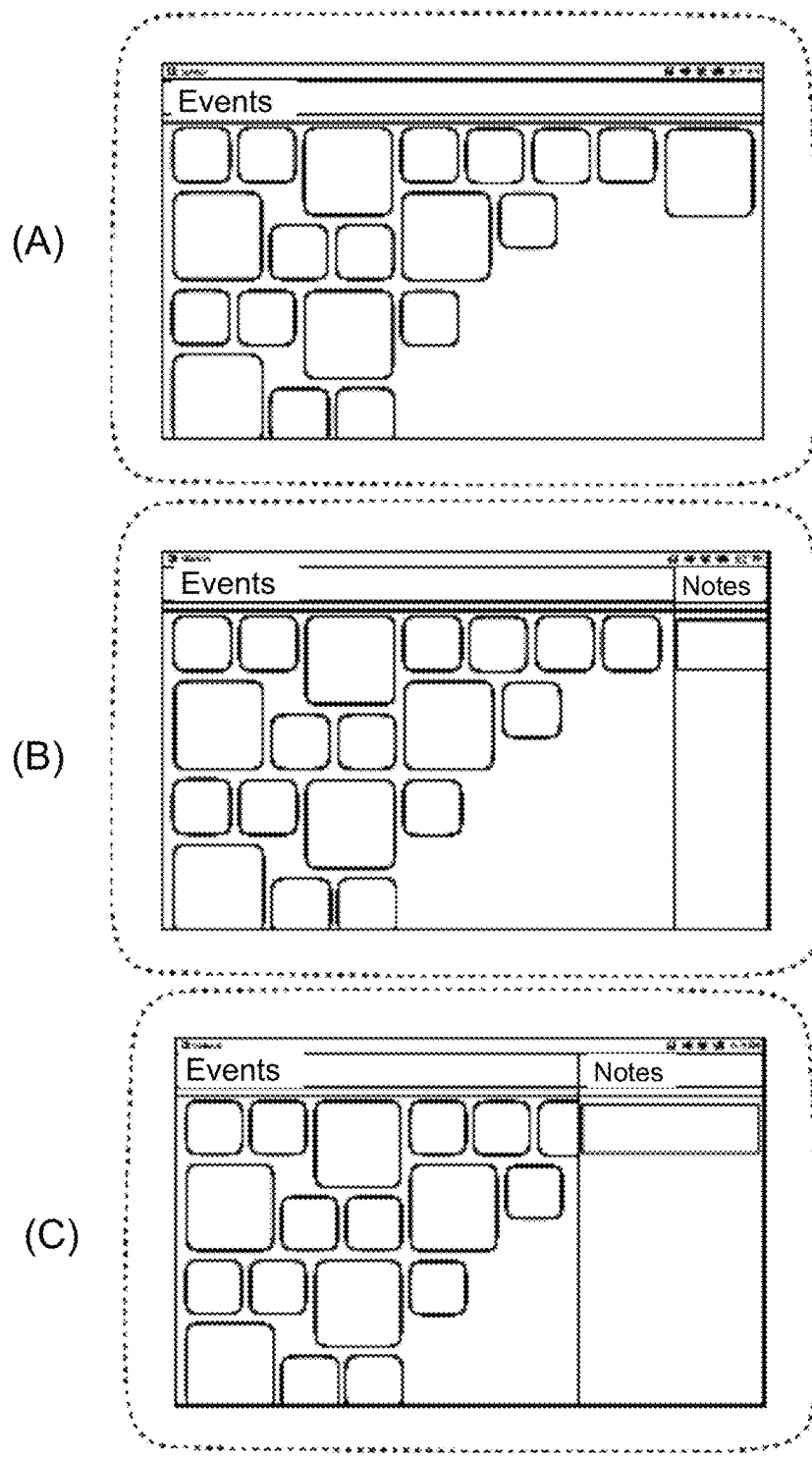
FIG. 37 shows an example, which includes a sequence of screen images from (A) to (C). In (A), output from an "Events" application is displayed. In (B), a "Notes" side stage is being pulled into view by a user horizontally swiping a finger from the right edge of the screen. In (C), the "Notes" side stage has been pulled into view.

There is provided a tablet side stage on a tablet computer screen. In an example, the tablet's side stage can be pulled into view by a user horizontally swiping a finger from the right edge of the screen. An example is shown in FIG. 37, which presents a sequence of screen images from (A) to (C). In (A), output from an "Events" application is displayed. In (B), a "Notes" side stage is being pulled into view by a user horizontally swiping a finger from the right edge of the screen. In (C), the "Notes" side stage has been pulled into view. In an example, the tablet's side stage can be viewed in two different ways. This may be either on top of the main view or by splitting the screen which will rescale the main view to fit into the new space given.

A tablet side stage may enable multi tasking. For example browsing music or watching a video while making a phone call, writing a text, changing system settings or writing a note while viewing your gallery. Many different things may be done at the same time. A tablet side stage may enable previous apps within the side stage to be flicked through with a swipe from the right edge of the screen.

Figure 38:
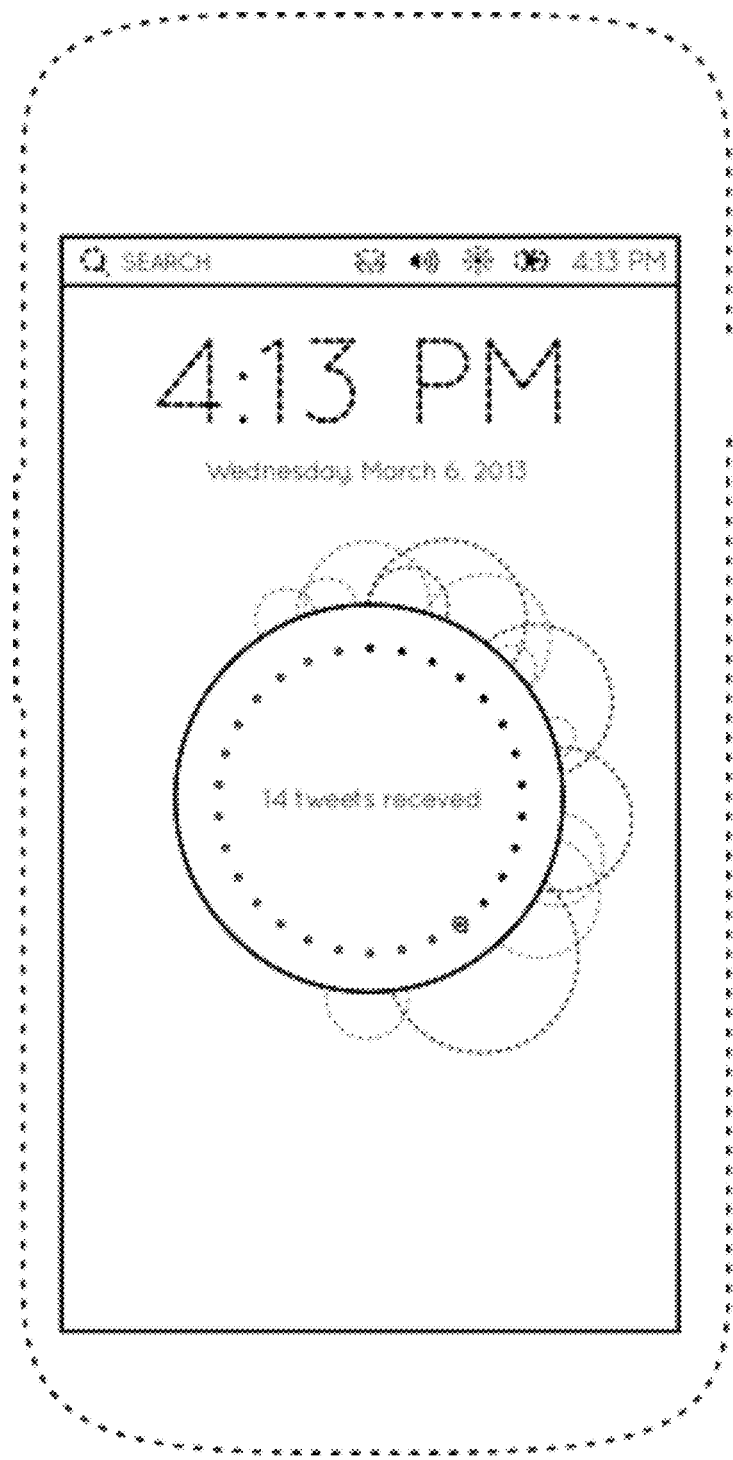
FIG. 38 shows an example of a Welcome screen including an infographic in which each dot in the circle represents each day of the current month and the highlighted dot is the current day.

There is provided a Welcome Screen on a smartphone. The Welcome screen may include an infographic in which each dot in the circle represents each day of the current month and the highlighted dot is the current day. The highlighted circles around the middle circle represent, in an example, the number of tweets received within a certain time. An example is shown in FIG. 38. Other data can also be depicted this way.

Figure 39:
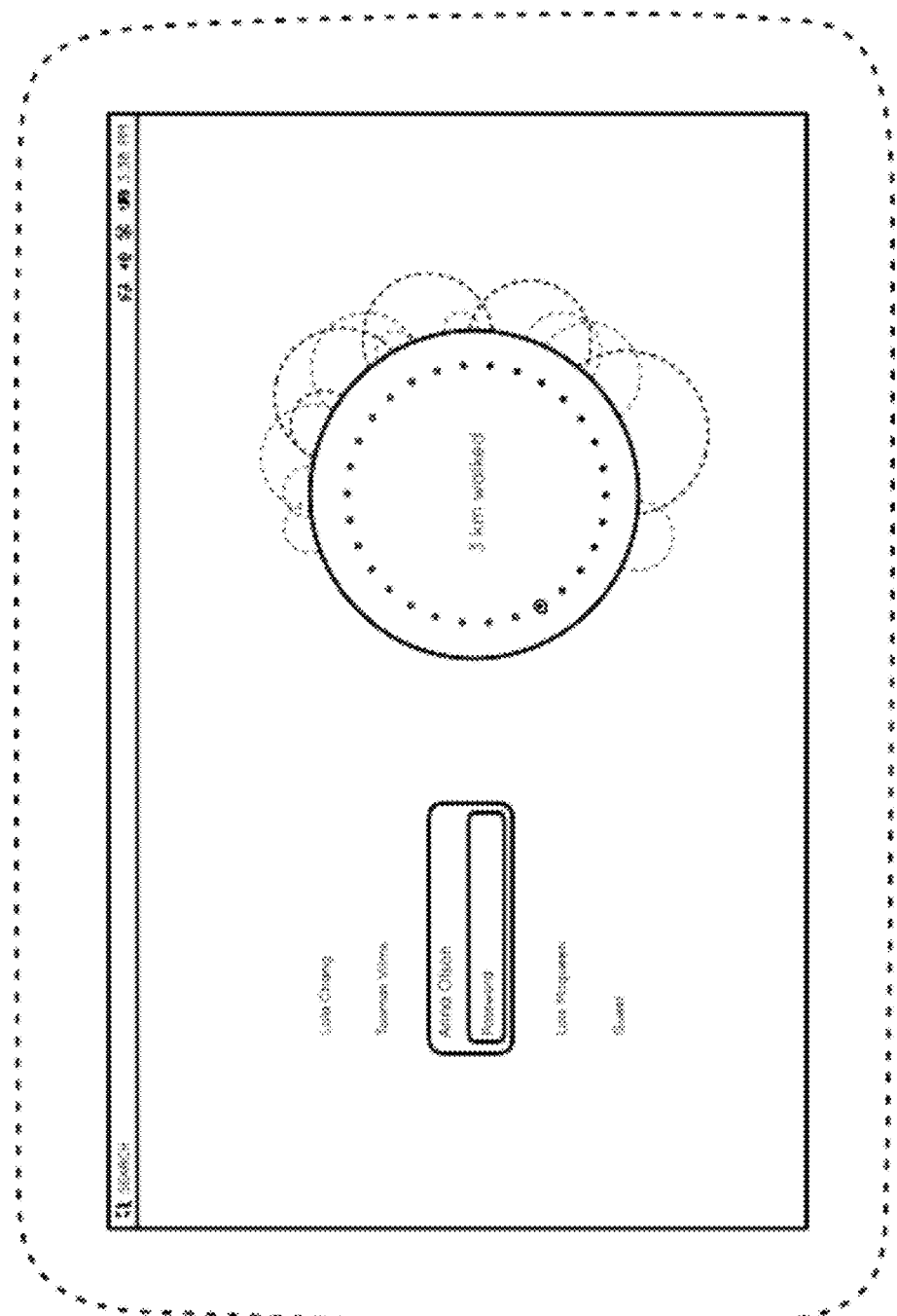
FIG. 39 shows an example of a Welcome Screen on a tablet.

There is provided a Welcome Screen on a tablet. The Welcome screen may be customised with background pictures, colours and data shown. An example is shown in FIG. 39. A tablet may have several accounts including private ones but also a guest account that anyone can use. The guest account may not have an infographic on the Welcome screen.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A smartphone, tablet or other computing device comprising:
    (a) a touch sensitive display;
    (b) one or more processors;
    (c) computer memory;
    (d) one or more computer programs stored in the computer memory and configured to be executed by the one or more processors and including instructions for
        detecting a swipe in from an edge of the display, and in response to the detected swipe causing a home screen to be displayed, irrespective of which screen the device was displaying immediately prior to the swipe in from the edge, the home screen listing running apps and user notifications, such as missed calls;
    wherein when the detected swipe comprises a short swipe from the left edge and the displayed screen is a welcome screen, an app launcher is displayed and when the short swipe continues to a long swipe and the displayed screen is a welcome screen, an apps page of the home screen is displayed, the welcome screen being a lock screen comprising a circular arrangement of thirty small dots, each dot representing an activity or state, the activity or state being indicated by the size of a semi-translucent circle adjacent to each dot;
    wherein when a direction of the detected swipe is reversed back to the edge of the display before the home screen is fully displayed, the home screen is progressively removed as the detected swipe continues in the reversed direction; and
    detecting a sideways swipe while the home screen is being displayed, and in response to the detected sideways swipe, causing the home screen to display contacts based on frequency of communication.

2. The device of claim 1 in which the swipe in from the edge brings up the home screen and requires only a single gesture to be detected.

3. The device of claim 1 in which the swipe in from the edge brings up the home screen and requires a single gesture and a commit or select action to be detected.

4. The device of claim 1 in which the swipe is a long swipe in from the left edge.

5. The device of claim 1 in which home screen content is user customizable.

6. The device of claim 1 in which the home screen includes one or more of: recently added music, new film releases, on-line stores.

7. The device of claim 1 in which the home screen includes missed call notifications and enables the user to return the call without tasking away to a phone app.

8. The device of claim 1 in which the device has no dedicated physical 'home' button.

9. The device of claim 1 in which the home screen includes apps sections listing all installed apps and also apps available for download.

10. The device of claim 1 in which swiping right from the home screen takes you to the home screen Apps page; a further swipe right takes you to Videos.

11. The device of claim 1 in which swiping left takes you to People (contacts) and a further swipe right takes you to Music.

12. The device of claim 1 in which a short swipe in from the left edge brings up a launcher bar, including icons for various apps, plus an icon for the home screen.

13. The device of claim 1, wherein when the detected swipe ends with a commit gesture before the home screen is displayed or removed, the home screen is displayed.

14. A method comprising the following steps, performed at a computing device with a touch sensitive display:
    detecting a swipe in from an edge of the display, and in response to the detected swipe causing a home screen to be displayed, irrespective of which screen the device was displaying immediately prior to the swipe in from the edge, the home screen listing running apps and user notifications, such as missed calls,
    wherein when the detected swipe comprises a short swipe from the left edge and the displayed screen is a welcome screen, an app launcher is displayed and when the short swipe continues to a long swipe and the displayed screen is a welcome screen, an apps page of the home screen is displayed, the welcome screen being a lock screen comprising a circular arrangement of thirty small dots, each dot representing an activity or state, the activity or state being indicated by the size of a semi-translucent circle adjacent to each dot;

wherein when a direction of the detected swipe is reversed back to the edge of the display before the home screen is fully displayed, the home screen is progressively removed as the detected swipe continues in the reversed direction; and detecting a sideways swipe while the home screen is displayed, and in response to the detected sideways swipe, causing the home screen to display frequently used contacts based on user usage.

15. The method of claim 14, wherein when the detected swipe ends with a commit gesture before the home screen is displayed or removed, the home screen is displayed.

* * * * *